(12) United States Patent
Izumi

(10) Patent No.: US 8,515,288 B2
(45) Date of Patent: Aug. 20, 2013

(54) OPTICAL SIGNAL TRANSMISSION CONTROL APPARATUS AND OPTICAL SIGNAL TRANSMISSION CONTROL METHOD

(75) Inventor: Futoshi Izumi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 546 days.

(21) Appl. No.: 12/457,762

(22) Filed: Jun. 19, 2009

(65) Prior Publication Data

US 2009/0269079 A1 Oct. 29, 2009

Related U.S. Application Data

(63) Continuation of application No. 11/992,231, filed as application No. PCT/JP2005/018178 on Sep. 30, 2005, now abandoned.

(51) Int. Cl.
*H04B 10/00* (2006.01)

(52) U.S. Cl.
USPC .......................... 398/161; 398/158; 398/160

(58) Field of Classification Search
USPC ................. 398/5, 29, 147, 158–161
See application file for complete search history.

(56) References Cited

U.S. PATENT DOCUMENTS

| 5,280,376 | A | 1/1994 | Takahashi et al. |
| 7,206,509 | B2 * | 4/2007 | Beacken ........................ 398/53 |
| 2004/0105620 | A1 | 6/2004 | Beacken |
| 2004/0247312 | A1 | 12/2004 | Hasuo et al. |
| 2004/0258352 | A1 | 12/2004 | Takeyama et al. |

FOREIGN PATENT DOCUMENTS

| JP | 63-199530 | 8/1988 |
| JP | 05-183508 | 7/1993 |
| JP | 07-074730 | 3/1995 |
| JP | 08-146479 | 6/1996 |
| JP | 09-238370 | 9/1997 |
| JP | 11-150511 | 6/1999 |
| JP | 2001-142102 | 5/2001 |
| JP | 2003-318863 | 7/2003 |
| JP | 2004-015172 | 1/2004 |
| JP | 2004015172 A * | 1/2004 |
| JP | 2005-17385 | 1/2005 |
| WO | 03/049330 | 6/2003 |

OTHER PUBLICATIONS

Japanese Office Action for corresponding Japanese Application 2007-539744; mailed Nov. 9, 2010.
Japanese Office Action for corresponding Japanese application 2007-539744; mailed Aug. 2, 2011.

(Continued)

*Primary Examiner* — Dzung Tran
(74) *Attorney, Agent, or Firm* — Staas & Halsey LLP

(57) ABSTRACT

An optical signal transmission control apparatus that controls transmission of optical signals transmitted via a plurality of redundant routes. The optical signal transmission control apparatus includes a delay difference adjusting unit that adjusts a transmission delay difference between the optical signals of each route by converting a wavelength of the optical signal and making the optical signal with a converted wavelength pass through a waveguide in which a transmission delay of the optical signal changes continuously depending on the wavelength, and a waveform degradation compensating unit that compensates degradation of a waveform of the optical signal, while maintaining the transmission delay difference adjusted by the delay difference adjusting unit.

13 Claims, 30 Drawing Sheets

(56) References Cited

OTHER PUBLICATIONS

NTT, "Broadband multiwavelength batch optical frequency shifter employing quasi-phase-matched LiNBO3 wavelength converting elements", http:/www.phlab.ecl.nnt.co.jp/theme/2003/2003_09_04.pdf, Copyright 2003.

International Search Report for PCT/JP2005/018178 mailed on Dec. 27, 2005.

* cited by examiner

OPTICAL SIGNAL TRANSMISSION CONTROL APPARATUS AND OPTICAL SIGNAL TRANSMISSION CONTROL METHOD

CROSS-REFERENCE TO RELATED APPLICATIONS

This application is a continuation of U.S. patent application Ser. No. 11/992,231, filed Mar. 19, 2008 now abandoned, which is a continuation under 35 U.S.C. §111(a) of PCT/JP2005/018178 filed on Sep. 30, 2005, now WO 2007/043121 published Apr. 19, 2007, the disclosures of which are herein incorporated in their entirety by reference.

BACKGROUND OF THE INVENTION

1. Field of the Invention

The present invention relates to an optical signal transmission control apparatus and an optical signal transmission control method that control transmission of optical signals transmitted via a plurality of redundant routes. More particularly, the present invention relates to an optical signal transmission control apparatus and an optical signal transmission control method that can continuously adjust a transmission delay difference between optical signals transmitted through a plurality of redundant routes, while preventing degradation of an optical signal.

2. Description of the Related Art

In the past, in optical communications, an introduction of a wavelength division multiplexing (WDM) technology has considerably expanded transmission capacities of optical fiber lines. In recent years, to provide against failure of the optical fiber line, a method that provides active and reserved redundant optical fiber lines, and switches to the reserved optical fiber line when a failure occurs in the active optical fiber line has been adopted.

Communication interruption time caused when switching from the active to the reserved optical fiber lines is generally defined to be equal to or less than 50 milliseconds. To meet the need of high quality communications that does not allow a communication interruption of data even for one bit, a hitless protection switching technique is used.

In the hitless protection switching technique, optical signals received via active and reserved optical fiber lines are converted into electric signals, and data converted into the electric-signals is temporarily stored in a memory. When a failure occurs in the active optical fiber line, a switching process is performed so that the data of the reserved-system is read out from the memory, instead of the data of the active-system.

In this manner, when data is temporarily stored in a memory, communication can be continued by switching the optical fiber line to be used from the active system to the reserved system, without causing a data error even for one bit, even if a failure occurs in an active optical fiber line. At the same time, a transmission delay difference of data generated between the active optical fiber line and the reserved optical fiber line can be absorbed.

However, there are some problems to the hitless protection switching technique using a memory. More particularly, the storage capacity required for a memory increases drastically in proportion to a product of a maximum value of a transmission delay difference of data and a communication speed. When optical signals with different wavelengths are multiplexed for transmission as in the WDM, a memory needs to be provided for each wavelength. Further, in the hitless protection switching technique, an optical signal needs to be converted into an electric signal, whereby a problem is caused that the scale of the configuration increases along the increase of the number of wavelengths.

Therefore, a development of a technology that performs hitless protection switching using an optical signal as it is has been sought after. However, unlike electric signals, it is difficult to keep optical signals to one place. Therefore, it is difficult to store information in the form of optical signals. Further, because the optical signal has a high propagation speed, even if the transmission delay difference of data generated between the active system and the reserved system is minute, a transmission delay needs to be generated by making an optical signal pass through a very long optical fiber in order to adjust the delay.

For example, a difference in distance between the routes of the active system and the reserved system is generally considered to be equal to or more than 600 kilometers. However, to adjust the transmission delay difference generated by the difference in distance, a waveguide of an optical signal that is equal to or more than 600 kilometers is required. In this case, if a waveguide of 600 kilometers is formed by connecting a plurality of optical fibers of 30 kilometers in length, a transmission delay difference that corresponds to the maximum of 15 kilometers cannot be adjusted.

If the difference of distance is 600 kilometers, the transmission delay time difference between the active system and the reserved system is approximately 3 milliseconds. However, in addition to the transmission delay time difference caused by the difference in distance, a transmission delay time difference is caused by a change in temperature environment where the optical fiber line is being laid. More particularly, the transmission delay time difference is caused by an expansion and a contraction of an optical fiber due to a change in the temperature environment, and is approximately 50 nanoseconds per 100 kilometers (approximately 300 nanoseconds to 600 kilometers).

To adjust the transmission delay time difference generated by a change in the temperature environment, a technology that continuously controls the delay difference of the optical signals is required. As such, a technology that combines an optical wavelength converting circuit and a high-dispersion optical fiber, and adds to the optical signal a delay that corresponds to the wavelength converted by the optical wavelength converting circuit is known (for example, refer to Japanese Patent Application Laid-Open No. H8-146479).

Though the conventional technology mentioned above is designed to continuously control the transmission delay difference of the optical signals, it has a problem that the delayed optical signal cannot be used for hitless protection switching as it is.

More particularly, though the transmission of the optical signal through a high-dispersion optical fiber can generates the delay of the optical signal to eliminate a transmission delay difference between the active system and the reserved system, a waveform of the optical signal is distorted due to wavelength dispersion. This leads to a problem that the hitless protection switching cannot be performed while preventing degradation of the optical signal.

This wavelength dispersion can be compensated by using a high-dispersion optical fiber that has reverse characteristics to the optical dispersion characteristics of the high-dispersion optical fiber. However, in this case, the absorbed transmission delay difference of the optical signal is generated again, thereby making it unsuitable for the hitless protection switching.

Therefore, a development of a technology that can continuously adjust a transmission delay difference between optical signals that are transmitted via active and reserved optical fiber lines, while preventing degradation of the optical signal, has become an important issue.

SUMMARY OF THE INVENTION

It is an object of the present invention is to at least solve the problems in the conventional technology.

To solve the problems as described above and to achieve an object, an optical signal transmission control apparatus according to one exemplary embodiment of the present invention is an optical signal transmission control apparatus that controls transmission of optical signals transmitted via a plurality of redundant routes, and includes a delay difference adjusting unit that adjusts a transmission delay difference between the optical signals of each route by converting a wavelength of the optical signal and making the optical signal with a converted wavelength pass through a waveguide in which a transmission delay of the optical signal changes continuously depending on the wavelength, and a waveform degradation compensating unit that compensates degradation of a waveform of the optical signal, while maintaining the transmission delay difference adjusted by the delay difference adjusting unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an optical signal transmission control apparatus and an optical signal transmission control method according to the present invention will be described in detail below with reference to the accompanying drawings. However, the present invention is not limited to these embodiments.

A functional configuration of a hitless protection switching system according to a first embodiment of the present invention will be explained first. The hitless protection switching system is a system that continues to transmit optical signals without interruption, even when a failure occurs in any of transmission routes among a plurality of redundant transmission routes, by using optical signals of the other transmission route.

More particularly, the hitless protection switching system includes a wavelength converting unit that converts each wavelength of multiplexed optical signals, and an optical fiber whose transmission speed of an optical signal is wavelength dependent. Accordingly, the transmission speed of each multiplexed optical signal is continuously adjusted, and a transmission delay difference between the optical signals that pass through the redundant transmission routes is absorbed. The hitless protection switching system also compensates waveform distortion of the optical signal and prevents degradation of the optical signal, while keeping the transmission delay difference between the optical systems absorbed.

Figure 1:
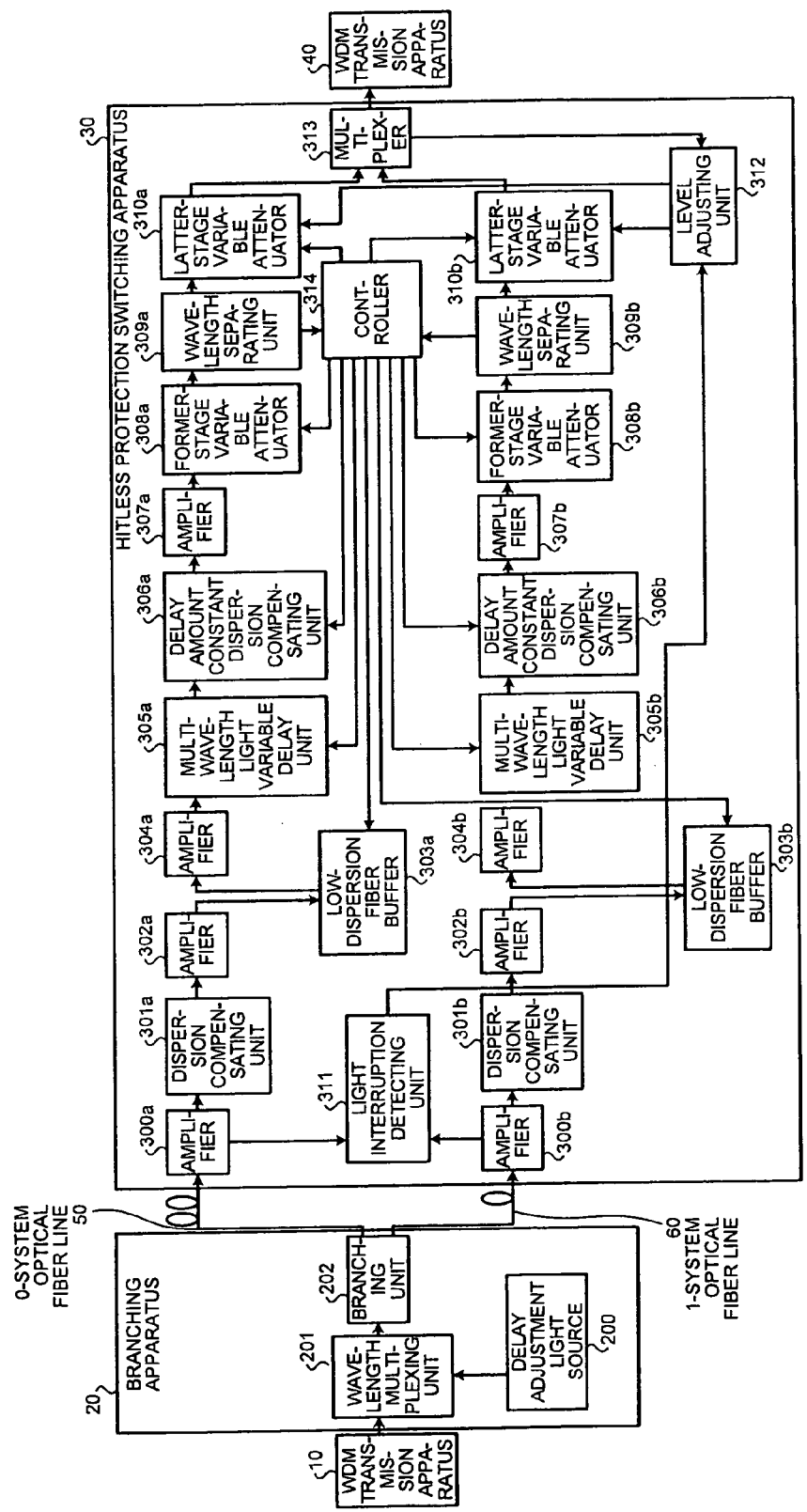
FIG. 1 is a functional configuration diagram of a hitless protection switching system according to a first embodiment of the present invention.

FIG. 1 is a functional configuration diagram of a hitless protection switching system according to the first embodiment of the present invention. As shown in FIG. 1, the hitless protection switching system includes a wavelength division multiplexing (WDM) transmission apparatus 10, a branching apparatus 20, a hitless protection switching apparatus 30, and a WDM transmission apparatus 40. The branching apparatus 20 and the hitless protection switching apparatus 30 are connected via a 0-system optical fiber line 50 and a 1-system optical fiber line 60 that are redundant transmission routes of optical signals with different lengths.

The WDM transmission apparatus 10 is an apparatus that multiplexes optical signals transmitted from an optical transmitter (not shown) by a wavelength division multiplexing (WDM) system, and transmits a plurality of multiplexed optical signals with different wavelengths. The WDM transmission apparatus 40 is an apparatus that receives the multiplexed optical signals with different wavelengths from the hitless protection switching apparatus 30, and transmits the optical signals to an optical receiver (not shown) by separating the optical signals by each wavelength.

The branching apparatus 20 is an apparatus that multiplexes an optical signal for delay adjustment to the optical signals received from the WDM transmission apparatus 10, and then branches and transmits the resulting optical signals. The branching apparatus 20 includes a delay adjustment light source 200, a wavelength multiplexing unit 201, and a branching unit 202. The delay adjustment light source 200 is a light source that generates an optical signal with a predetermined wavelength, to which the hitless protection switching apparatus 30 refers, in order to adjust a delay of the optical signal that has passed through one of the 0-system optical fiber line 50 and the 1-system optical fiber line 60. More particularly, the delay adjustment light source 200 generates two delay adjustment signals with different wavelengths.

The wavelength multiplexing unit 201 is a processing unit that multiplexes the signal received from the WDM transmission apparatus 10 and the two delay adjustment signals with different wavelengths generated by the delay adjustment light source 200, and transmits the resulting signals to the branching unit 202. The branching unit 202 is a processing unit that branches the optical signals received from the wavelength multiplexing unit 201 and transmits via the 0-system optical fiber line 50 and the 1-system optical fiber line 60.

The hitless protection switching apparatus 30 is an apparatus that continues to transmit optical signals without interruption, even when a failure occurs in one of the 0-system optical fiber line 50 and the 1-system optical fiber line 60, by using optical signals of the other optical fiber line.

The hitless protection switching apparatus 30 converts wavelengths of the optical signals that have passed through the 0-system optical fiber line 50 and the 1-system optical fiber line 60 and makes the resulting optical signals pass through an optical fiber whose transmission speed of optical signals is wavelength dependent, thereby continuously adjusts the transmission delay difference of the optical signals that have passed through the 0-system optical fiber line 50 and the 1-system optical fiber line 60. The hitless protection switching apparatus 30, after adjusting the transmission delay difference of the optical signal, also compensates waveform distortion of the optical signal while maintaining the transmission delay difference.

The hitless protection switching apparatus 30 includes amplifiers 300a and 300b, dispersion compensating units 301a and 301b, amplifiers 302a and 302b, low-dispersion fiber buffers 303a and 303b, amplifiers 304a and 304b, multi-wavelength light variable delay units 305a and 305b, delay amount constant dispersion compensating units 306a and 306b, amplifiers 307a and 307b, former-stage variable attenuators 308a and 308b, wavelength separating units 309a and 309b, latter-stage variable attenuators 310a and 310b, a light interruption detecting unit 311, a level adjusting unit 312, a multiplexer 313, and a controller 314.

Among these, the amplifiers 300a, 300b, 302a, 302b, 304a, 304b, 307a, and 307b are amplifiers that amplify an optical signal. The dispersion compensating units 301a and 301b are processing units that compensate wavelength dispersion of optical signals that have passed through the 0-system optical fiber line 50 and the 1-system optical fiber line 60. The dispersion compensating units 301a and 301b are formed by a dispersion compensation fiber (DCF), for example.

Figure 2:
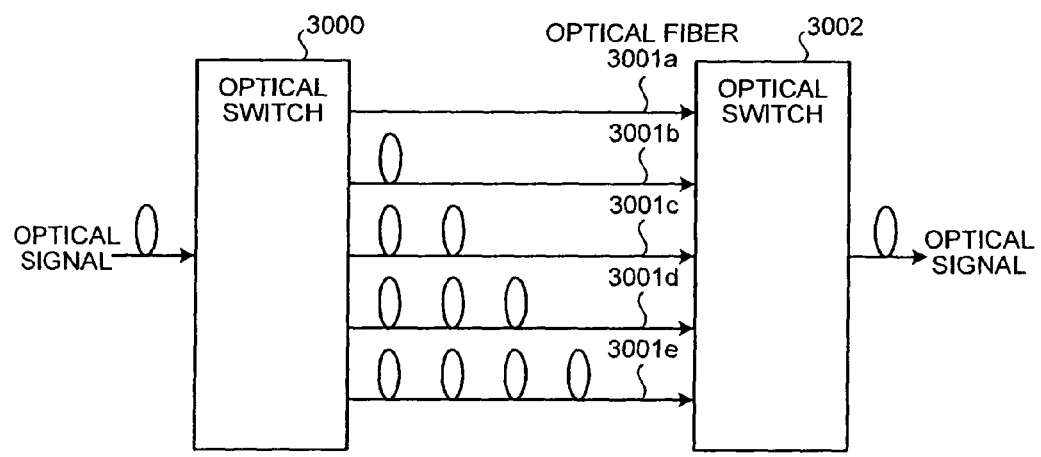
FIG. 2 is a functional configuration diagram of a low-dispersion fiber buffer shown in FIG. 1.

The low-dispersion fiber buffers 303a and 303b are processing units that discretely adjust a delay amount of an optical signal. FIG. 2 is a functional configuration diagram of the low-dispersion fiber buffers 303a and 303b. As shown in FIG. 2, the low-dispersion fiber buffers 303a and 303b include an optical switch 3000, a plurality of optical fibers 3001a through 3001e, and an optical switch 3002.

The optical switch 3000 is a switch that switches the optical fibers 3001a through 3001e, which an optical signal passes through, depending on a required delay amount. The optical fibers 3001a through 3001e are optical fibers that have different lengths to each other, and a delay amount of an optical signal discretely changes depending on the lengths of the optical fibers 3001a through 3001e. The optical switch 3002 is a switch that operates in conjunction with the optical switch 3000, and switches the optical fibers 3001a through 3001e, which an optical signal passes through.

Referring back to FIG. 1, the multi-wavelength light variable delay units 305a and 305b are processing units that convert the wavelengths of the optical signals that are multiplexed by the WDM transmission apparatus 10 to different wavelengths in bulk, adjust a delay amount of the optical signal of each wavelength converted, and absorb a transmission delay difference of the optical signals of the 0-system optical fiber line 50 and the 1-system optical fiber line 60.

Figure 3:
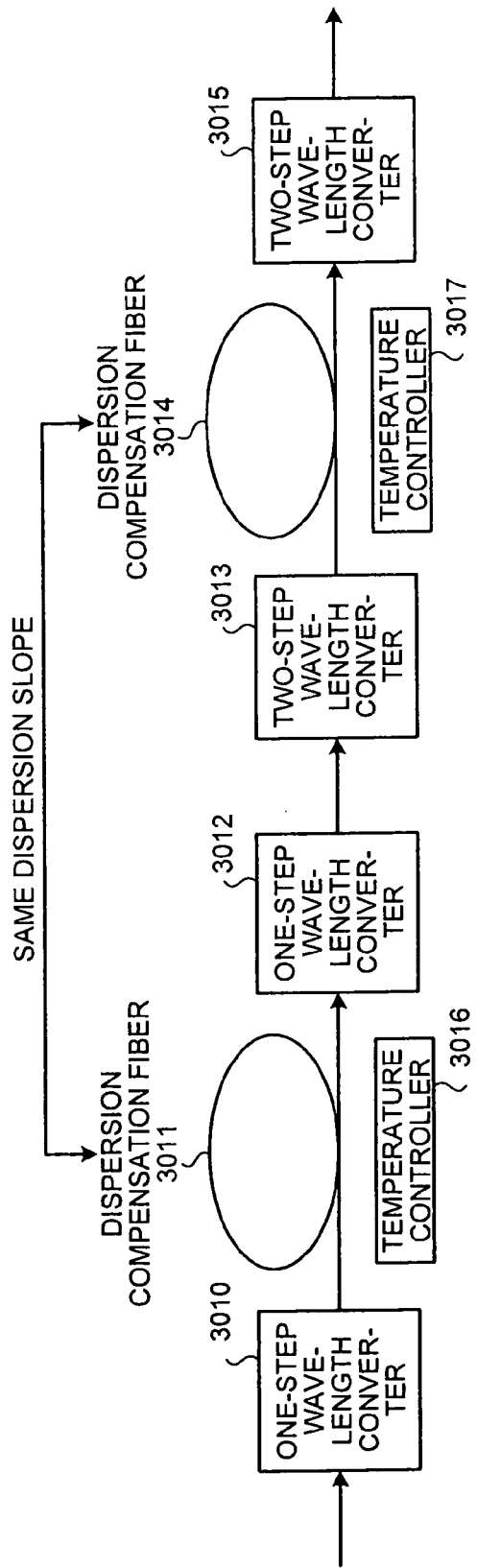
FIG. 3 is a functional configuration diagram of a multi-wavelength light variable delay unit shown in FIG. 2.

FIG. 3 is a functional configuration diagram of the multi-wavelength light variable delay units 305a and 305b. As shown in FIG. 3, each of the multi-wavelength light variable delay units 305a and 305b includes one-step wavelength converters 3010 and 3012, dispersion compensation fibers 3011 and 3014, two-step wavelength converters 3013 and 3015, and temperature controllers 3016 and 3017.

Figure 4:
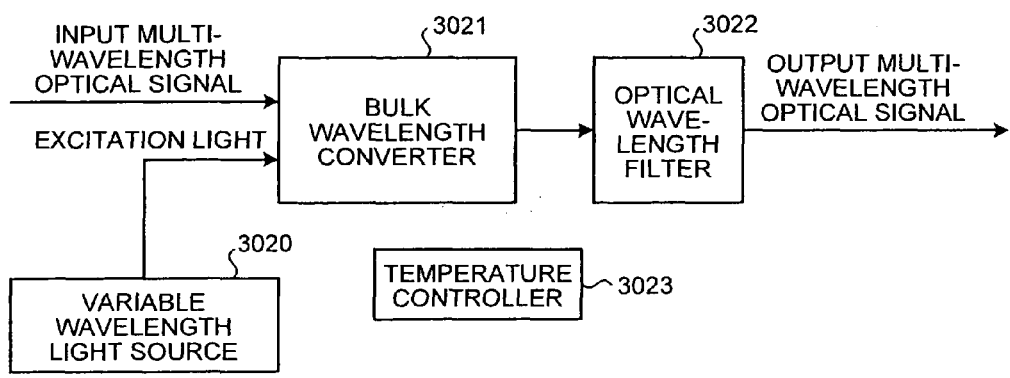
FIG. 4 is a functional configuration diagram of a one-step wavelength converter shown in FIG. 3.

The one-step wavelength converters 3010 and 3012 are processing units that convert the wavelengths of the multiplexed optical signals in bulk. FIG. 4 is a functional configuration diagram of the one-step wavelength converters 3010 and 3012. As shown in FIG. 4, each of the one-step wavelength converters 3010 and 3012 includes a variable wavelength light source 3020, a bulk wavelength converter 3021, an optical wavelength filter 3022, and a temperature controller 3023.

The variable wavelength light source 3020 is a light source that generates optical signals with various wavelengths, and outputs the generated optical signals to the bulk wavelength converter 3021, as excitation light. The bulk wavelength converter 3021 is a wavelength conversion element such as a periodically poled lithium niobate (PPLN), and also a converter that converts the wavelengths of the optical signals in bulk, depending on the wavelength of the excitation light that is input from the variable wavelength light source 3020.

The optical wavelength filter 3022 is a filter that removes the excitation light from the optical signal that is output from the bulk wavelength converter 3021. The temperature controller 3023 is a controller that controls temperature of the one-step wavelength converters 3010 and 3012.

Referring back to FIG. 3, the dispersion compensation fibers 3011 and 3014 are optical fibers that have such dispersion characteristics that the transmission speed of an optical signal that passes through the dispersion compensation fibers 3011 and 3014 changes depending on a wavelength of the optical signal.

Figure 5:
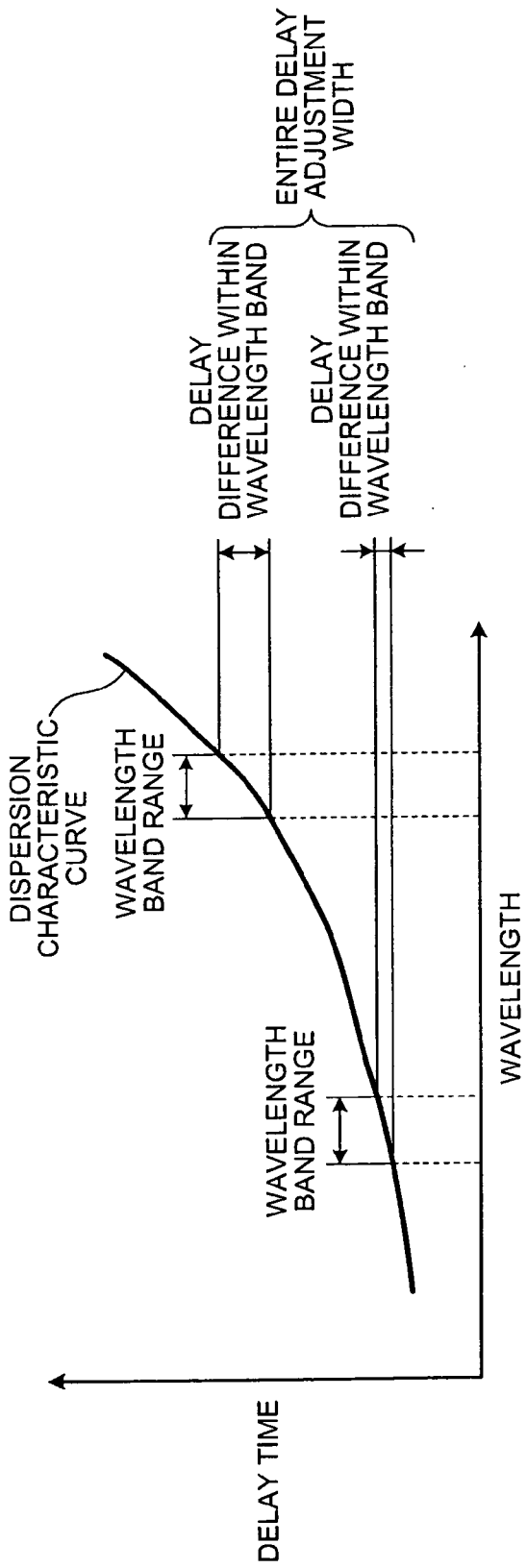
FIG. 5 is a graph showing an example of a dispersion characteristic curve of a dispersion compensation fiber shown in FIG. 3.

FIG. 5 is a graph showing an example of a dispersion characteristic curve of the dispersion compensation fibers 3011 and 3014. As shown in FIG. 5, in the dispersion compensation fibers 3011 and 3014, a transmission delay time caused when an optical signal passes through the dispersion compensation fibers 3011 and 3014 changes continuously, depending on the wavelength of the optical signal. Therefore, the transmission delay time can be controlled, by adjusting the wavelength of the optical signal.

For example, when a wavelength band range of the multiplexed optical signals that corresponds to a region where the dispersion characteristic curve inclines gradually, the delay difference that occurs to each optical signal within the wavelength band becomes small. Accordingly, the transmission delay time of the entire optical signals of the wavelength band also becomes small. When a wavelength band range of the multiplexed optical signals that corresponds to a region where the dispersion characteristic curve inclines steeply, the delay difference that occurs to each optical signal within the wavelength band becomes large. Accordingly, the transmission delay time of the entire optical signals of the wavelength band also becomes large.

In the above, an example in which the transmission delay time increases as the wavelength increase is explained. However, the dispersion compensation fibers 3011 and 3014 may have a reversed dispersion characteristic curve, that is, the dispersion compensation fibers 3011 and 3014 in which the transmission delay time decreases as the wavelength increase may be used.

Figure 6:
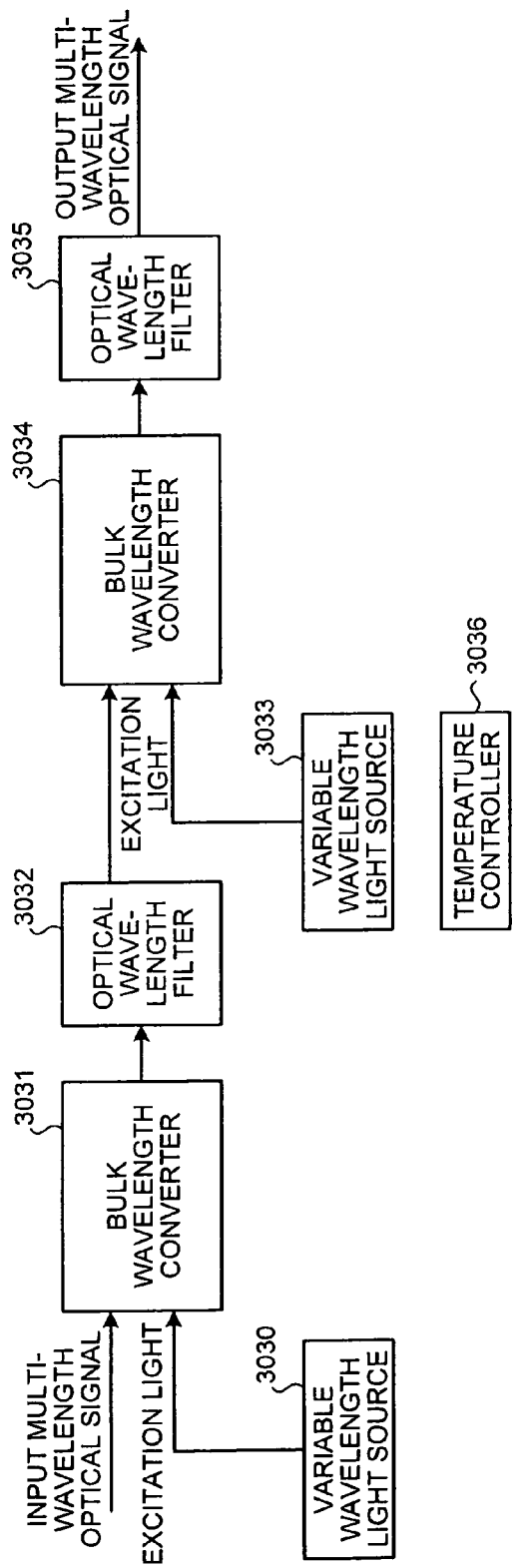
FIG. 6 is a functional configuration diagram of a two-step wavelength converter shown in FIG. 3.

Referring back to FIG. 3, the two-step wavelength converters 3013 and 3015 are converters that convert the wavelengths of multiplexed optical signals in bulk in two steps. FIG. 6 is a functional configuration diagram of the two-step wavelength converters 3013 and 3015. As shown in FIG. 6, each of the two-step wavelength converters 3013 and 3015 includes variable wavelength light sources 3030 and 3033, bulk wavelength converters 3031 and 3034, optical wavelength filters 3032 and 3035, and a temperature controller 3036.

The variable wavelength light sources 3030 and 3033 are light sources that generate optical signals of various wavelengths, and respectively output the generated optical signals to the bulk wavelength converters 3031 and 3034, as excitation light. The bulk wavelength converters 3031 and 3034 are wavelength conversion elements such as a PPLN, and also converters that convert the wavelengths of the optical signals in bulk, depending on the wavelength of the excitation light that is input by the variable wavelength light sources 3030 and 3033.

The optical wavelength filters 3032 and 3035 are filters that remove excitation light from the optical signals output from the bulk wavelength converters 3031 and 3034. The temperature controller 3036 is a controller that controls temperature of the two-step wavelength converters 3013 and 3015.

Figure 7:
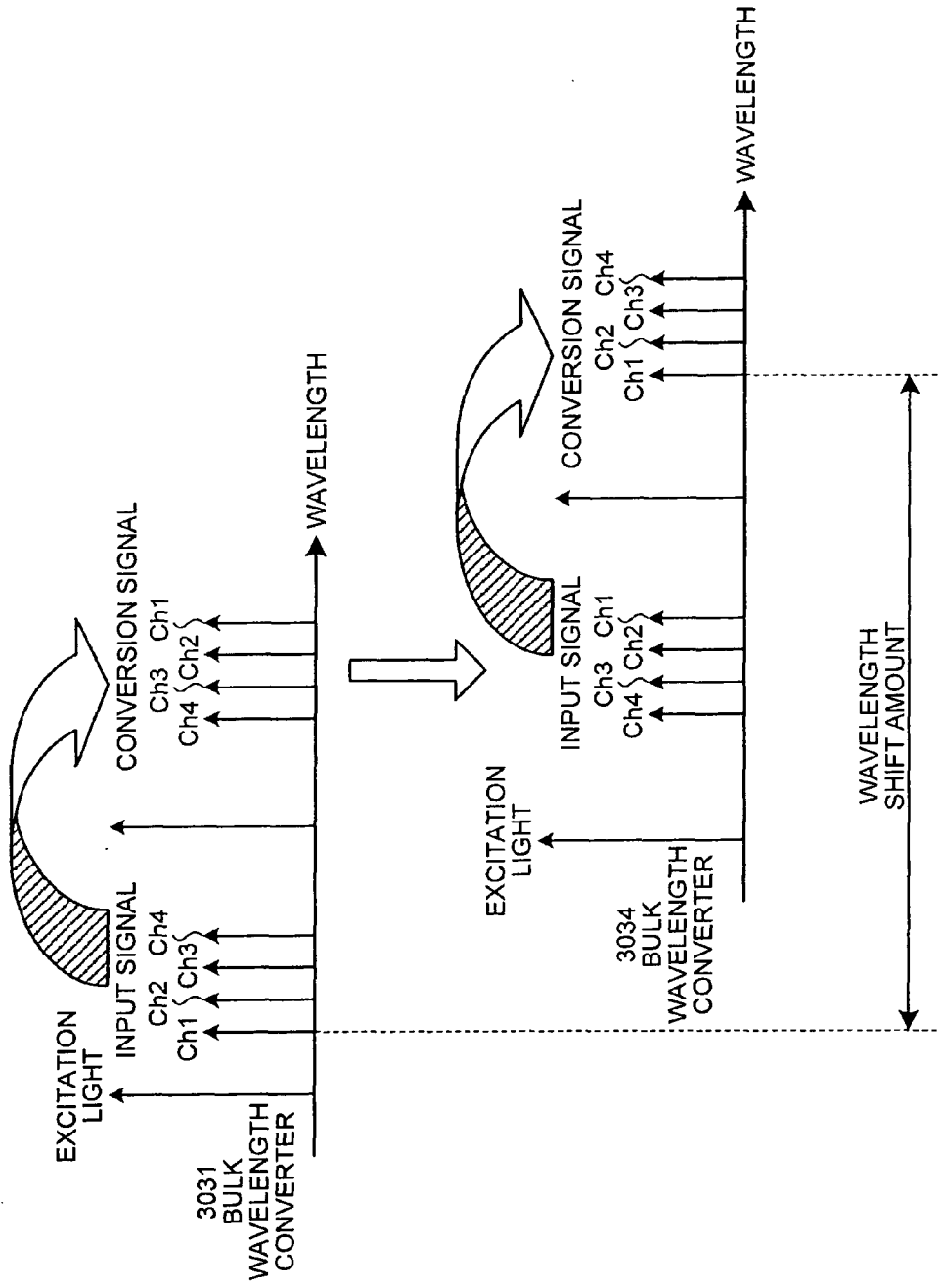
FIG. 7 is a first explanatory diagram of a conversion process performed by the two-step wavelength converters to convert wavelengths of multiplexed optical signals in bulk in two steps.
Figure 8:
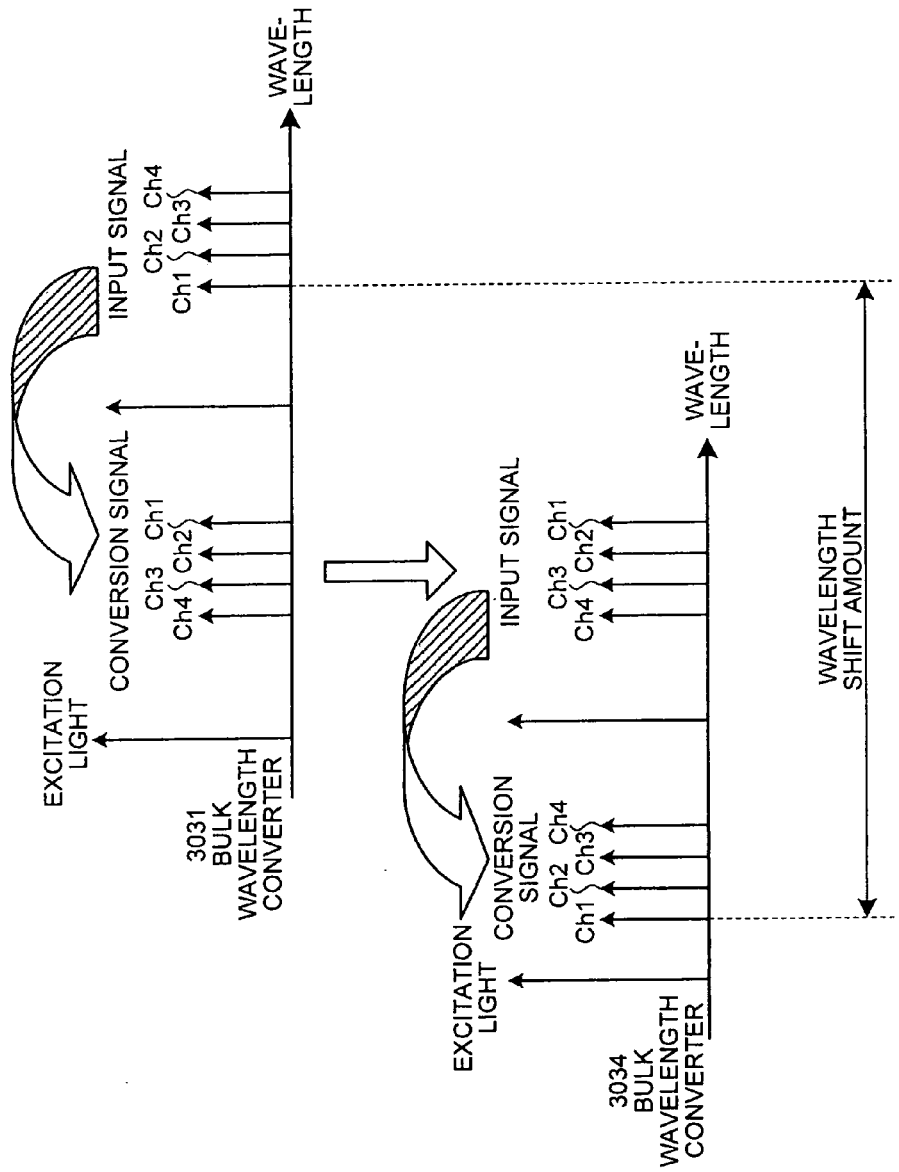
FIG. 8 is a second explanatory diagram of a conversion process performed by the two-step wavelength converters to convert wavelengths of multiplexed optical signals in bulk in two steps.

FIGS. 7 and 8 are first and second explanatory diagrams of a conversion process performed by the two-step wavelength converters 3013 and 3015 to convert the wavelengths of the multiplexed optical signals in bulk in two steps.

As shown in FIG. 7, the variable wavelength light source 3030 inputs excitation light to the bulk wavelength converter 3031. With the action of the bulk wavelength converter 3031, the wavelengths of input signals Ch1, Ch2, Ch3, and Ch4 are converted, and conversion signals Ch1, Ch2, Ch3, and Ch4 are generated. The conversion signals Ch1, Ch2, Ch3, and Ch4 each have a wavelength which can be represented by a symmetrical position to the wavelength of the corresponding input signal about the twice the wavelength of the input excitation light.

The conversion signals Ch1, Ch2, Ch3, and Ch4 respectively correspond to the input signals Ch1, Ch2, Ch3, and Ch4. If the wavelengths of the input signals Ch1, Ch2, Ch3, and Ch4 increase in an order of Ch1, Ch2, Ch3, and Ch4, the wavelengths of the conversion signals Ch1, Ch2, Ch3, and Ch4 decrease in this order.

When the conversion signals Ch1, Ch2, Ch3, and Ch4 are input into the bulk wavelength converter 3034 as input signals, the wavelengths of the input signals Ch1, Ch2, Ch3, and Ch4 are converted by the action of the bulk wavelength converter 3034, whereby conversion signals Ch1, Ch2, Ch3, and Ch4 are generated. The conversion signals Ch1, Ch2, Ch3, and Ch4 each have a wavelength which can be represented by a symmetrical position to the wavelength of the corresponding input signal about the twice the wavelength of the excitation light input by the variable wavelength light source 3033.

The conversion signals Ch1, Ch2, Ch3, and Ch4 respectively correspond to the input signals Ch1, Ch2, Ch3, and Ch4. If the wavelengths of the input signals Ch1, Ch2, Ch3, and Ch4 increase in an order of Ch4, Ch3, Ch2, and Ch1, the wavelengths of the conversion signals Ch1, Ch2, Ch3, and Ch4 increase in this order.

In this manner, when the two-step wavelength converters 3013 and 3015 are used, the wavelength can be shifted towards a larger side, only by a difference between the wavelength of the input signal Ch1 and the wavelength of the conversion signal Ch1. If the wavelengths of the input signals Ch1, Ch2, Ch3, and Ch4 are increased in an order of Ch1, Ch2, Ch3, and Ch4, the wavelengths of the conversion signals Ch1, Ch2, Ch3, and Ch4 that respectively correspond to the input signals Ch1, Ch2, Ch3, and Ch4, can be increased in an order of Ch1, Ch2, Ch3, and Ch4.

In each of the one-step wavelength converters 3010 and 3012 shown in FIG. 4, the wavelength is converted only once. Accordingly, if the wavelengths of the input signals Ch1, Ch2, Ch3, and Ch4 are increased in an order of Ch1, Ch2, Ch3, and Ch4, the wavelengths of the conversion signals Ch1, Ch2, Ch3, and Ch4 that respectively correspond to the input signals Ch1, Ch2, Ch3, and Ch4, are increased in an order of Ch4, Ch3, Ch2, and Ch1.

As shown in FIG. 8, the wavelength of the optical signal can be converted so as to decrease, by adjusting the wavelength of the excitation light. When the variable wavelength light source 3030 inputs excitation light to the bulk wavelength converter 3031, with the action of the bulk wavelength converter 3031, the wavelengths of input signals Ch1, Ch2, Ch3, and Ch4 are converted, and conversion signals Ch1, Ch2, Ch3, and Ch4 are generated. The conversion signals Ch1, Ch2, Ch3, and Ch4 each have a wavelength which can be represented by a symmetrical position to the wavelength of the corresponding input signal about the twice the wavelength of the input excitation light.

The conversion signals Ch1, Ch2, Ch3, and Ch4 respectively correspond to the input signals Ch1, Ch2, Ch3, and Ch4. If the wavelengths of the input signals Ch1, Ch2, Ch3, and Ch4 increase in an order of Ch1, Ch2, Ch3, and Ch4, the wavelengths of the conversion signals Ch1, Ch2, Ch3, and Ch4 decrease in this order.

When the conversion signals Ch1, Ch2, Ch3, and Ch4 are input into the bulk wavelength converter 3034 as input signals, the wavelengths of the input signals Ch1, Ch2, Ch3, and Ch4 are converted by the action of the bulk wavelength converter 3034, whereby conversion signals Ch1, Ch2, Ch3, and Ch4 are generated. The conversion signals Ch1, Ch2, Ch3, and Ch4 each have a wavelength which can be represented by a symmetrical position to the wavelength of the corresponding input signal about the twice the wavelength of the excitation light input by the variable wavelength light source 3033.

The conversion signals Ch1, Ch2, Ch3, and Ch4 respectively correspond to the input signals Ch1, Ch2, Ch3, and Ch4. If the wavelengths of the input signals Ch1, Ch2, Ch3, and Ch4 increase in an order of Ch4, Ch3, Ch2, and Ch1, the wavelengths of the conversion signals Ch1, Ch2, Ch3, and Ch4 increase in this order.

In this manner, when the two-step wavelength converters 3013 and 3015 are used, the wavelength can be shifted towards a smaller side, only by a difference between the wavelength of the input signal Ch1 and the wavelength of the conversion signal Ch1. If the wavelengths of the input signals Ch1, Ch2, Ch3, and Ch4 are increased in an order of Ch1, Ch2, Ch3, and Ch4, the wavelengths of the conversion signals Ch1, Ch2, Ch3, and Ch4 that respectively correspond to the input signals Ch1, Ch2, Ch3, and Ch4, can be increased in an order of Ch1, Ch2, Ch3, and Ch4.

In each of the one-step wavelength converters 3010 and 3012 shown in FIG. 4, the wavelength is converted only once. Accordingly, if the wavelengths of the input signals Ch1, Ch2, Ch3, and Ch4 are increased in an order of Ch1, Ch2, Ch3, and Ch4, the wavelengths of the conversion signals Ch1, Ch2, Ch3, and Ch4 that respectively correspond to the input signals Ch1, Ch2, Ch3, and Ch4, are increased in an order of Ch4, Ch3, Ch2, and Ch1.

As explained in FIGS. 7 and 8, the delay time difference between the optical signals can be adjusted by converting the wavelengths of the optical signals, and by making the optical signals with a converted wavelength pass through the dispersion compensation fibers 3011 and 3014, and the two-step wavelength converters 3013 and 3015 shown in FIG. 3.

Figure 9:
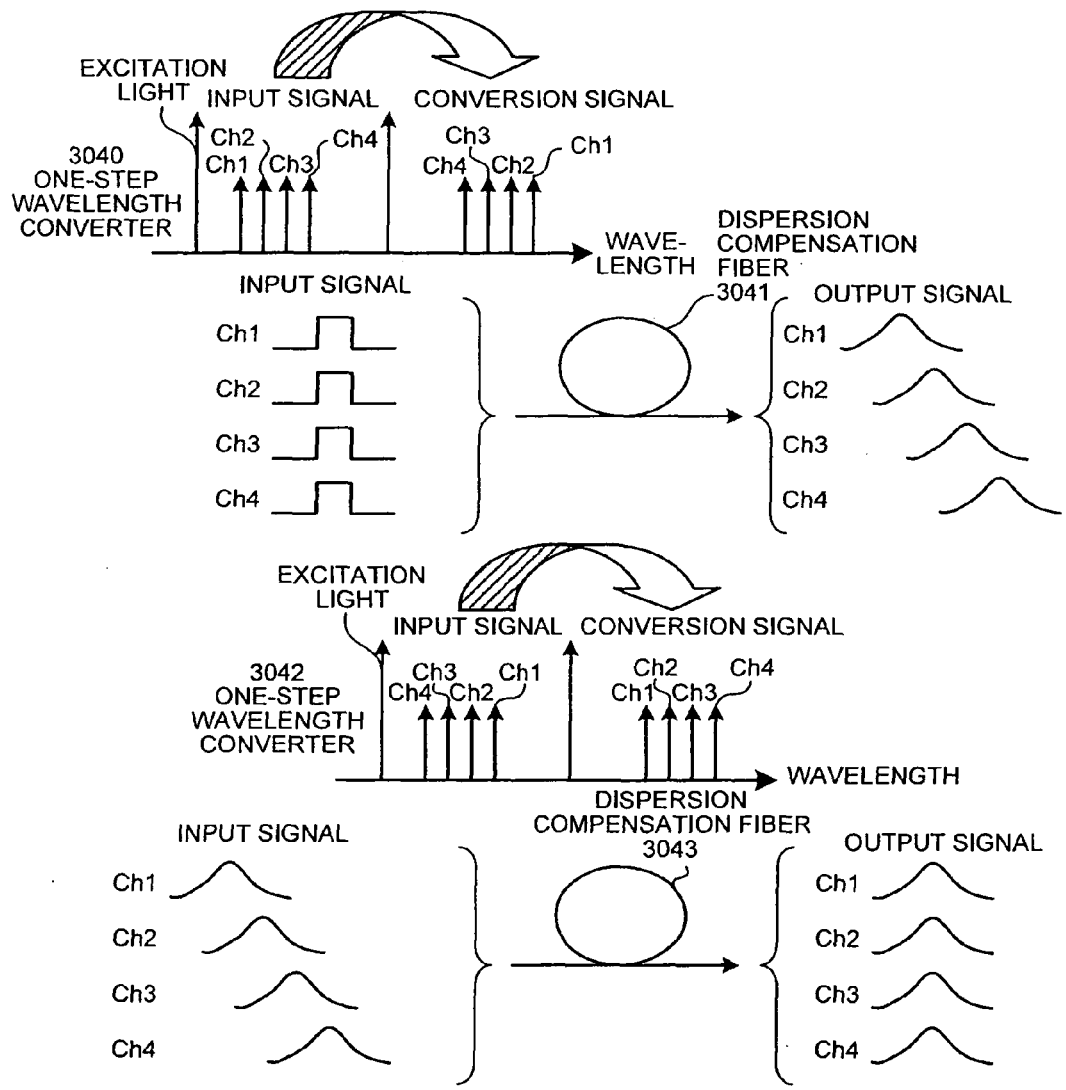
FIG. 9 is an explanatory diagram of functions of dispersion compensation fibers.

This will be explained with reference to FIGS. 9 through 12. FIG. 9 is an explanatory diagram of functions of dispersion compensation fibers 3041 and 3043. The dispersion compensation fibers 3041 and 3043 are considered to have the dispersion characteristics shown in FIG. 5.

As shown in FIG. 9, the input signals are converted into the conversion signals by using a one-step wavelength converter 3040 similar to the one shown in FIG. 4. In the input signals, the wavelengths increase in an order of Ch1, Ch2, Ch3, and Ch4. However, in the conversion signals, the wavelengths increase in an order of Ch4, Ch3, Ch2, and Ch1. If the conversion signals are made to pass through the dispersion compensation fiber 3041 that has the dispersion characteristics as shown in FIG. 5 the delay time increases as the wavelength of the input signal increases.

Next, the signals that have passed through the dispersion compensation fiber 3041 are considered to be input signals, and the input signals are converted into the conversion signals, using a one-step wavelength converter 3042 that is similar to the one shown in FIG. 4. In the input signals, the wavelengths increase in an order of Ch4, Ch3, Ch2, and Ch1. However, in the conversion signals, the wavelengths increase in an order of Ch1, Ch2, Ch3, and Ch4. When the conversion signals are made to pass through the dispersion compensation fiber 3043 that has the dispersion characteristics as shown in FIG. 5, the delay time difference between the respective signals Ch1, Ch2, Ch3, and Ch4 can be compensated. This is because the delay time increases as the wavelength of the input signal increases.

Figure 10:
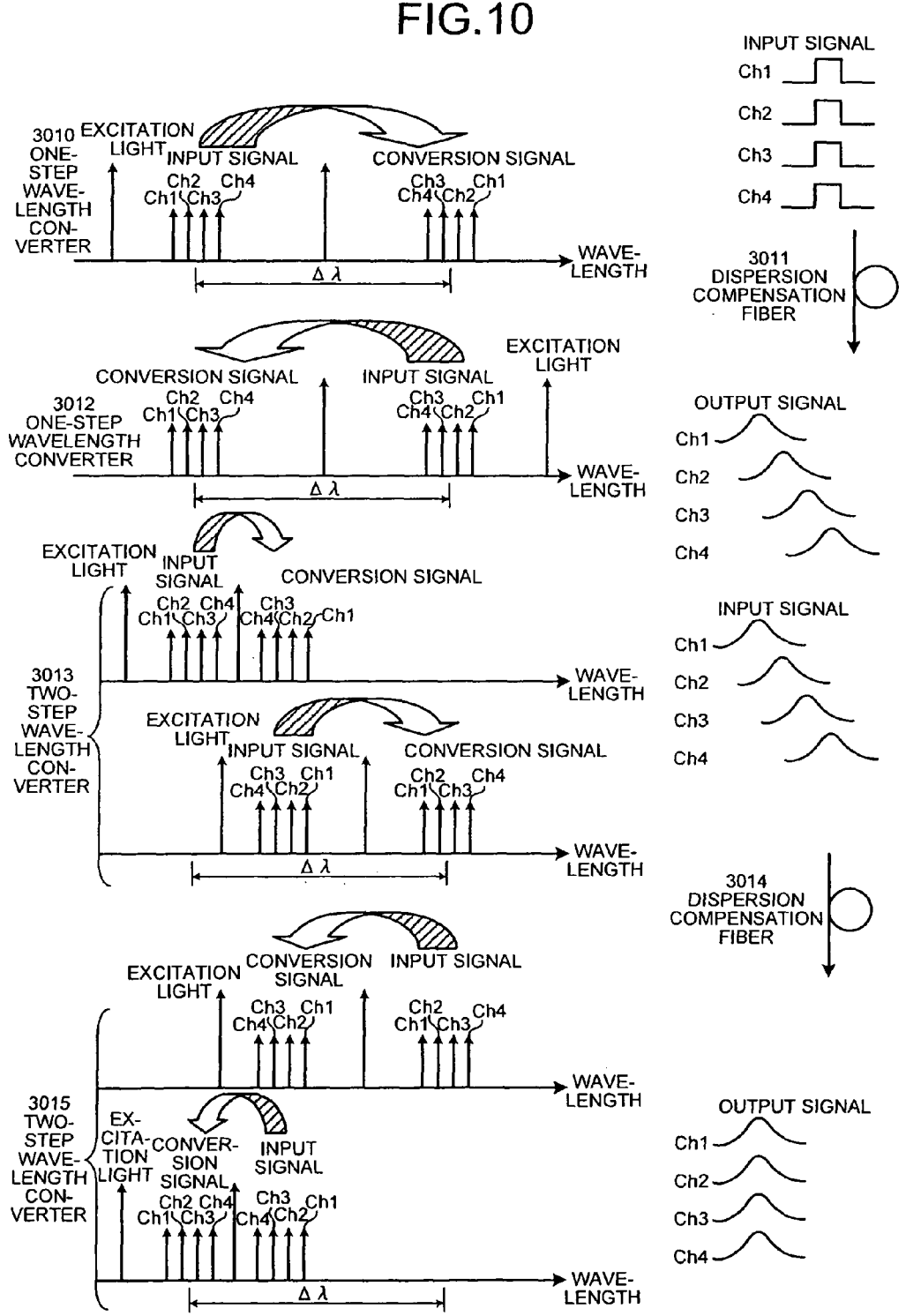
FIG. 10 is an explanatory diagram of a wavelength conversion process at the multi-wavelength light variable delay unit.

The same applies for the multi-wavelength light variable delay units 305a and 305b shown in FIG. 3. FIG. 10 is an explanatory diagram of a wavelength conversion process at the multi-wavelength light variable delay units 305a and 305b.

As shown in FIG. 10, the input signals Ch1, Ch2, Ch3, and Ch4 are considered to be input into the one-step wavelength converter 3010 of the multi-wavelength light variable delay units 305a and 305b. The wavelengths of the input signals Ch1, Ch2, Ch3, and Ch4 are considered to increase in this order. When the one-step wavelength converter 3010 converts the wavelengths of the input signals Ch1, Ch2, Ch3, and Ch4, the wavelengths of the conversion signals Ch1, Ch2, Ch3, and Ch4 decrease in this order.

Then, the conversion signals Ch1, Ch2, Ch3, and Ch4 are made to pass through the dispersion compensation fiber 3011 that has the dispersion characteristics as shown in FIG. 5, where the delay time increases as the wavelength of the input signal increases. The delay time of the entire conversion signals Ch1, Ch2, Ch3, and Ch4 can be adjusted, by changing a wavelength shift amount $\Delta\lambda$.

The one-step wavelength converter 3012 converts the wavelengths of the conversion signals Ch1, Ch2, Ch3, and Ch4. The magnitude relationship of the wavelengths of the conversion signals Ch1, Ch2, Ch3, and Ch4 are reverse to the wavelengths of the input signals Ch1, Ch2, Ch3, and Ch4. If a wavelength shift amount is $\Delta\lambda$, the wavelengths of the conversion signals Ch1, Ch2, Ch3, and Ch4 can be made the same as the wavelengths of the input signals Ch1, Ch2, Ch3, and Ch4 of the one-step wavelength converter 3010.

Subsequently, the two-step wavelength converter 3013 receives the conversion signals Ch1, Ch2, Ch3, and Ch4 output from the one-step wavelength converter 3012, as input signals. The two-step wavelength converter 3013 converts the wavelengths in two steps, thereby generating the conversion signals Ch1, Ch2, Ch3, and Ch4. Because the two-step wavelength converter 3013 converts the wavelength in two steps, the magnitude relationship of the wavelengths of the input signals Ch1, Ch2, Ch3, and Ch4, and the magnitude relationship of the wavelengths of the conversion signals Ch1, Ch2, Ch3, and Ch4 that are output eventually does not change.

When the conversion signals Ch1, Ch2, Ch3, and Ch4 are made to pass through the dispersion compensation fiber 3014 that has the dispersion characteristics as shown in FIG. 5, the delay time increases as the wavelength of the input signal increases. Accordingly, the delay time among the signals Ch1, Ch2, Ch3, and Ch4 generated at the dispersion compensation fiber 3011 can be cancelled. Further, the delay time of the entire signals Ch1, Ch2, Ch3, and Ch4 can be adjusted, by changing the wavelength shift amount $\Delta\lambda$.

The delay time differences among the respective signals Ch1, Ch2, Ch3, and Ch4 are cancelled, by making the wavelength shift amounts in the wavelength conversion in the one-step wavelength converters 3010 and 3012, and the two-step wavelength converters 3013 and 3015 the same. Alternatively, the respective signals Ch1, Ch2, Ch3, and Ch4 can be output in a state that the delay time difference exists, by changing the shift amount.

Figure 11:
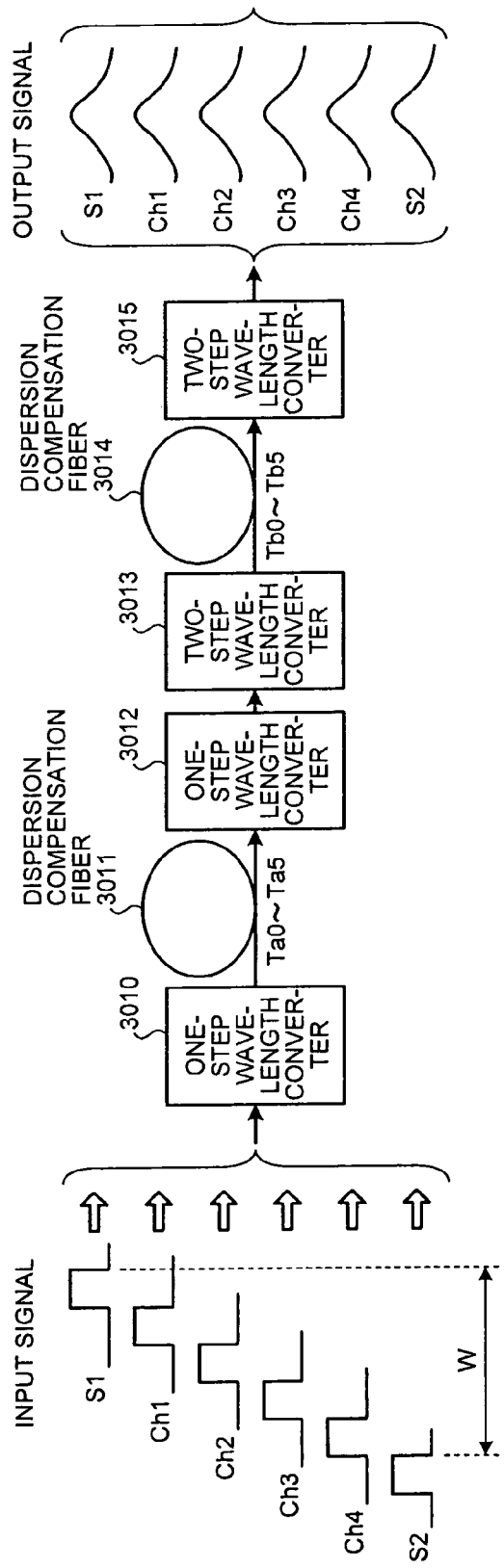
FIG. 11 is an explanatory diagram of a delay time difference absorbing process performed by the multi-wavelength light variable delay unit.

In the present embodiment, the delay time difference of the optical signals that have passed through the redundant 0-system optical fiber line 50 and the 1-system optical fiber line 60 is absorbed, by using the principle described with reference to FIGS. 9 and 10. FIG. 11 is an explanatory diagram of a delay time difference absorbing process performed by the multi-wavelength light variable delay units 305a and 305b. In FIG. 11, a transmission route of an optical signal of one of the 0-system and the 1-system is shown.

As shown in FIG. 11, when the respective input signals S1, Ch1, Ch2, Ch3, Ch4, and S2 that have a maximum delay time difference W are input into the one-step wavelength converter 3010, the one-step wavelength converter 3010 converts the wavelengths of the input signals S1, Ch1, Ch2, Ch3, Ch4, and S2. The dispersion compensation fiber 3011 then generates delays of the respective times Ta0, Ta1, Ta2, Ta3, Ta4, and Ta5, according to the wavelengths of the respective input signals S1, Ch1, Ch2, Ch3, Ch4, and S2.

Among the wavelengths of the respective input signals S1, Ch1, Ch2, Ch3, Ch4, and S2, a wavelength spacing between the adjacent wavelengths is made equal. The signals S1 and S2 are delay adjustment signals that are generated by the delay adjustment light source 200 of the branching apparatus 20.

The wavelengths of the signals S1, Ch1, Ch2, Ch3, Ch4, and S2 output from the dispersion compensation fiber 3011 are converted by the one-step wavelength converter 3012, and the resulting signals are input into the two-step wavelength converter 3013. The two-step wavelength converter 3013 then converts the wavelengths of the signals S1, Ch1, Ch2, Ch3, Ch4, and S2. The dispersion compensation fiber 3014 generates the delays of the respective times of Tb0, Tb1, Tb2, Tb3, Tb4, and Tb5, according to the wavelengths of the respective signals S1, Ch1, Ch2, Ch3, Ch4, and S2.

Therefore, delay times T0, T1, T2, T3, T4, and T5 of the respective signals S1, Ch1, Ch2, Ch3, Ch4, and S2, when the signals S1, Ch1, Ch2, Ch3, Ch4, and S2 pass through one of the multi-wavelength light variable delay units 305a and 305b, may be respectively expressed as follows:

$S1: T0 = Ta0 + Tb0$, $Ch1: T1 = Ta1 + Tb1$, $Ch2: T2 = Ta2 + Tb2$, $Ch3: T3 = Ta3 + Tb3$, $Ch4: T4 = Ta4 + Tb4$, $S2: T5 = Ta5 + Tb5$.

By changing the wavelengths of the signals S1, Ch1, Ch2, Ch3, Ch4, and S2, the delay times Ta0, Ta1, Ta2, Ta3, Ta4, and Ta5, and the delay times Tb0, Tb1, Tb2, Tb3, Tb4, and Tb5 can be set variably, according to the wavelength dispersion characteristics of the dispersion compensation fibers 3011 and 3014 shown in FIG. 5.

Therefore, when the one-step wavelength converters 3010 and 3012, and the two-step wavelength converters 3013 and 3015 convert the wavelengths, a wavelength shift amount is determined so that the delay times T0, T1, T2, T3, T4, and T5 are as follows:

$S1: T0 = Ta0 + Tb0 = W + D$ $Ch1: T1 = Ta1 + Tb1 = 4/5 W + D$, $Ch2: T2 = Ta2 + Tb2 = 3/5 W + D$, $Ch3: T3 = Ta3 + Tb3 = 2/5 W + D$, $Ch4: T4 = Ta4 + Tb4 = 1/5 W + D$, $S2: T5 = Ta5 + Tb5 = D$.

In the above, D indicates a delay time of the entire signals S1, Ch1, Ch2, Ch3, Ch4, and S2.

Through the wavelength conversion by the one-step wavelength converters 3010 and 3012 and the two-step wavelength converters 3013 and 3015, the delay time difference among the respective signals S1, Ch1, Ch2, Ch3, Ch4, and S2 can be absorbed, and the delay time of the entire signals S1, Ch1, Ch2, Ch3, Ch4, and S2 can be adjusted to a predetermined value D. By performing such a process at both routes of the 0-system and the 1-system, the delay time difference of the signals of the 0-system and the 1-system can be absorbed.

The adjustment of the delay time difference will be explained in further detail. The dispersion characteristic curve of the dispersion compensation fibers 3011 and 3014 shown in FIG. 5 will be indicated by F(x). Here, x indicates a wavelength.

In this case, when a signal whose wavelength is included in a predetermined wavelength band passes through the dispersion compensation fiber 3011, the delay time Ta is expressed as follows:

$Ta = dF(x)/dx|_{x=H} \Delta x + F(H)$.

In the above formula, H indicates the center wavelength of the wavelength band of each signal on which the wavelength conversion is performed by the one-step wavelength converter 3010, $\Delta x$ indicates a difference between the wavelength H and a wavelength of a certain signal included in the wavelength band, and $dF(x)/dx|_{x=H}$ indicates an inclination of the dispersion characteristic curve F(x) that corresponds to the wavelength H. Therefore, $dF(x)/dx|_{x=H}\Delta x$ is a delay time difference between a signal that has the wavelength H and a signal that has the wavelength $H+\Delta x$. Further, F(H) indicates a delay time of a signal that has the wavelength H.

Similarly, when the wavelength of a signal whose wavelength is included in a predetermined wavelength band is converted, and the resulting signal passes through the dispersion compensation fiber 3104, a delay time Tb is expressed as follows:

$Tb = dF(x)/dx|_{x=L} \Delta x + F(L)$

In the above formula, L indicates the center wavelength of the wavelength band of each signal on which the wavelength conversion is performed by the two-step wavelength converter 3013, $\Delta x$ indicates a difference between a wavelength L and a wavelength of a certain signal included in the wavelength band, and $dF(x)/dx|_{x=L}$ indicates an inclination of the dispersion characteristic curve F(x) corresponding to the wavelength L. Therefore, $dF(x)/dx|_{x=L}\Delta x$ is a delay time difference between a signal that has the wavelength L and a signal that has the wavelength L+Δx. Further, F(L) indicates a delay time of the signal that has the wavelength L.

Accordingly, the delay time T, when the signal passes through the dispersion compensation fiber 3011 and the dispersion compensation fiber 3014, is expressed as follows:

$$T = dF(x)/dx|_{x=H}\Delta x + F(H) + dF(x)/dx|_{x=L}\Delta x + F(L)$$
$$= (dF(x)/dx|_{x=H} + dF(x)/dx|_{x=L})\Delta x + F(H) + F(L)$$
$$= (A1 + A2)\Delta x + B1 + B2.$$

In the above formula, $$A1 = dF(x)/dx|_{x=H},$$

$$A2 = dF(x)/dx|_{x=L},$$

$$B1 = F(H),$$

$$B2 = F(L).$$

As can be seen from the formula, when F(x) is a function of x of an order equal to or higher than 2, dF(x)/dx is a function of x of an order equal to or higher than 1. In other words, A1+A2 is a function of H and L of an order equal to or higher than 1, and B1+B2 is a function of H and L of an order equal to or higher than 2.

In the above formula, (A1+A2)Δx indicates a delay time difference between a signal whose wavelength was H and a signal whose wavelength was H+Δx before passing through the dispersion compensation fibers 3011 and 3014, after having passed through the dispersion compensation fibers 3011 and 3014, and B1+B2 indicates a delay time of a signal whose wavelength was H before passing through the dispersion compensation fibers 3011 and 3014, after having passed through the dispersion compensation fibers 3011 and 3014.

By converting the wavelength of the signal and making the signal pass through the dispersion compensation fibers 3011 and 3014, the delay time B1+B2 of the signal can be adjusted, while the delay time difference (A1+A2)Δx between the signals is kept constant. Here, Δx indicates a constant value. Alternatively, (A1+A2)Δx can be adjusted, while B1+B2 is kept constant.

For example, when $F(x)=x^2$, $$(A1+A2)\Delta x = 2(H+L)\Delta x,$$

$$B1+B2 = H^2+L^2.$$

Therefore, by adjusting the wavelengths H and L, the delay time of the entire signals, i.e., $B1+B2=H^2+L^2=H^2+(C/2/\Delta x-H)^2$ can be changed continuously, while the time delay difference 2(H+L)Δx between the signals is kept constant (i.e., 2(H+L)Δx=C, where C is a constant value). On the contrary, (A1+A2)Δx can be changed continuously, without changing the delay time of the entire signals (i.e., $(H^2+L^2)=C$, where C is a constant value).

Accordingly, the delay time difference among the multiplexed signals S1, Ch1, Ch2, Ch3, Ch4, and S2 that have passed through one of the 0-system optical fiber line 50 and the 1-system optical fiber line 60 can be absorbed. Further, the delay time difference between the signal that has passed through the 0-system optical fiber line 50 and the signal that has passed trough the 1-system optical fiber line 60 can be absorbed.

In the example shown in FIG. 11, the delay time difference among the multiplexed signals S1, Ch1, Ch2, Ch3, Ch4, and S2 that have passed through one of the 0-system optical fiber line 50 and the 1-system optical fiber line 60 is absorbed. However, even if the delay time difference exists among the signals S1, Ch1, Ch2, Ch3, Ch4, and S2, if there is no delay time difference between the corresponding signals (i.e., between S1s, between Ch1s, between Ch2s, between Ch3s, between Ch4s, and between S2s) of the 0-system signals S1, Ch1, Ch2, Ch3, Ch4, and S2, and the 1-system signals S1, Ch1, Ch2, Ch3, Ch4, and S2, the apparatus can work sufficiently as a hitless protection switching apparatus.

Figure 12:
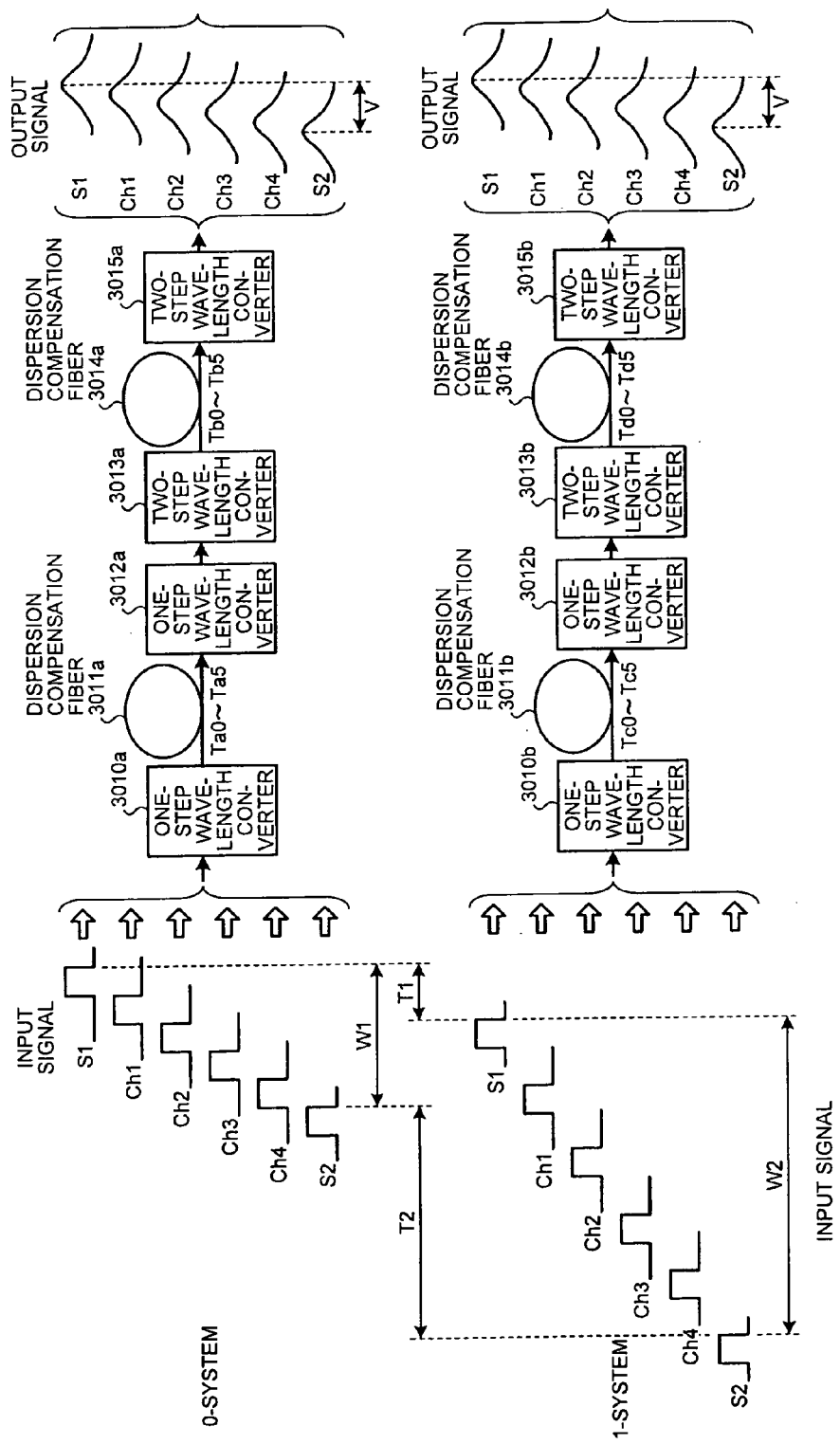
FIG. 12 is an explanatory diagram of a modification of a delay difference absorbing process performed by the multi-wavelength light variable delay units.

FIG. 12 is an explanatory diagram of a modification of the delay difference absorbing process performed by the multi-wavelength light variable delay units 305a and 305b. In this example, the delay time difference T1 is generated between the 0-system signal S1 and the 1-system signal S1, and the delay time difference T2 is generated between the 0-system signal S2 and the 1-system signal S2. Further, a delay time difference W1 is generated in the 0-system signals S1, Ch1, Ch2, Ch3, Ch4, and S2, and a delay time difference W2 is generated in the 1-system signals S1, Ch1, Ch2, Ch3, Ch4, and S2.

Even in such case, as explained in FIG. 11, through the wavelength conversion by the one-step wavelength converters 3010 and 3012 and the two-step wavelength converters 3013 and 3015, the delay time difference between the corresponding signals (between S1s, between Ch1s, between Ch2s, between Ch3s, between Ch4s, and between S2s) of the 0-system signals S1, Ch1, Ch2, Ch3, Ch4, and S2, and the 1-system signals S1, Ch1, Ch2, Ch3, Ch4, and S2 can be absorbed.

However, in this case, the absorption of the delay time difference in the 0-system signals S1, Ch1, Ch2, Ch3, Ch4, and S2, and the absorption of the delay time difference in the 1-system signals S1, Ch1, Ch2, Ch3, Ch4, and S2 are not performed.

The following may be performed to absorb the delay difference W1 in the 0-system signals, the delay difference W2 in the 1-system signals, and the delay difference T1 between the 0-system signal and the 1-system signal. As shown in FIG. 12, the delay times of the respective input signals S1, Ch1, Ch2, Ch3, Ch4, and S2 that are generated at a 0-system dispersion compensation fiber 3011a are made to be Ta0, Ta1, Ta2, Ta3, Ta4, and Ta5, respectively. The delay times of the respective input signals S1, Ch1, Ch2, Ch3, Ch4, and S2 that are generated at a 0-system dispersion compensation fiber 3014a are made to be Tb0, Tb1, Tb2, Tb3, Tb4, and Tb5, respectively.

The wavelength spacing between the adjacent wavelengths of the respective input signals S1, Ch1, Ch2, Ch3, Ch4, and S2 are made equal. The signals S1 and S2 are delay adjustment signals that are generated by the delay adjustment light source 200 of the branching apparatus 20.

The delay times of the respective input signals S1, Ch1, Ch2, Ch3, Ch4, and S2 generated at a 1-system dispersion compensation fiber 3011b are made to be Tc0, Tc1, Tc2, Tc3, Tc4, and Tc5, respectively, and the delay times of the respective input signals S1, Ch1, Ch2, Ch3, Ch4, and S2 generated at a 1-system dispersion compensation fiber 3014b are made to be Td0, Td1, Td2, Td3, Td4, and Td5, respectively.

Accordingly, the delay times of the respective input signals S1, Ch1, Ch2, Ch3, Ch4, and S2 generated at the 0-system dispersion compensation fibers 3011a and 3014a are respectively expressed as follows:

$$S1:T0=Ta0+Tb0,$$

$$Ch1:T1=Ta1+Tb1,$$

$$Ch2:T2=Ta2+Tb2,$$

$$Ch3:T3=Ta3+Tb3,$$

$$Ch4:T4=Ta4+Tb4,$$

$$S2:T5=Ta5+Tb5.$$

The delay times of the respective input signals S1, Ch1, Ch2, Ch3, Ch4, and S2 generated at the 1-system dispersion compensation fibers 3011b and 3014b are respectively expressed as follows:

$$S1:T0=Tc0+Td0,$$

$$Ch1:T1=Tc1+Td1,$$

$$Ch2:T2=Tc2+Td2,$$

$$Ch3:T3=Tc3+Td3,$$

$$Ch4:T4=Tc4+Td4,$$

$$S2:T5=Tc5+Td5.$$

The delay times Ta0, Ta1, Ta2, Ta3, Ta4, and Ta5, the delay times Tb0, Tb1, Tb2, Tb3, Tb4, and Tb5, the delay times Tc0, Tc1, Tc2, Tc3, Tc4, and Tc5, and the delay times Td0, Td1, Td2, Td3, Td4, and Td5 can be variably set through the changes in the wavelengths of the signals S1, Ch1, Ch2, Ch3, Ch4, and S2 according to the wavelength dispersion characteristics of the dispersion compensation fibers 3011a, 3011b, 3014a, and 3014b as shown in FIG. 5.

Therefore, one-step wavelength converters 3010a and 3012a, and two-step wavelength converters 3013a and 3015a of the 0-system, when converting wavelengths, determine a wavelength shift amount so that the delay times T0, T1, T2, T3, T4, and T5 are as follows:

$$S1:T0=Ta0+Tb0=W1+D1,$$

$$Ch1:T1=Ta1+Tb1=\tfrac{4}{5}W1+D1,$$

$$Ch2:T2=Ta2+Tb2=\tfrac{3}{5}W1+D1,$$

$$Ch3:T3=Ta3+Tb3=\tfrac{2}{5}W1+D1,$$

$$Ch4:T4=Ta4+Tb4=\tfrac{1}{5}W1+D1,$$

$$S2:T5=Ta5+Tb5=D1.$$

Here, D1 indicates a delay amount of the entire signals S1, Ch1, Ch2, Ch3, Ch4, and S2. This enables to absorb the delay difference in the 0-system signals (in other words, V=0 at an output signal).

One-step wavelength converters 3010b and 3012b, and two-step wavelength converters 3013b and 3015b of the 1-system, when converting wavelengths, determine a wavelength shift amount, so that the delay times T0, T1, T2, T3, T4, and T5 are as follows:

$$S1:T0=Tc0+Td0=W2+D2,$$

$$Ch1:T1=Tc1+Td1=\tfrac{4}{5}W2+D2,$$

$$Ch2:T2=Tc2+Td2=\tfrac{3}{5}W2+D2,$$

$$Ch3:T3=Tc3+Td3=\tfrac{2}{5}W2+D2,$$

$$Ch4:T4=Tc4+Td4=\tfrac{1}{5}W2+D2,$$

$$S2:T5=Tc5+Td5=D2.$$

Here, D2 indicates a delay amount of the entire signals S1, Ch1, Ch2, Ch3, Ch4, and S2. This enables to absorb the delay difference in the 1-system signals (in other words, V=0 at an output signal).

The delay difference between the 0-system signal and the 1-system signal can also be absorbed, by determining a wavelength shift amount so that a following formula is satisfied:

$$D2=W1+D1-W2-T1.$$

Referring back to FIG. 3, the temperature controllers 3016 and 3017 are controllers that control temperatures of the one-step wavelength converters 3010 and 3012, the dispersion compensation fibers 3011 and 3014, and the two-step wavelength converters 3013 and 3015.

Referring back to FIG. 1, the delay amount constant dispersion compensating units 306a and 306b are compensating units that compensate signal waveform distortion, without changing a transmission delay amount of a signal. More particularly, the delay amount constant dispersion compensating units 306a and 306b compensate signal waveform distortion, by using a fiber Bragg grating (FBG) dispersion compensation fiber and a Virtually Imaged Phased Array (VIPA) type dispersion compensating unit.

Figure 13:
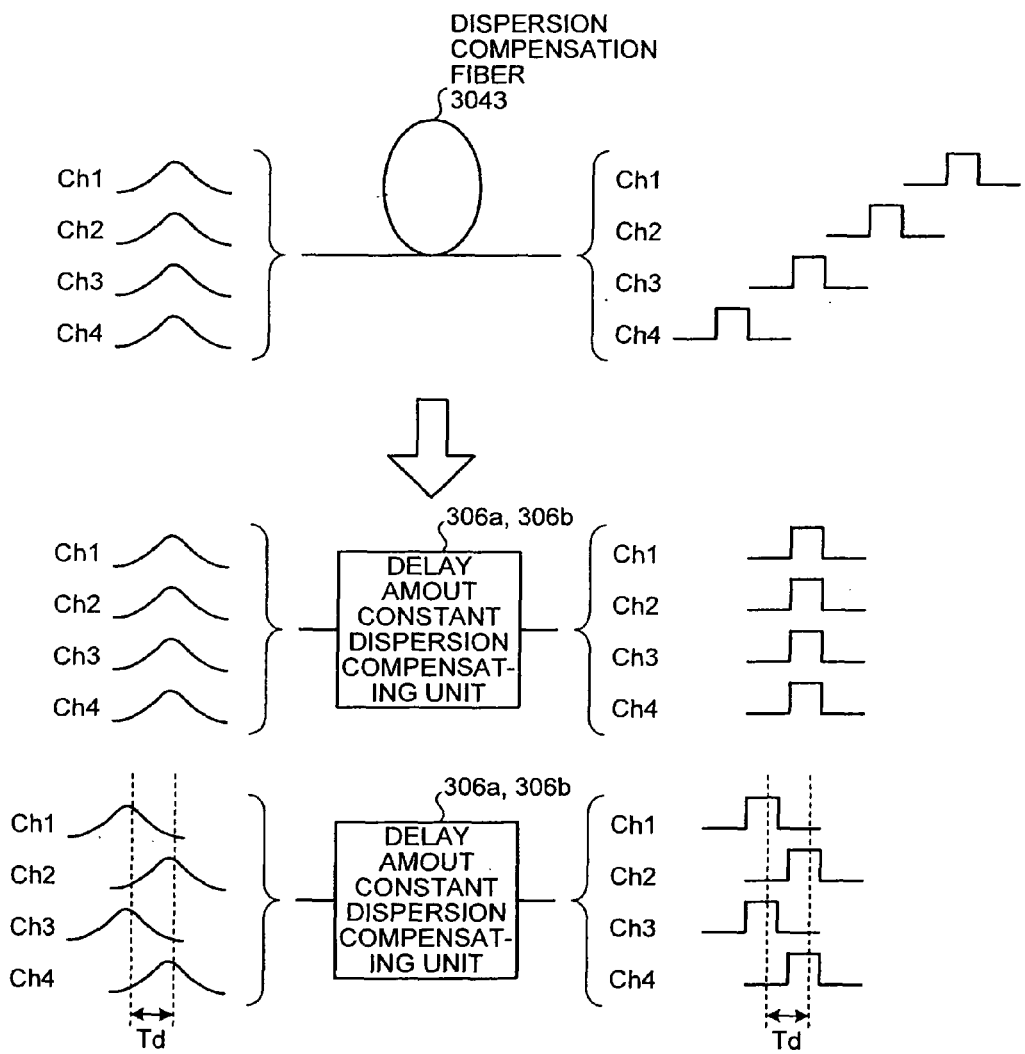
FIG. 13 is an explanatory diagram of a signal-waveform distortion correction process performed by delay amount constant dispersion compensating units.

FIG. 13 is an explanatory diagram of a signal-waveform distortion correction process performed by the delay amount constant dispersion compensating units 306a and 306b. In the present embodiment, the multi-wavelength light variable delay units 305a and 305b convert a wavelength of a signal, and adjust a delay amount of the signal by using the wavelength dispersion characteristics of the dispersion compensation fibers 3011 and 3014. Therefore, the signal waveform distortion increases according to a delay adjustment amount.

As shown in FIG. 13, when the signal waveform distortion is corrected simply by the dispersion compensation fiber 3043, the delay adjustment amount between the signals are cancelled, and the delay time difference is generated once again. The delay time difference generated at this point changes depending on the length of the dispersion compensation fiber 3043.

Figure 14:
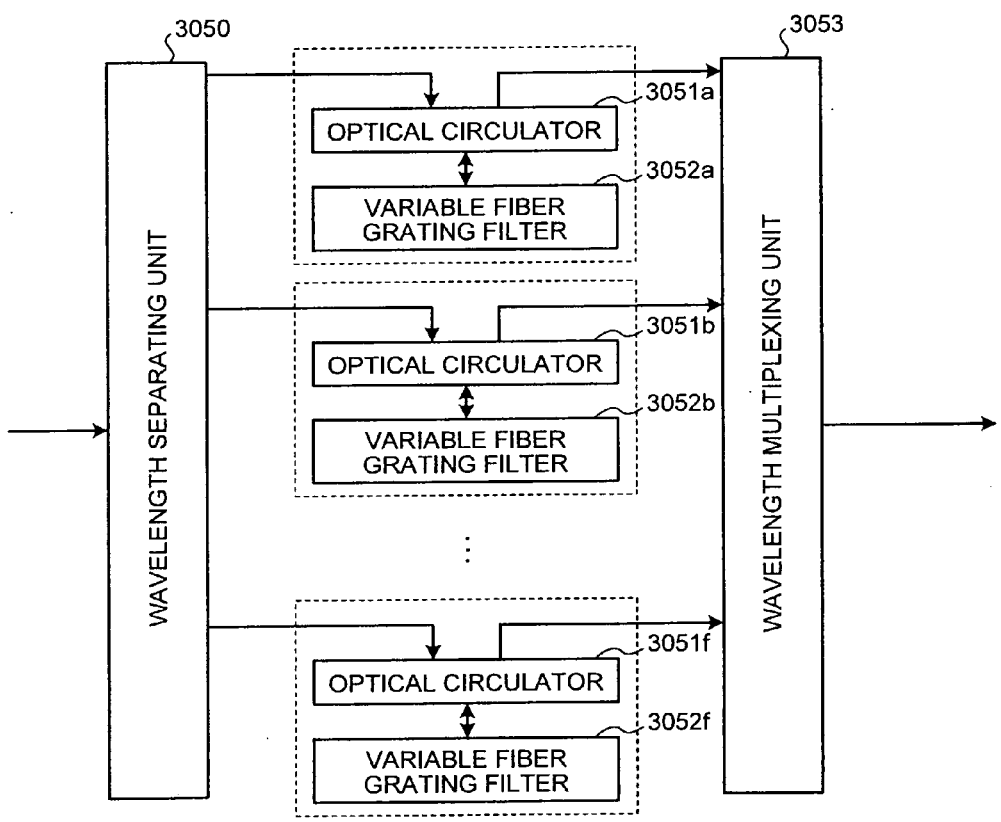
FIG. 14 is a functional configuration diagram of the delay amount constant dispersion compensating unit using a fiber Bragg grating dispersion compensation fiber.

Therefore, in the present embodiment, the delay amount constant dispersion compensating units 306a and 306b compensate the signal waveform distortion, without changing the delay amount of the signal. FIG. 14 is a functional configuration diagram of the delay amount constant dispersion compensating units 306a and 306b using a fiber Bragg grating dispersion compensation fiber.

As shown in FIG. 14, each of the delay amount constant dispersion compensating units 306a and 306b includes a wavelength separating unit 3050, optical circulators 3051a through 3051f, variable fiber grating filters 3052a through 3052f, and a wavelength multiplexing unit 3053.

The wavelength separating unit 3050 is a processing unit that separates a plurality of multiplexed signals with different wavelengths by each wavelength. The optical circulators 3051a through 3051f are processing units that output the signals separated for each wavelength to the variable fiber grating filters 3052a through 3052f, that are connected to the optical circulators 3051a through 3051f, respectively. The optical circulators 3051a through 3051f also output the signals respectively output from the variable fiber grating filters 3052a through 3052f, to the wavelength multiplexing unit 3053.

The variable fiber grating filters 3052a through 3052f are processing units that compensate dispersion of a signal, using the fiber Bragg grating that can vary dispersion characteristics, by changing a bend, a stress, and an environmental temperature, for example.

Figure 15:
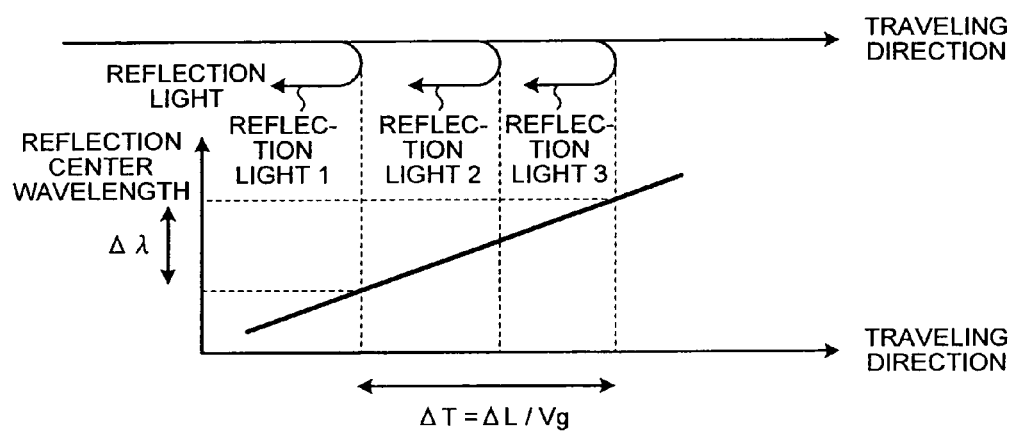
FIG. 15 is an explanatory diagram of dispersion compensation with a fiber Bragg grating.

FIG. 15 is an explanatory diagram of dispersion compensation using a fiber Bragg grating. As shown in FIG. 15, the fiber Bragg grating reflects a signal with a specified wavelength, by changing a refractive index of a waveguide at a specified cycle. The wavelength dispersion can be compensated, by changing the cycle step-by-step, and shifting a reflection point where the signal is reflected depending on the wavelength.

The correction amount of the wavelength dispersion is $\Delta T/\Delta\lambda$(ps/nm). Here, $\Delta T$ is a delay time difference between a reflection light 1 and a reflection light 3 that can be obtained by dividing a distance $\Delta L$ by a group velocity Vg of a signal. The distance $\Delta L$ is a distance between a reflection point of the reflection light 1 and a reflection point of the reflection light 3. Further, $\Delta\lambda$ is a difference between a wavelength of the reflection light 1 and a wavelength of the reflection light 3.

By using the variable fiber grating filters 3052a through 3052f as shown in FIG. 15, the signal waveform distortion of each signal that is separated by the wavelength separating unit 3050 can be compensated.

Referring back to FIG. 14, the wavelength multiplexing unit 3053 is a processing unit that receives signals with different wavelengths whose signal waveform distortion is corrected, from the optical circulators 3051a through 3051f, and multiplexes each signal.

By using such delay amount constant dispersion compensating units 306a and 306b, the delay amount of each signal can be made constant, by adjusting the optical circulators 3051a through 3051f and the variable fiber grating filters 3052a through 5052f so that the time of an output of a signal from the wavelength separating unit 3050 until the time of an input into the wavelength multiplexing unit 3053 is the same for each signal.

The VIPA type dispersion compensating unit can also be used, instead of the fiber Bragg grating dispersion compensation fiber, to compensate the signal waveform distortion without changing the delay amount of the signal. In this case, a curved mirror is used to reflect the signal. The signal waveform distortion is corrected according to the shape of the curved mirror.

Referring back to FIG. 1, the former-stage variable attenuators 308a and 308b are processing units that adjust an intensity level of a signal. More particularly, the former-stage variable attenuators 308a and 308b adjust the intensity levels of the signals of the 0-system and the 1-system so as to be the same. However, the adjustment of the intensity level is not performed during a signal interruption.

The wavelength separating units 309a and 309b are separating units that separate two delay adjustment signals with different wavelengths included in each of the 0-system signal and the 1-system signal, and transmit the separated signal to the controller 314.

The latter-stage variable attenuators 310a and 310b are processing units that adjust an intensity level of a signal, similarly to the former-stage variable attenuators 308a and 308b. The latter-stage variable attenuators 310a and 310b adjust the intensity levels of the signals of the 0-system and the 1-system, so as to eliminate a fluctuation of the intensity level of the signal output from the multiplexer 313, when a signal interruption occurs in one of the 0-system optical fiber line 50 and the 1-system optical fiber line 60.

Figure 16:
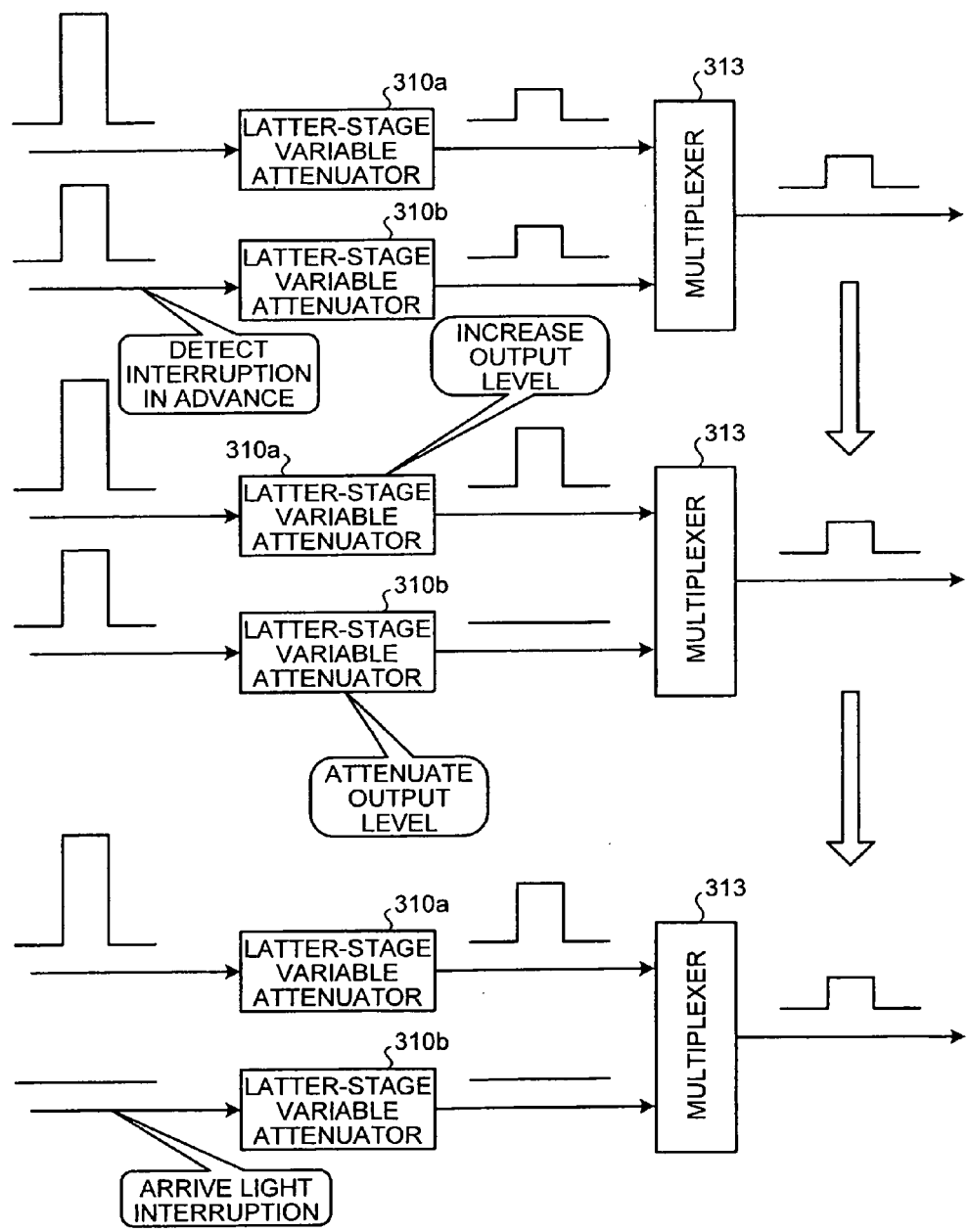
FIG. 16 is an explanatory diagram of a first method to adjust an intensity level of a signal.

There are several ways to adjust an intensity level of a signal. FIG. 16 is an explanatory diagram of a first method to adjust an intensity level of a signal. A case where a signal interruption occurs in the 1-system will be explained here.

As shown in FIG. 16, in the first method, when a signal interruption is detected by the light interruption detecting unit 311, the latter-stage variable attenuator 310b of the 1-system, where the signal interruption occurs, attenuates an output level of the signal before the signal is being interrupted. Then, the 0-system latter-stage variable attenuator 310a increases the output level of the signal.

A signal route of the hitless protection switching apparatus 30 is designed so that the time from when the light interruption detecting unit 311 detects a signal interruption until when an adjustment of an output level of the signal is finished by the latter-stage variable attenuators 310a and 310b, is shorter than the time from when the light interruption detecting unit 311 detects a signal interruption until when the signal interruption occurs in the latter-stage variable attenuator 310b of the 1-system where the signal interruption occurs.

In this manner, the intensity level of the signal is adjusted before the signal interruption occurs at the latter-stage variable attenuator 310b of the system where the signal interruption occurs so that the signal output from the multiplexer 313 is at a constant intensity level. Therefore, the transmission of optical signals can be continued without interruption, even if a signal interruption occurs.

Figure 17:
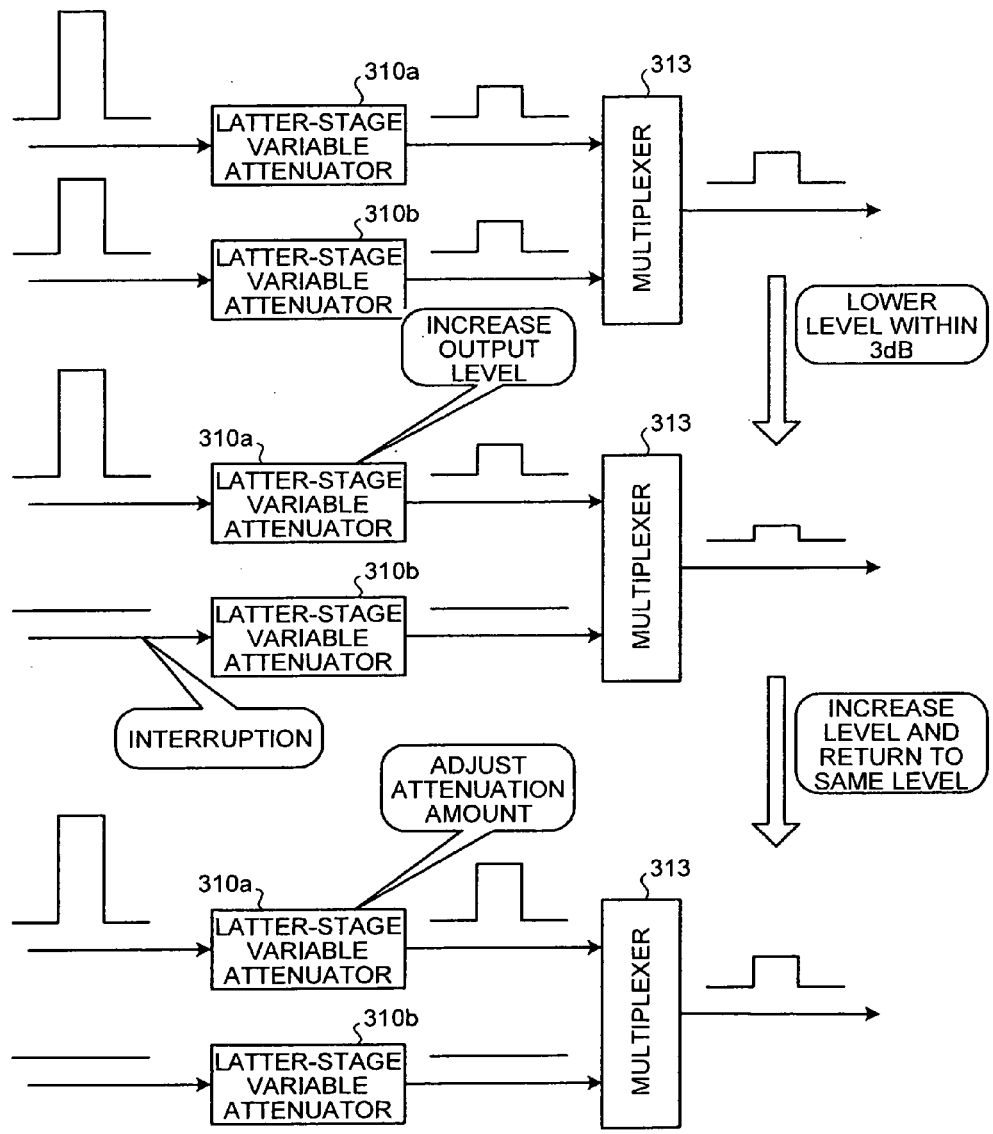
FIG. 17 is an explanatory diagram of a second method to adjust an intensity level of a signal.

FIG. 17 is an explanatory diagram of a second method to adjust an intensity level of a signal. Again, a case where the signal interruption occurs in the 1-system will be explained. As shown in FIG. 17, in the second method, when the intensity level of the output signal of the multiplexer 313 lowers by a predetermined amount (for example, 3 dB), the latter-stage variable attenuator 310a in the 0-system without a signal interruption increases the output level of the signal until the intensity level of the output signal of the multiplexer 313 returns to the level before the signal interruption.

In this manner, when the intensity level of the output signal of the multiplexer 313 lowers by a predetermined amount, the intensity level of the signal is adjusted so that the intensity level of the signal output from the multiplexer 313 is at the same level as the intensity level before the signal interruption. Accordingly, even if a signal interruption occurs, the transmission of optical signals can be continued without interruption.

Referring back to FIG. 1, the light interruption detecting unit 311 is a processing unit that detects whether a signal interruption occurs in one of the 0-system optical fiber line 50 and the 1-system optical fiber line 60 by monitoring the signals input into the amplifiers 300a and 300b. On detecting the signal interruption, the light interruption detecting unit 311 notifies the level adjusting unit 312 of the occurrence of signal interruption.

The level adjusting unit 312 is an adjusting unit that adjusts an output level of the signal at the latter-stage variable attenuators 310a and 310b, when receiving a notification of signal interruption from the light interruption detecting unit 311, as explained in FIG. 16. The level adjusting unit 312 also adjusts an output level of the signal at the latter-stage variable attenuators 310a and 310b, when receiving a notification that an intensity level of the signal is lowered by a predetermined amount, from the multiplexer 313, as explained in FIG. 17.

The multiplexer 313 is an optical coupler that combines a 0-system signal and a 1-system signal. The multiplexer 313 performs a process of detecting whether an intensity level of a signal after being multiplexed is lowered by a predetermined amount or more. If the intensity level is lowered by the predetermined amount or more, the multiplexer 313 notifies the level adjusting unit 312.

The controller 314 is a controller that controls the one-step wavelength converters 3010 and 3012, the two-step wavelength converters 3013 and 3015, the delay amount constant dispersion compensating units 306a and 306b, the former-stage variable attenuators 308a and 308b, and the latter-stage variable attenuators 310a and 310b shown in FIG. 3 to adjust a delay difference between the 0-system signal and the 1-system signal, a signal waveform distortion, and an intensity level of a signal.

Figure 18:
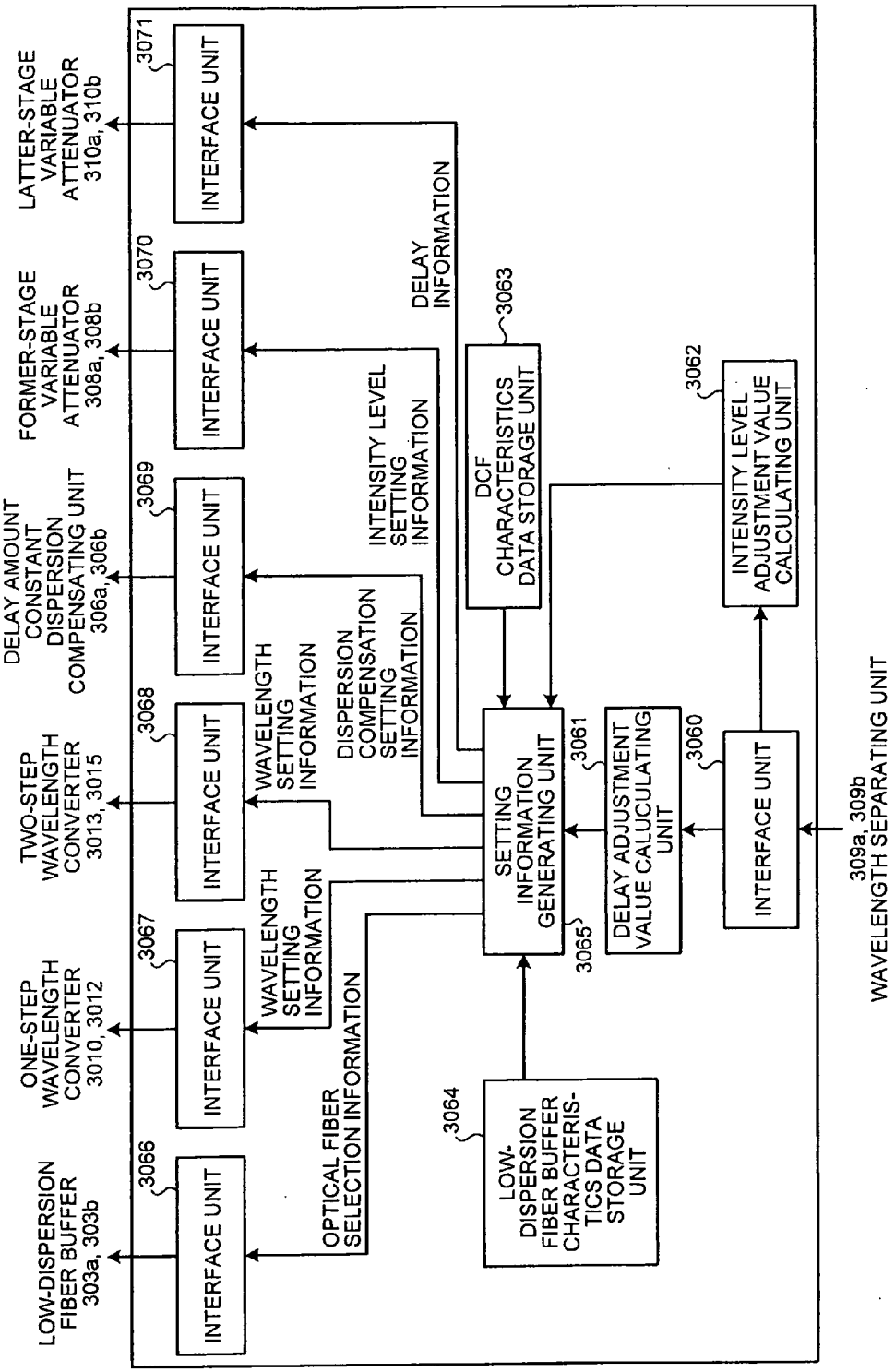
FIG. 18 is a functional configuration diagram of a controller shown in FIG. 1.

FIG. 18 is a functional configuration diagram of the controller 314. As shown in FIG. 18, the controller 314 includes interface units 3060, 3066, 3067, 3068, 3069, 3070, and 3071, a delay adjustment value calculating unit 3061, an intensity level adjustment value calculating unit 3062, a DCF characteristics data storage unit 3063, a low-dispersion fiber buffer characteristics data storage unit 3064, and a setting information generating unit 3065.

The interface unit 3060 is an interface that receives two delay adjustment signals with different wavelengths included in each of the 0-system signal and the 1-system signal and separated by corresponding one of the wavelength separating units 309a and 309b.

The delay adjustment value calculating unit 3061 is a calculating unit that detects delay differences in the respective 0-system signals, delay differences in the respective 1-system signals, a delay difference between the 0-system signal and the 1-system signal, and the like to calculate target values for adjusting these delay differences. More particularly, the delay adjustment value calculating unit 3061 calculates a target value for adjusting the delay amounts of the entire 0-system and the 1-system signals, and a target value for adjusting the delay differences between the 0-system signals and the corresponding 1-system signals.

The intensity level adjustment value calculating unit 3062 is a calculating unit that detects an intensity level difference between the 0-system and the 1-system delay adjustment signals, and calculates a target value of the intensity level for adjusting the intensity level difference to be constant.

The DCF characteristics data storage unit 3063 is a storage unit such as a memory, and stores therein dispersion characteristics data of the dispersion compensation fibers 3011 and 3014, such as the characteristic curve shown in FIG. 5. The low-dispersion fiber buffer characteristics data storage unit 3064 is a storage unit such as a memory, and stores therein characteristics data of the low-dispersion fiber buffers 303a and 303b. More particularly, the low-dispersion fiber buffer characteristics data storage unit 3064 stores therein information of a delay time, for example, generated by the optical fibers 3001a through 3001e in each of the low-dispersion fiber buffers 303a and 303b in association with the corresponding optical fibers 3001a through 3001e.

The setting information generating unit 3065 generates information required for adjusting a delay of the optical signal to the target value calculated by the delay adjustment value calculating unit 3061. The information includes selection information of the optical fibers 3001a through 3001e output to the low-dispersion fiber buffers 303a and 303b, setting information of the wavelength of the excitation light output to the one-step wavelength converters 3010 and 3012 and the two-step wavelength converters 3013 and 3015, dispersion compensation setting information of the signal waveform output to the delay amount constant dispersion compensating units 306a and 306b, intensity level setting information of the optical single output to the former-stage variable attenuators 308a and 308b, and delay information of the optical signal output to the latter-stage variable attenuators 310a and 310b.

More particularly, the setting information generating unit 3065 reads out characteristics data of the low-dispersion fiber buffers 303a and 303b from the low-dispersion fiber buffer characteristics data storage unit 3064. The setting information generating unit 3065 generates selection information that is a result of selection of the optical fibers 3001a through 3001e that minimize a delay difference, when the delay difference exists between the 0-system signal and the 1-system signal.

The setting information generating unit 3065, when there still remains a delay difference between the 0-system signal and the 1-system signal, and also in the 0-system signals or in the 1-system signals after the low-dispersion fiber buffers 303a and 303b adjust the delay difference, reads out information on dispersion characteristics of the dispersion compensation fibers 3011 and 3014 from the DCF characteristics data storage unit 3063 to calculate a wavelength of the excitation light used by the one-step wavelength converters 3010 and 3012 and the two-step wavelength converters 3013 and 3015 that convert the wavelengths.

In this case, the setting information generating unit 3065 calculates the wavelength of the excitation light so as to satisfy the following formula (1).

$$T = Ta(\lambda c1) + Tb(\lambda c2),$$

$$S = (dTa(\lambda)/d\lambda|_{\lambda=\lambda c1} + dTb(\lambda)/d\lambda|_{\lambda=\lambda c2})\Delta x \quad (1)$$

In the above formula (1), T indicates a delay amount of the entire signals of one of the 0-system and the 1-system, V indicates a delay difference V in the signals of one of the 0-system and the 1-system, $\lambda c1$ and $\lambda c2$ respectively indicate the center wavelengths of the wavelength bands of signals that pass through the dispersion compensation fibers 3011 and 3014 shown in FIG. 3, Ta and Tb indicate delay times generated when signals pass through the dispersion compensation fibers 3011 and 3014, respectively, and $\Delta x$ indicates a width of a signal wavelength band.

When the low-dispersion fiber buffers 303a and 303b can fully compensate the delay difference in the signals of the 0-system and the 1-system, respectively, it becomes V=0. The setting information generating unit 3065 calculates the wavelength of the excitation light used by the one-step wavelength converters 3010 and 3012 and the two-step wavelength converters 3013 and 3015, so as to satisfy the following formula (2).

$$T = Ta(\lambda c1) + Tb(\lambda c2),$$

$$0 = (dTa(\lambda)/d\lambda|_{\lambda=c1} + dTb(\lambda)/d\lambda|_{\lambda=\lambda c2})\Delta x \quad (2)$$

The setting information generating unit 3065 performs a process of calculating a compensation amount D, when the delay amount constant dispersion compensating units 306a and 306b compensate a signal waveform distortion. More particularly, the setting information generating unit 3065 calculates the compensation amount D from the dispersion characteristics data of the dispersion compensation fibers 3011 and 3014 stored in the DCF characteristics data storage unit 3063, and information on the wavelength of the excitation light.

The setting information generating unit 3065 further performs a process of generating setting information on the intensity level output to the former-stage variable attenuators 308a and 308b, based on the information on the target value of the intensity level received from the intensity level adjustment value calculating unit 3062. The setting information generating unit 3065 generates delay information that shows whether a delay difference is absorbed between the 0-system signal and the 1-system signal, to output to the latter-stage variable attenuators 310*a* and 310*b*. The latter-stage variable attenuators 310*a* and 310*b* receive the delay information, at an initial startup of the hitless protection switching apparatus 30 and when the 0-system and the 1-system recover from the signal interruption, to start a process of adjusting an intensity level of an optical signal.

The interface units 3066, 3067, 3068, 3069, 3070, and 3071 are interfaces that output optical fiber selection information, wavelength setting information, dispersion compensation setting information, intensity level setting information, delay information, and the like, to the low-dispersion fiber buffers 303*a* and 303*b*, the one-step wavelength converters 3010 and 3012, the two-step wavelength converters 3013 and 3015, the delay amount constant dispersion compensating units 306*a* and 306*b*, the former-stage variable attenuators 308*a* and 308*b*, and the latter-stage variable attenuators 310*a* and 310*b*.

Figure 19:
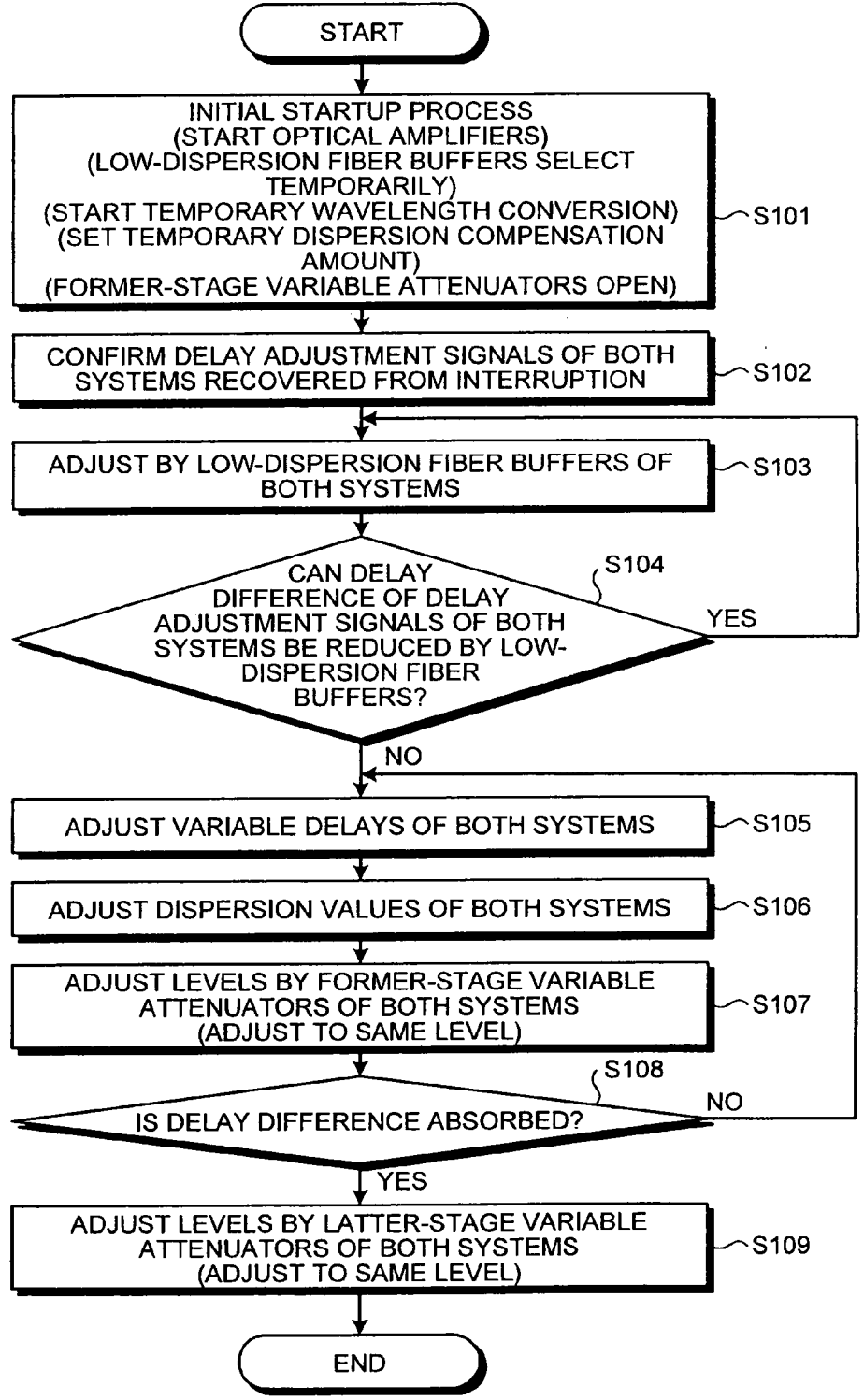
FIG. 19 is a flowchart showing a procedure of a startup process performed by a hitless protection switching apparatus shown in FIG. 1.

Next, a procedure of a startup process performed by the hitless protection switching apparatus 30 will be explained. FIG. 19 is a flowchart showing a procedure of a startup process performed by the hitless protection switching apparatus 30.

As shown in FIG. 19, the hitless protection switching apparatus 30 performs an initial startup process, when the power is turned ON (step S101). More particularly, the hitless protection switching apparatus 30 starts the respective amplifiers 300*a*, 300*b*, 302*a*, 302*b*, 304*a*, 304*b*, 307*a*, and 307*b*. The low-dispersion fiber buffers 303*a* and 303*b* select the optical fibers 3001*a* through 3001*e* to be used temporarily, from the optical fibers 3001*a* through 3001 shown in FIG. 2.

The one-step wavelength converters 3010 and 3012, and the two-step wavelength converters 3013 and 3015 of the multi-wavelength light variable delay units 305*a* and 305*b*, temporarily set a wavelength shift amount used when the wavelength is converted. The delay amount constant dispersion compensating units 306*a* and 306*b* temporarily set a compensation amount to compensate a signal waveform distortion. The former-stage variable attenuators 308*a* and 308*b* open a transmission route of a signal.

The controller 314 confirms that the delay adjustment signals of the 0-system and the 1-system are recovered from the signal interruption state (step S102). Subsequently, the low-dispersion fiber buffers 303*a* and 303*b* adjust the delay difference, by selecting the optical fibers 3001*a* through 3001*e*, based on the selection information on the optical fibers 3001*a* through 3001*e* of the low-dispersion fiber buffers 303*a* and 303*b*, transmitted from the controller 314 (step S103).

The controller 314 then checks whether the delay difference of the delay adjustment signals of the 0-system or the 1-system can be reduced, by using the low-dispersion fiber buffers 303*a* and 303*b* (step S104). If the delay difference can be reduced (YES at step S104), the low-dispersion fiber buffers 303*a* and 303*b* readjust the delay difference (step S103).

If the delay difference cannot be reduced by the low-dispersion fiber buffers 303*a* and 303*b* any more (NO at step S104), the multi-wavelength light variable delay units 305*a* and 305*b* adjust the delay difference of the 0-system and the 1-system (step S105). The delay amount constant dispersion compensating units 306*a* and 306*b* adjust the dispersion value that corrects a signal distortion, without changing the delay amount of the respective signals of the 0-system and the 1-system (step S106).

The former-stage variable attenuators 308*a* and 308*b* adjust the intensity levels of the signals of the 0-system and the 1-system to be constant (step S107). The controller 314 checks whether the delay difference of the delay adjustment signals of the 0-system and the 1-system is absorbed (step S108). If the delay difference is not absorbed (NO at step S108), the multi-wavelength light variable delay units 305*a* and 305*b* perform the process of readjusting the delay of the 0-system and the 1-system (step S105).

When the delay difference is absorbed (YES at step S108), the latter-stage variable attenuators 310*a* and 310*b* adjust the intensity levels of the signals of the 0-system and the 1-system to be constant (step S109), and finish the startup process of the hitless protection switching apparatus 30.

Figure 20:
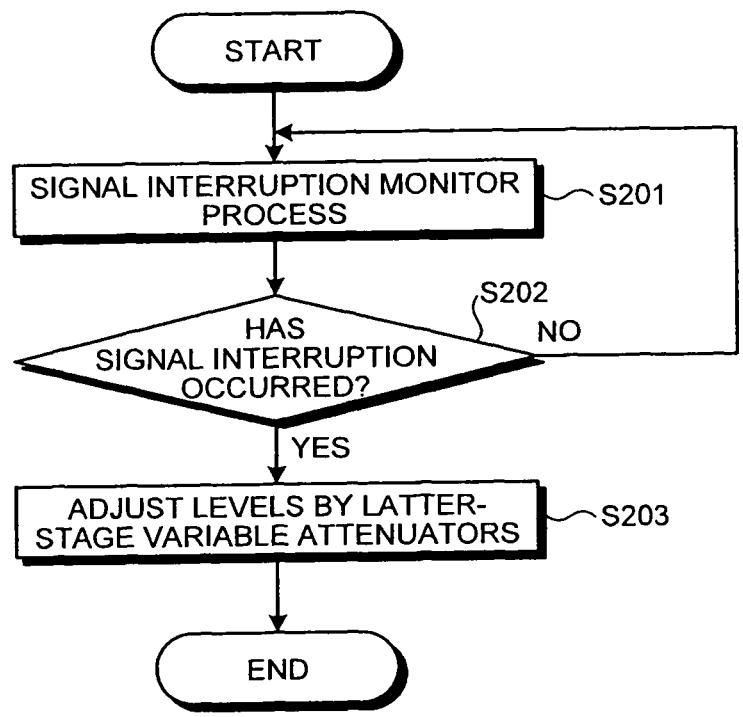
FIG. 20 is a flowchart showing a procedure of a signal intensity level adjustment process when a signal interruption occurs.

Next, a procedure of a signal intensity level adjustment process performed when a signal interruption occurs, will be explained. FIG. 20 is a flowchart showing a procedure of a signal intensity level adjustment process performed when a signal interruption occurs.

As shown in FIG. 20, the light interruption detecting unit 311 of the hitless protection switching apparatus 30 executes a monitor process to monitor the signals of the 0-system and the 1-system input into the amplifiers 300*a* and 300*b* (step S201).

The light interruption detecting unit 311 checks whether a signal interruption has occurred (step S202). If the signal interruption has not occurred (NO at step S202), the signal interruption monitor process is continued (step S201).

If the signal interruption has occurred (YES at step S202), the latter-stage variable attenuators 310*a* and 310*b* receive the information from the light interruption detecting unit 311, adjust the intensity levels of the signals as explained in FIG. 16 (step S203), and finishes the signal intensity level adjustment process.

The signal monitored in the monitor process may either be a delay adjustment signal or a main signal. However, when the delay adjustment signal is monitored, the signal interruption of the 0-system optical fiber line 50 or the 1-system optical fiber line 60 cannot be detected properly, if the branching apparatus 20 that multiplexes the delay adjustment signal to the main signal breaks down and cannot multiplex. Therefore, the delay adjustment signal and the main signal are preferably both monitored.

Figure 21:
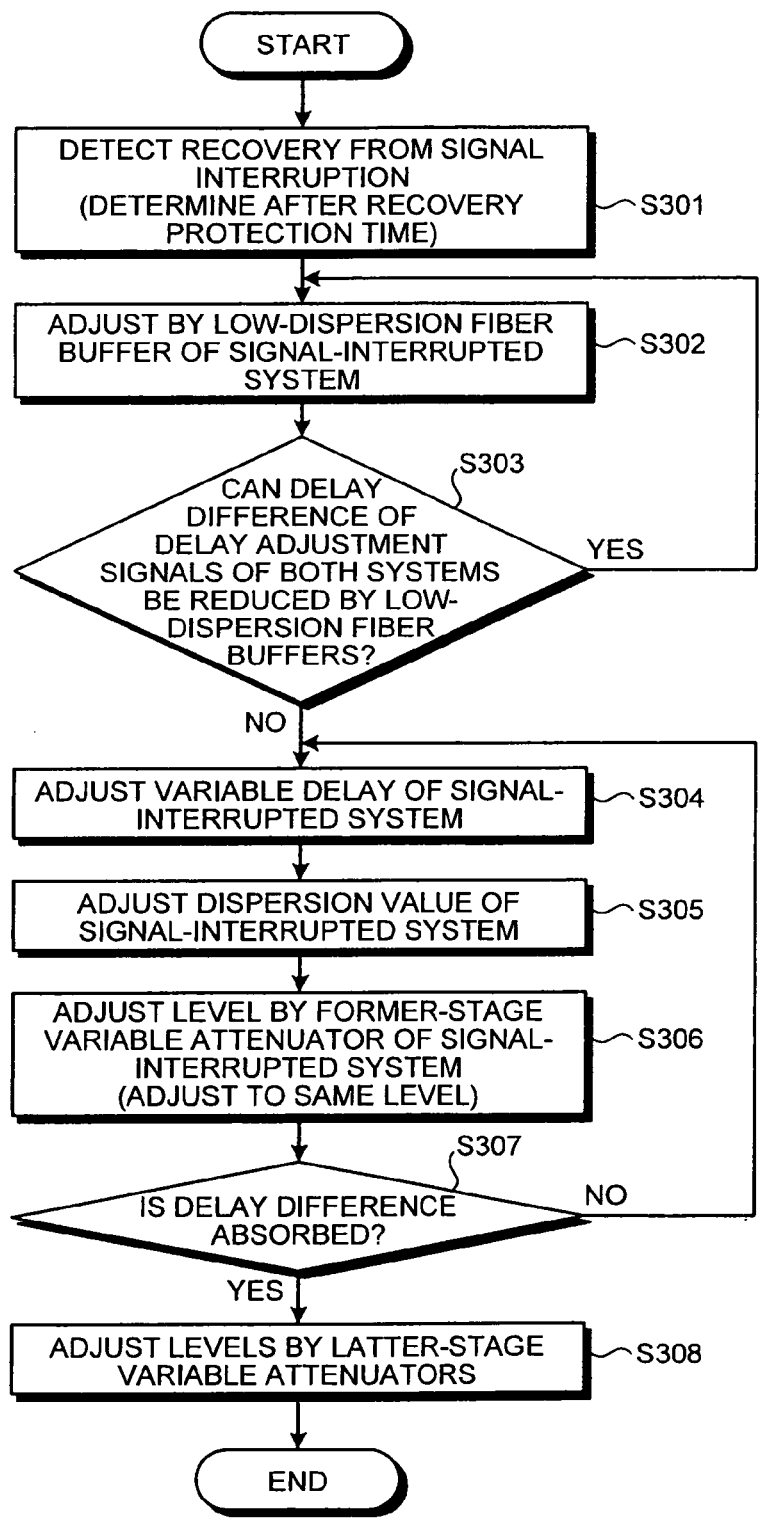
FIG. 21 is a flowchart showing a procedure of a recovery process performed by the hitless protection switching apparatus of FIG. 1, when recovering from a signal interruption.

Next, a procedure of a recovery process performed when the hitless protection switching apparatus 30 recovers from a signal interruption will be explained. FIG. 21 is a flowchart showing a procedure of a recovery process performed by the hitless protection switching apparatus 30, when recovering from a signal interruption. A recovery of the 0-system from a signal interruption will be explained here.

As shown in FIG. 21, the controller 314 of the hitless protection switching apparatus 30 detects a 0-system delay adjustment signal to detect that the 0-system has recovered from the signal interruption (step S301). When the delay adjustment signal is detected for more than a predetermined time (recovery protection time), the controller 314 determines that the 0-system has recovered from the signal interruption.

The low-dispersion fiber buffer 303*a* adjusts the delay difference between the 0-system and the 1-system by selecting the optical fibers 3001*a* through 3001*e*, based on the selection information of the optical fibers 3001*a* through 3001*e* of the low-dispersion fiber buffer 303*a* transmitted by the controller 314 (step S302).

The controller 314 then checks whether the delay difference between the 0-system and the 1-system can be reduced, by using the low-dispersion fiber buffers 303*a* and 303*b* (step S303). If the delay difference can be reduced (YES at step S303), the low-dispersion fiber buffer 303a readjusts the delay difference between the 0-system and the 1-system (step S302).

If the delay difference cannot be reduced by the low-dispersion fiber buffer 303a any more (NO at step S303), the multi-wavelength light variable delay unit 305a adjusts the delay difference between the 0-system and the 1-system (step S304). The delay amount constant dispersion compensating unit 306a then adjusts the dispersion value that corrects the signal distortion of the 0-system, without changing the delay amount of the respective signals of the 0-system and the 1-system (step S305).

The former-stage variable attenuator 308a adjusts the intensity level of the 0-system signal so as to be the same level as the intensity level of the 1-system signal (step S306). The controller 314 checks whether the delay difference of the delay adjustment signals of the 0-system and the 1-system is absorbed (step S307). If the delay difference is not absorbed (NO at step S307), the multi-wavelength light variable delay unit 305a performs the process of readjusting the delay of the 0-system and the 1-system (step S304).

If the delay is absorbed (YES at step S307), the latter-stage variable attenuators 310a and 310b adjust the intensity levels of the signals of the 0-system and the 1-system to be constant (step S308), and finishes the recovery process of this hitless protection switching apparatus 30.

As described above, according to the first embodiment, the multi-wavelength light variable delay units 305a and 305b convert the wavelengths of optical signals, and adjust the transmission delay difference between the optical signals of the 0-system and the 1-system, by making the optical signals with a converted wavelength pass through the dispersion compensation fibers 3011 and 3014, in which the transmission delay of the optical signal changes continuously depending on the wavelength. Further, the delay amount constant dispersion compensating units 306a and 306b compensate waveform degradation of the optical signals, while maintaining the adjusted transmission delay difference. As a result, the transmission delay difference of the optical signals transmitted via the redundant routes of the 0-system and the 1-system can be adjusted continuously, while preventing degradation of the optical signal.

According to the first embodiment, the multi-wavelength light variable delay units 305a and 305b, when a wavelength of an optical signal is converted, reconvert the wavelength of the optical signal into a predetermined wavelength. As a result, the wavelength of the optical signal with a converted wavelength can be returned to the original wavelength.

According to the first embodiment, the low-dispersion fiber buffers 303a and 303b adjust the transmission delay difference of the optical signal by switching the optical fibers 3001a through 3001e with different lengths, and discretely changing the transmission delay of the optical signal. The multi-wavelength light variable delay units 305a and 305b then convert the wavelength of the optical signal, and adjust the transmission delay difference between the optical signals of the 0-system and the 1-system, by making the optical signal with a converted wavelength pass through the dispersion compensation fibers 3011 and 3014 in which the transmission delay of the optical signal changes continuously depending on the wavelength. As a result, the transmission delay difference of the optical signal can be broadly adjusted, by discretely changing the transmission delay, and then the transmission delay difference of the optical signal can be refined, by continuously changing the transmission delay afterwards.

According to the first embodiment, the multi-wavelength light variable delay units 305a and 305b adjust the transmission delay difference of plural optical signals, by signals with the same wavelengths, when the plural optical signals are transmitted via the redundant routes of the 0-system and the 1-system and multiplexed by the wavelength division multiplexing. As a result, the transmission delay difference between the multiplexed signals with the same wavelength can be adjusted, using the wavelength division multiplexing.

According to the first embodiment, the wavelength separating units 309a and 309b receive the optical signal of which the delay difference detecting signal used for detecting the transmission delay difference of the optical signal is being multiplexed. The controller 314 and the multi-wavelength light variable delay units 305a and 305b adjust the transmission delay difference between the optical signals, by referring to the delay difference detecting signal. As a result, the transmission delay difference between the optical signals can efficiently be adjusted, by multiplexing the delay difference detecting signal to the optical signal.

According to the first embodiment, the multiplexer 313 combines and outputs the optical signals at the 0-system and the 1-system routes, and when the light interruption detecting unit 311 detects a signal interruption, the latter-stage variable attenuators 310a and 310b adjust the intensity levels of the optical signals at the 0-system and the 1-system routes, in which the waveform degradation is compensated so that the intensity level of the optical signal output from the multiplexer 313 is of a predetermined level. As a result, when a signal interruption occurs, a fluctuation of the intensity level of the optical signal can be effectively suppressed.

According to the first embodiment, the low-dispersion fiber buffers 303a and 303b adjust the transmission delay difference of the optical signal, by switching the optical fibers 3001a through 3001e with different lengths, and discretely changing the transmission delay of the optical signal. The multi-wavelength light variable delay units 305a and 305b convert the wavelength of the optical signal, and adjust the delay difference of the optical signal, by making the optical signal with a converted wavelength pass through the dispersion compensation fibers 3011 and 3014 that generate the transmission delay depending on the wavelength of the optical signal. The light interruption detecting unit 311 detects a signal interruption generated to the signal before the optical signal is input into the low-dispersion fiber buffers 303a and 303b. As a result, a fluctuation of the intensity level of the optical signal can be effectively suppressed, by detecting the signal interruption early, before the transmission delay difference is adjusted.

According to the first embodiment, when a signal interruption is detected by the light interruption detecting unit 311, the latter-stage variable attenuators 310a and 310b adjust the intensity levels of the optical signals of the respective routes, before the optical signals stop reaching the latter-stage variable attenuators 310a and 310b. As a result, the transmission of the optical signals can be prevented from a momentary interruption.

The embodiment of the present invention has been explained, but the present invention may be applied to various different embodiments, other than the first embodiment. In the following, other embodiments included in the present invention will be explained as a second embodiment.

(1) Transmission Route of Optical Signal Whose Delay Amount is Adjusted

For example, according to the first embodiment, as shown in FIG. 1, the delay amount is adjusted with respect to the both signals of the 0-system and the 1-system. Alternatively, the delay difference between the 0-system signal and the 1-system signal may be absorbed, by adjusting the delay amount only for the signals of one of the 0-system and the 1-system.

Figure 22:
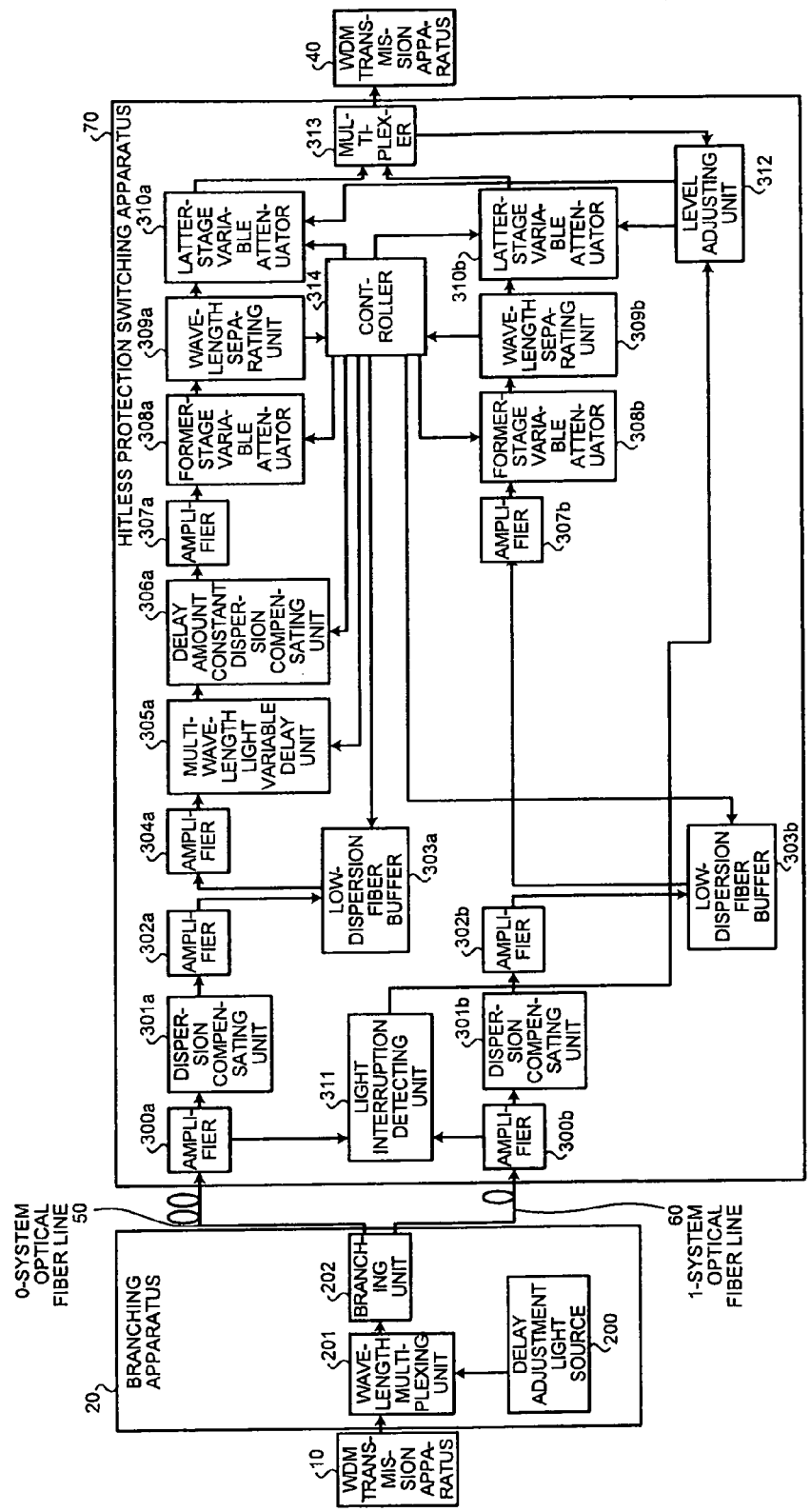
FIG. 22 is a functional configuration diagram of a hitless protection switching system that adjusts a delay amount of only a 0-system signal.

FIG. 22 is a functional configuration diagram of a hitless protection switching system that performs an adjustment of a delay amount only for a 0-system signal. The functioning units as those of the functioning units shown in FIG. 1 are denoted by the same reference numerals, and the detailed description thereof will not be repeated.

As shown in FIG. 22, the hitless protection switching system includes the WDM transmission apparatus 10, the branching apparatus 20, a hitless protection switching apparatus 70, and the WDM transmission apparatus 40. The branching apparatus 20 and the hitless protection switching apparatus 70 are connected via the 0-system optical fiber line 50 and the 1-system optical fiber line 60.

The WDM transmission apparatus 10, the branching apparatus 20, and the WDM transmission apparatus 40 are the same apparatuses as the WDM transmission apparatus 10, the branching apparatus 20, and the WDM transmission apparatus 40 that are explained in FIG. 1. The hitless protection switching apparatus 70, compared with the hitless protection switching apparatus 30 shown in FIG. 1, does not include the amplifier 304b, the multi-wavelength light variable delay unit 305b, and the delay amount constant dispersion compensating unit 306b that are in the 1-system, and is configured to perform an adjustment of the delay amount only for the 0-system signal.

In this manner, the hitless protection switching apparatus 70 adjusts the delay amount of the 0-system signal, and absorbs the delay difference between the 1-system signal. Accordingly, similarly to the hitless protection switching apparatus 30 in FIG. 1, the transmission of the optical signals can be continued without interruption, even if a signal interruption occurs.

(2) Number of Applied Dispersion Compensation Fibers

According to the first embodiment, as shown in FIG. 3, the two dispersion compensation fibers 3011 and 3014 are used to absorb the delay difference between the 0-system signal and the 1-system signal. However, if the delay difference between the respective 0-system multiplexed signals and the delay difference between the respective 1-system multiplexed signals are adjusted to be equal in the low-dispersion fiber buffers 303a and 303b, only the delay difference between the 0-system signal and the 1-system signal may be adjusted. Accordingly, only one dispersion compensation fiber is enough.

Figure 23:
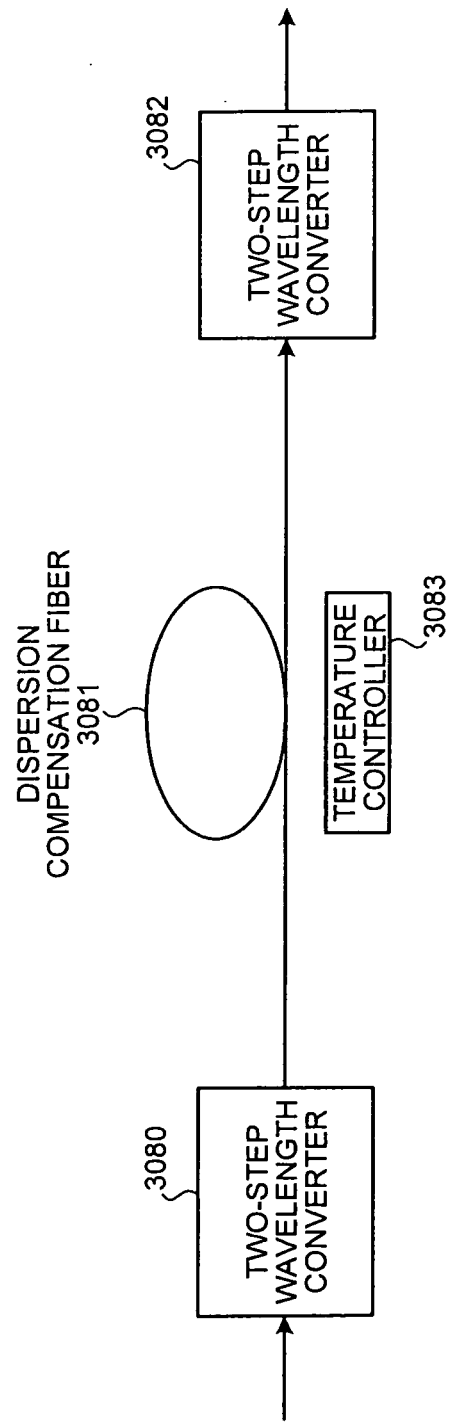
FIG. 23 is a functional configuration diagram of a multi-wavelength light variable delay unit that includes only one dispersion compensation fiber.

FIG. 23 is a functional configuration diagram of a multi-wavelength light variable delay unit that includes only one dispersion compensation fiber. As shown in FIG. 23, this multi-wavelength light variable delay unit includes two-step wavelength converters 3080 and 3082, a dispersion compensation fiber 3081, and a temperature controller 3083.

The two-step wavelength converters 3080 and 3082, the dispersion compensation fiber 3081, and the temperature controller 3083 are the same as the two-step wavelength converters 3013 and 3015, the dispersion compensation fiber 3014, and the temperature controller 3017 of the multi-wavelength light variable delay units 305a and 305b shown in FIG. 3. The difference between the multi-wavelength light variable delay unit shown in FIG. 23 and the multi-wavelength light variable delay units 305a and 305b shown in FIG. 3, is that the one-step wavelength converters 3010 and 3012, and the dispersion compensation fiber 3011 are removed.

In this manner, the delay difference between the respective 0-system multiplexed signals and the delay difference between the respective 1-system multiplexed signals in the low-dispersion fiber buffers 303a and 303b may be adjusted so as to be the same. Accordingly, a configuration of the multi-wavelength light variable delay unit can be simplified.

The two-step wavelength converters 3080 and 3082, and the dispersion compensation fiber 3081 are used here. Alternatively, however, a multi-wavelength light variable delay unit can be formed by using the one-step wavelength converters 3010 and 3012, and the dispersion compensation fiber 3081.

(3) Setting Position of Two-Step Wavelength Converter 3015

According to the first embodiment, as shown in FIG. 3, the two-step wavelength converter 3015 of the multi-wavelength light variable delay units 305a and 305b adjust the wavelength of each signal so as to be the same as the wavelength at the time of input into the multi-wavelength light variable delay units 305a and 305b. Alternatively, however, the adjustment may be made after the 0-system signal and the 1-system signal are combined by the multiplexer 313.

Figure 24:
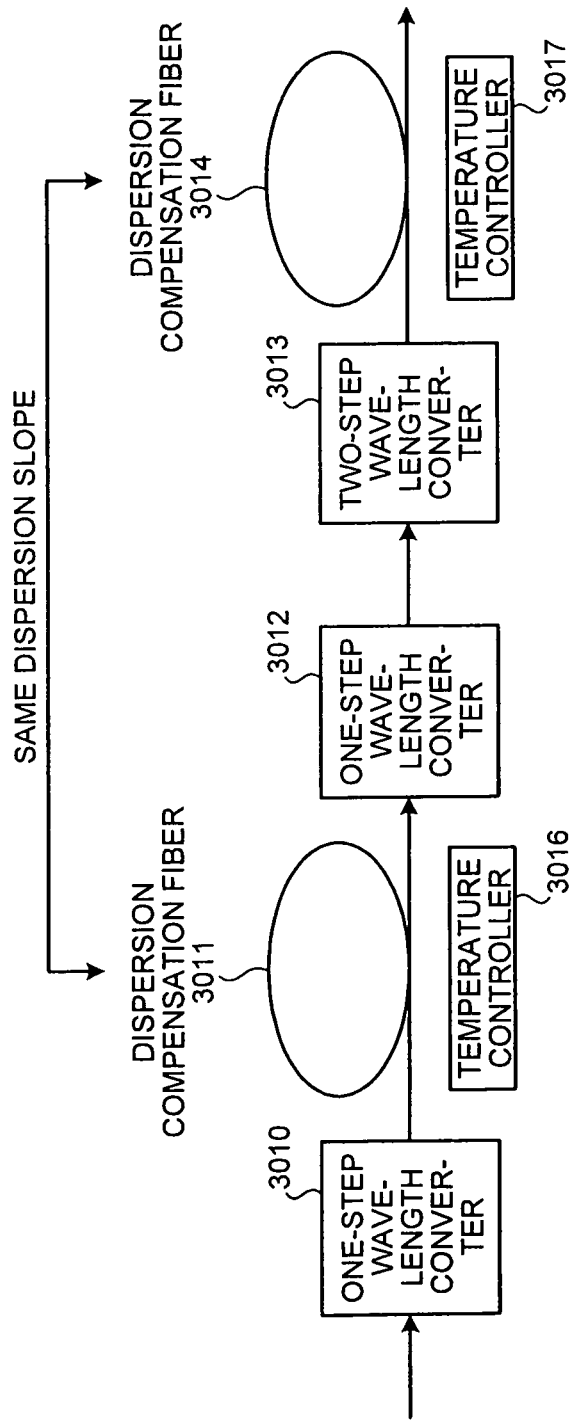
FIG. 24 is a functional configuration diagram of a multi-wavelength light variable delay unit that includes only one two-step wavelength converter.

FIG. 24 is a functional configuration diagram of a multi-wavelength light variable delay unit that includes only one two-step wavelength converter 3013. As shown in FIG. 24, this multi-wavelength light variable delay unit includes the one-step wavelength converters 3010 and 3012, the dispersion compensation fibers 3011 and 3014, the two-step wavelength converter 3013, and the temperature controllers 3016 and 3017.

The one-step wavelength converters 3010 and 3012, the dispersion compensation fibers 3011 and 3014, the two-step wavelength converter 3013, and the temperature controllers 3016 and 3017, are the same as the one-step wavelength converters 3010 and 3012, the dispersion compensation fibers 3011 and 3014, the two-step wavelength converter 3013, and the temperature controllers 3016 and 3017 shown in FIG. 3. The difference between the multi-wavelength light variable delay unit shown in FIG. 24 and the multi-wavelength light variable delay units 305a and 305b shown in FIG. 3, is that the two-step wavelength converter 3015 is removed.

Figure 25:
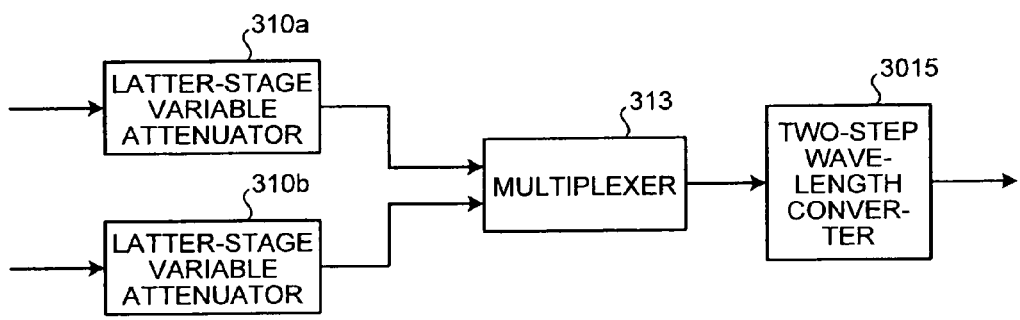
FIG. 25 is an explanatory diagram of a setting location of a two-step wavelength converter.

FIG. 25 is an explanatory diagram of a setting location of the two-step wavelength converter 3015. As shown in FIG. 25, the two-step wavelength converter 3015 removed from the multi-wavelength light variable delay unit is set behind the multiplexer 313. The latter-stage variable attenuators 310a and 310b and the multiplexer 313 shown in FIG. 25 are the same as the latter-stage variable attenuators 310a and 310b and the multiplexer 313 shown in FIG. 1. With this, similarly to that shown in FIG. 3, the wavelength of each signal can be adjusted so as to be the same as the wavelength at the time of input into the multi-wavelength light variable delay units 305a and 305b.

Figure 26:
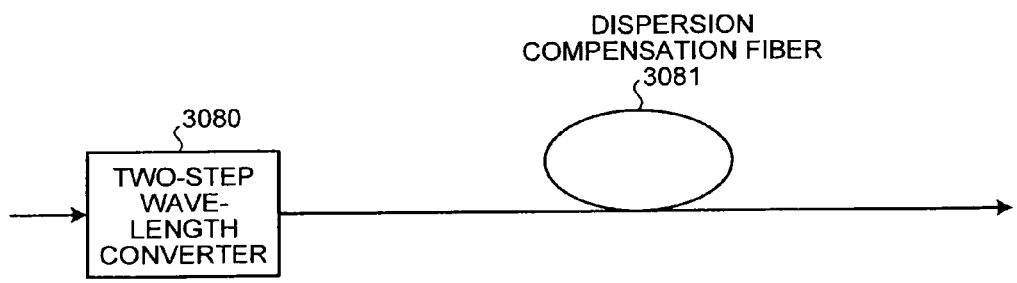
FIG. 26 is a functional configuration diagram of a multi-wavelength light variable delay unit that includes one two-step wavelength converter and one dispersion compensation fiber.

This is the same when the multi-wavelength light variable delay unit includes only one dispersion compensation fiber, as shown in FIG. 23. FIG. 26 is a functional configuration diagram of a multi-wavelength light variable delay unit that includes one each of the two-step wavelength converter 3080 and the dispersion compensation fiber 3081.

As shown in FIG. 26, this multi-wavelength light variable delay unit includes one each of the two-step wavelength converter 3080 and the dispersion compensation fiber 3081. The two-step wavelength converter that adjusts the wavelength of each signal so as to be the same as the wavelength at the time of input into the two-step wavelength converter 3080 is set after the multiplexer 313, as explained in FIG. 25.

(4) Characteristics of Dispersion Compensation Fiber

According to the first embodiment, as shown in FIG. 3, the two dispersion compensation fibers 3011 and 3014 of the multi-wavelength light variable delay unit have the same dispersion slope as shown in FIG. 5. However, the two dispersion compensation fibers 3011 and 3014 may have reversed dispersion slopes.

Figure 27:
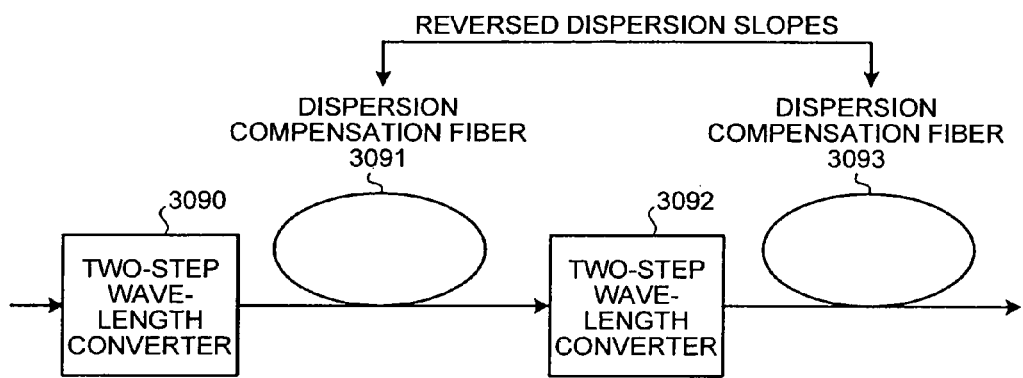
FIG. 27 is a functional configuration diagram of a multi-wavelength light variable delay unit that includes two two-step wavelength converters, and two dispersion compensation fibers that have reversed dispersion slopes to each other.

FIG. 27 is a functional configuration diagram of a multi-wavelength light variable delay unit that includes two-step wavelength converters 3090 and 3092, and dispersion compensation fibers 3091 and 3093 that have reversed dispersion slopes to each other. The two-step wavelength converters 3090 and 3092 are the same as the two-step wavelength converters 3013 and 3015 shown in FIG. 3. Another two-step wavelength converter may further be provided for adjusting the wavelength of each signal to be the same as the wavelength at the time of input into the two-step wavelength converter 3090.

The dispersion compensation fibers 3091 and 3093 are optical fibers that have such dispersion characteristics that the transmission speed of an optical signal that passes through the dispersion compensation fibers 3091 and 3093 changes depending on a wavelength of the optical signal, and have reversed dispersion slopes to each other.

In other words, the delay time of the dispersion compensation fiber 3091 increases along the increase of the wavelength, as shown in FIG. 5. On the other hand, the other dispersion compensation fiber 3093 has such a characteristic that the delay time decreases along the increase of the wavelength.

When signals with different wavelengths that have a delay difference are input to the two-step wavelength converter 3090, the wavelengths are converted by the two-step wavelength converter 3090. In this case, as explained in FIG. 7, the magnitude relationship of the wavelength between the signals does not change. When these signals pass through the dispersion compensation fiber 3091, the signals with a larger wavelength delay more.

The two-step wavelength converter 3092 then converts the wavelengths of the signals that have passed through the dispersion compensation fiber 3091. Also in this case, the magnitude relationship of the wavelengths among the signals does not change. However, if the signals whose wavelengths are converted by the two-step wavelength converter 3092 are made to pass through the dispersion compensation fiber 3093, the signals with a smaller wavelength delay more. This is because the dispersion compensation fiber 3093 has the reversed dispersion slope to the dispersion compensation fiber 3091.

In this manner, the delay amount of the signal can be adjusted, by combining and using the dispersion compensation fibers 3091 and 3093 having the reversed dispersion slopes.

Figure 28:
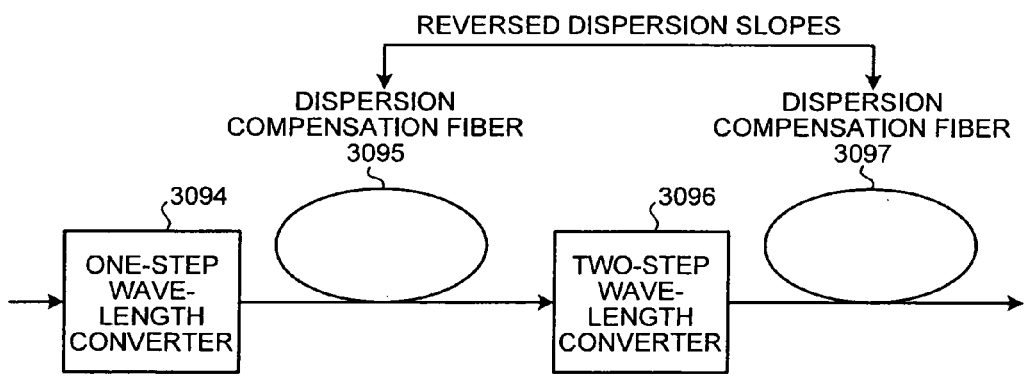
FIG. 28 is a functional configuration diagram of a multi-wavelength light variable delay unit that includes a one-step wavelength converter, a two-step wavelength converter, and dispersion compensation fibers that have reversed dispersion slopes to each other.

In FIG. 27, the wavelength is converted by using the two-step wavelength converters 3090 and 3092. Alternatively, however, the wavelength may be converted by using a one-step wavelength converter and a two-step wavelength converter. FIG. 28 is a functional configuration diagram of a multi-wavelength light variable delay unit that includes a one-step wavelength converter 3094, a two-step wavelength converter 3096, and the dispersion compensation fibers 3095 and 3097 that have reversed dispersion slopes to each other.

The one-step wavelength converter 3094 and the two-step wavelength converter 3096 are the same as the one-step wavelength converters 3010 and 3012, and the two-step wavelength converters 3013 and 3015 shown in FIG. 3. Another two-step wavelength converter may further be provided for adjusting the wavelength of each signal to be the same as the wavelength at the time of input into the two-step wavelength converter 3090. Dispersion compensation fibers 3095 and 3097 are the same as the dispersion compensation fibers 3091 and 3093 shown in FIG. 27, and have reversed dispersion slopes to each other.

When the signals with different wavelengths that have a delay difference are input into the one-step wavelength converter 3094, the wavelengths are converted by the one-step wavelength converter 3094. In this case, the magnitude relationship of the wavelengths between the signals reverses. When these signals pass through the dispersion compensation fiber 3095, the signals whose wavelengths were smaller when input into the one-step wavelength converter 3094, delay more.

The two-step wavelength converter 3096 then converts the wavelengths of the signals that have passed through the dispersion compensation fiber 3095. In this case, the magnitude relationship of the wavelengths between the signals does not change. However, if the signals whose wavelengths are converted by the two-step wavelength converter 3096 are made to pass through the dispersion compensation fiber 3097, the signals whose wavelengths were larger when input into the one-step wavelength converter 3094, delay more. This is because the dispersion compensation fiber 3097 has the reversed dispersion slope to the dispersion compensation fiber 3095.

In this manner, even in FIG. 28, the delay amount of the signal can be adjusted, by combining and using the dispersion compensation fibers 3095 and 3097 that have the reversed dispersion slopes.

(5) Manner of Detection of Signal Interruption

According to the first embodiment, as show in FIG. 1, the controller 314 adjusts the delay amount by detecting the delay adjustment signal. However, the delay amount may be adjusted by detecting a communication error signal, when an optical signal is converted into an electric signal, after the 0-system optical signal and the 1-system optical signal are combined. The conversion is made based on communications standards such as a synchronous optical network/synchronous digital hierarchy (SONET/SDH).

More particularly, the communication error signal is generated when a phase difference exists between a 0-system signal and a 1-system electric signal. The adjustment of the delay amount is performed until the communication error signal is not generated any more.

Figure 29:
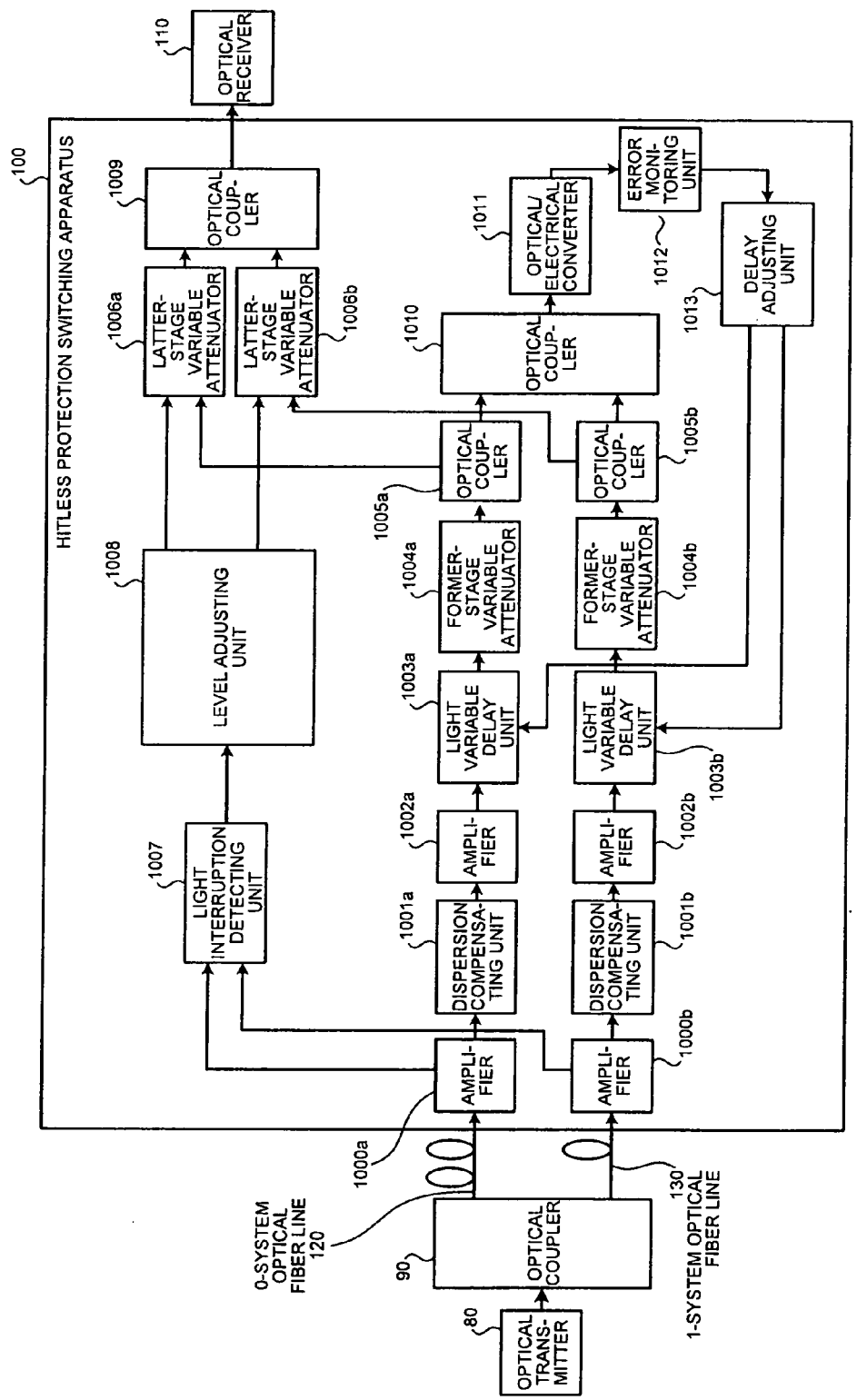
FIG. 29 is a functional configuration diagram of a hitless protection switching system that adjusts a delay amount between a 0-system signal and a 1-system signal by monitoring a communication error.

FIG. 29 is a functional configuration diagram of a hitless protection switching system that adjusts a delay amount between the 0-system signal and the 1-system signal by monitoring a communication error. This hitless protection switching system includes an optical transmitter 80, an optical coupler 90, a hitless protection switching apparatus 100, and an optical receiver 110. The optical coupler 90 and the hitless protection switching apparatus 100 are connected via a 0-system optical fiber line 120 and a 1-system optical fiber line 130.

The optical transmitter 80 is a transmitter that transmits an optical signal. The optical coupler 90 is an optical coupler that branches the signal received from the optical transmitter 80, and transmits the resulting signal via the 0-system optical fiber line 120 and the 1-system optical fiber line 130. The optical receiver 110 is a receiver that receives the optical signal transmitted from the optical transmitter 80 via the hitless protection switching apparatus 100.

The hitless protection switching apparatus 100 is an apparatus that continues to transmit optical signals without interruption, even if a failure occurs to one of the 0-system optical fiber line 120 and the 1-system optical fiber line 130, by using the optical signal of the other optical fiber line.

The hitless protection switching apparatus 100 converts the wavelength of the optical signals that have passed through the 0-system optical fiber line 120 and the 1-system optical fiber line 130. By making the optical signal pass through an optical fiber that has wavelength-dependent transmission speed of an optical signal, the transmission delay difference of the optical signal can be adjusted continuously. The hitless protection switching apparatus 100, after adjusting the transmission delay difference of the optical signal, also compensates waveform distortion of the optical signal while maintaining the transmission delay difference.

The hitless protection switching apparatus 100 includes amplifiers 1000a and 1000b, dispersion compensating units 1001a and 1001b, amplifiers 1002a and 1002b, light variable delay units 1003a and 1003b, former-stage variable attenuators 1004a and 1004b, optical couplers 1005a and 1005b, latter-stage variable attenuators 1006a and 1006b, a light interruption detecting unit 1007, a level adjusting unit 1008, an optical coupler 1009, an optical coupler 1010, an optical/electrical converter 1011, an error monitoring unit 1012, and a delay adjusting unit 1013.

The amplifiers 1000a, 1000b, 1002a, and 1002b are amplifiers that amplify an optical signal. The dispersion compensating units 1001a and 1001b are processing units that compensate wavelength dispersion of the optical signal that has passed through the 0-system optical fiber line 120 and the 1-system optical fiber line 130, and formed by the DCF and the like.

The light variable delay units 1003a and 1003b are processing units that convert the wavelength of an optical signal, and continuously adjust the transmission delay of the optical signal, by making the optical signal pass through an optical fiber that has wavelength-dependent transmission speed of an optical signal. The light variable delay units 1003a and 1003b, after adjusting the transmission delay of the optical signal, amplify and output the optical signal by compensating the waveform distortion of the optical signal while maintaining the transmission delay.

The light variable delay units 1003a and 1003b are functioning units that correspond to the low-dispersion fiber buffers 303a and 303b, the amplifiers 304a and 304b, the multi-wavelength light variable delay units 305a and 305b, the delay amount constant dispersion compensating units 306a and 306b, and the amplifiers 307a and 307b in the hitless protection switching apparatus 30 shown in FIG. 1.

The former-stage variable attenuators 1004a and 1004b are processing units that adjust an intensity level of a signal. More particularly, the former-stage variable attenuators 1004a and 1004b adjust the intensity levels of the signals of the 0-system and the 1-system to be the same, under the control of a controller (not shown).

The optical couplers 1005a and 1005b are optical couplers that branch an optical signal. The optical couplers 1005a and 1005b branch the optical signal received from the former-stage variable attenuators 1009a and 1004b, and output to the latter-stage variable attenuators 1006a and 1006b, and the optical coupler 1010.

The latter-stage variable attenuators 1006a and 1006b are processing units that adjust an intensity level of a signal, similarly to the former-stage variable attenuators 1004a and 1004b. The latter-stage variable attenuators 1006a and 1006b adjust the signal output from the hitless protection switching apparatus 100, so as to eliminate a fluctuation of the intensity level, as explained in FIG. 16, when a signal interruption occurs in one of the 0-system optical fiber line 120 and in the 1-system optical fiber line 130.

The light interruption detecting unit 1007 is a processing unit that detects whether a signal interruption has occurred in one of the 0-system optical fiber line 120 and the 1-system optical fiber line 130, by monitoring the signal input to the amplifiers 1000a and 1000b. If a signal interruption is detected, the light interruption detecting unit 1007 notifies the level adjusting unit 1008 of the signal interruption.

The level adjusting unit 1008 is an adjusting unit that controls the latter-stage variable attenuators 1006a and 1006b, and adjusts an output level of the signal at the latter-stage variable attenuators 1006a and 1006b, as explained in FIG. 16, when the signal interruption is notified from the light interruption detecting unit 1007. The optical coupler 1009 is an optical coupler that combines the 0-system signal and the 1-system signal.

The optical coupler 1010 is an optical coupler that combines the optical signals received from the optical couplers 1005a and 1005b. The optical/electrical converter 1011 is a processing unit that converts the optical signal received from the optical coupler 1010 to an electric signal, based on the communications standards such as the SONET/SDH. The optical/electrical converter 1011 generates an electric signal that includes a communication error signal, when the delay difference exists between the 0-system signal and the 1-system signal that are combined by the optical coupler 1010.

The error monitoring unit 1012 is a processing unit that monitors whether a communication error signal is included in the electric signal generated by the optical/electrical converter 1011, and notifies the delay adjusting unit 1013 of the monitoring result.

The delay adjusting unit 1013 is a processing unit that receives information on the monitoring result indicating whether the communication error signal is included in the electric signal from the error monitoring unit 1012, and absorbs the delay difference between the 0-system signal and the 1-system signal. This is enabled by adjusting the delay amount of the 0-system signal and the 1-system signal until the communication error signal is not detected any more, by controlling the light variable delay units 1003a and 1003b.

In this manner, when the optical/electrical converter 1011 converts the optical signal into the electric signal, based on the communications standards such as the SONET/SDH, the error monitoring unit 1012 detects the communication error signal generated when the delay difference exists in the optical signals of a plurality of routes. The light variable delay units 1003a and 1003b also adjust the transmission delay difference between the optical signals of the respective routes until the communication error signal is not detected any more. Accordingly, the adjustment of the transmission delay difference of the optical signal can be performed with ease, by detecting the communication error signal instead of detecting the delay difference itself.

In the configuration of the hitless protection switching apparatus 100 in FIG. 29, the dispersion compensating unit 1001a and 1001b and the amplifiers 1002a and 1002b may be removed so that the signals output from the amplifiers 1000a and 1000b are directly input into the light variable delay units 1003a and 1003b.

(6) Simple Configuration of Hitless Protection Switching Apparatus

According to the first embodiment, the configuration of the hitless protection switching apparatus is as shown in FIG. 1. However, depending on an extent of the delay difference between the 0-system signal and the 1-system signal, and an extent of the signal waveform distortion, the dispersion compensating units 301a and 301b, the amplifiers 302a and 302b, the low-dispersion fiber buffers 303a and 303b, and the amplifiers 304a and 304b shown in FIG. 1 may appropriately be removed.

(7) Route Switching Process Performed by Using Optical Switch

According to the first embodiment, the transmission of the optical signals is continued without interruption even if a signal interruption occurs, by controlling the latter-stage variable attenuators 310a and 310b shown in FIG. 1. However, the transmission route may be switched using an optical switch, if some signal interruption cannot be a matter.

Figure 30:
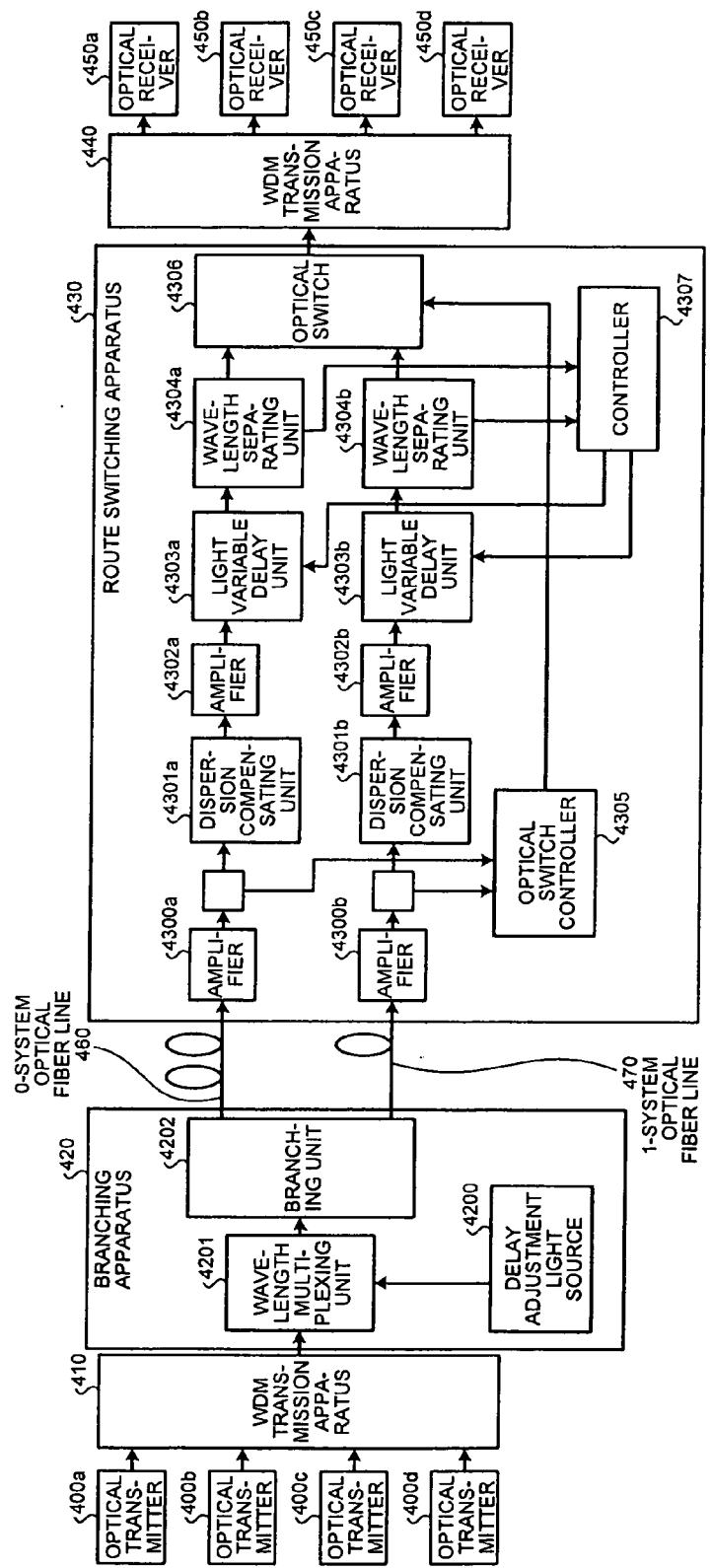
FIG. 30 is a functional configuration diagram of a route switching system that performs a route switching process using an optical switch.

FIG. 30 is a functional configuration diagram of a route switching system that performs a route switching process using an optical switch. As shown in FIG. 30, this route switching system includes optical transmitters 400a through 400d, a WDM transmission apparatus 410, a branching apparatus 420, a route switching apparatus 430, a WDM transmission apparatus 440, and optical receivers 450a through 450d. The branching apparatus 420 and the route switching apparatus 430 are connected via a 0-system optical fiber line 460 and a 1-system optical fiber line 470.

The optical transmitters 400a through 400d are transmitters that transmit an optical signal. The WDM transmission apparatus 410 is an apparatus that multiplexes the optical signals transmitted from the optical transmitters 400a through 400d, using the wavelength division multiplexing, and transmits the multiplexed optical signals with different wavelengths.

The branching apparatus 420 is an apparatus that multiplexes an optical signal for delay adjustment to the optical signal received from the WDM transmission apparatus 410, and then branches and transmits the resulting optical signal. The branching apparatus 420 includes a delay adjustment light source 4200, a wavelength multiplexing unit 4201, and a branching unit 4202. The delay adjustment light source 4200, the wavelength multiplexing unit 4201, and the branching unit 4202, are the same as the delay adjustment light source 200, the wavelength multiplexing unit 201, and the branching unit 202 explained in FIG. 1.

The WDM transmission apparatus 440 is an apparatus that receives the multiplexed optical signals with different wavelengths from the route switching apparatus 430, separates the optical signals by each wavelength, and transmits the resulting signals to the optical receivers 450a through 450d. The optical receivers 450a through 450d are receivers that receive the optical signals transmitted from the optical transmitters 400a through 400d, via the route switching apparatus 430.

The route switching apparatus 430 is an apparatus that, when a signal interruption occurs to one of the 0-system optical fiber line 460 and the 1-system optical fiber line 470, switches the communication route of the signal to the other of the 0-system optical fiber line 460 and to the 1-system optical fiber line 470 without signal interruption.

The route switching apparatus 430 also converts the wavelength of the optical signal that has passed through the 0-system optical fiber line 460 and the 1-system optical fiber line 470. By making the optical signal pass through an optical fiber that has a wavelength-dependent transmission speed of an optical signal, the transmission delay difference of the optical signal can be adjusted continuously. The route switching apparatus 430, after adjusting the transmission delay difference of the optical signal, compensates the waveform distortion of the optical signal while maintaining the transmission delay difference.

The route switching apparatus 430 includes amplifiers 4300a and 4300b, dispersion compensating units 4301a and 4301b, amplifiers 4302a and 4302b, light variable delay units 4303a and 4303b, wavelength separating units 4304a and 4304b, an optical switch controller 4305, an optical switch 4306, and a controller 4307.

The amplifiers 4300a, 4300b, 4302a, and 4302b are amplifiers that amplify an optical signal. The dispersion compensating units 4301a and 4301b are processing units that compensate the wavelength dispersion of the optical signal that has passed through the 0-system optical fiber line 460 and the 1-system optical fiber line 470, and formed by the DCF and the like.

The light variable delay units 4303a and 4303b are processing units that convert the wavelength of an optical signal, and continuously adjust the transmission delay difference of the optical signal, by making the optical signal pass through an optical fiber that has wavelength-dependent transmission speed of an optical signal. The light variable delay units 4303a and 4303b, after adjusting the transmission delay difference of the optical signal, compensate the waveform distortion of the optical signal while maintaining the transmission delay difference, and amplify and output the optical signal.

The light variable delay units 4303a and 4303b are functioning units that correspond to the low-dispersion fiber buffers 303a and 303b, the amplifiers 304a and 304b, the multi-wavelength light variable delay units 305a and 305b, the delay amount constant dispersion compensating units 306a and 306b, and the amplifiers 307a and 307b in the hitless protection switching apparatus 30 shown in FIG. 1.

The wavelength separating units 4304a and 4304b are separating units that separate two delay adjustment signals with different wavelengths included in each of the 0-system signal and the 1-system signal, and transmit to the controller 4307.

The optical switch controller 4305 is a processing unit that detects whether a signal interruption has occurred in one of the 0-system optical fiber line 460 and the 1-system optical fiber line 470, by monitoring the signals output from the amplifiers 4300a and 4300b. If the signal interruption is detected, the optical switch controller 4305 switches the transmission route of the signal to one of the 0-system and the 1-system without signal interruption, by controlling the optical switch 4306. The optical switch 4306 is an optical switch that switches the transmission route of the signal output to the WDM transmission apparatus 440, between the 0-system and the 1-system.

The controller 4307 is a controller that controls the light variable delay units 4303a and 4303b, and adjusts a delay difference between the 0-system signal and the 1-system signal. The controller 4307 corresponds to the controller 314 shown in FIG. 1.

In this manner, when the route is switched between the 0-system and the 1-system, the route may be switched using the optical switch 4306, when some signal interruption cannot be a matter.

In the configuration of the route switching apparatus 430 in FIG. 30, the route switching apparatus 430 may be formed so that the signals output from the amplifiers 4300a and 4300b are directly input into the light variable delay units 4303a and 4303b, by removing the dispersion compensating units 4301a and 4301b, and amplifiers 4302a and 4302b.

The optical switch controller 4305 may also detect whether a signal interruption has occurred in one of the 0-system optical fiber line 460 and the 1-system optical fiber line 470, by monitoring the signals output from the amplifiers 4302a and 4302b.

(8) Separation Output Process of Multiplexed Optical Signal

According to the first embodiment, the multiplexer 313 of the hitless protection switching apparatus 30 outputs the signals that have passed through one of the 0-system and the 1-system in a multiplexed state. Alternatively, however, the hitless protection switching apparatus may be formed so as to separate and output the respective signals.

Figure 31:
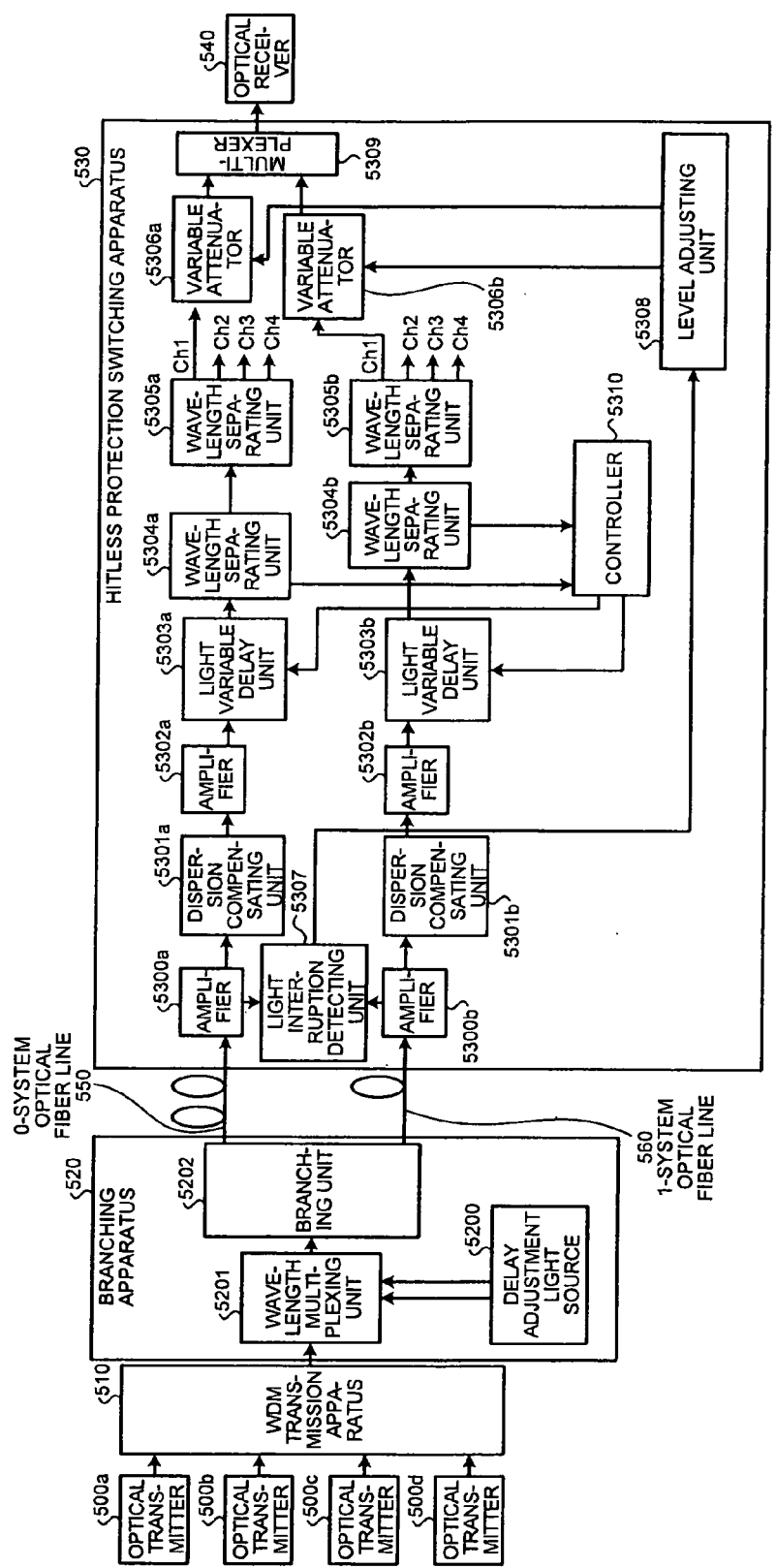
FIG. 31 is a functional configuration diagram of a hitless protection switching system that separates and outputs respective signals.

FIG. 31 is a functional configuration diagram of a hitless protection switching system that separates and outputs respective signals. This hitless protection switching system includes optical transmitters 500a through 500d, a WDM transmission apparatus 510, a branching apparatus 520, a hitless protection switching apparatus 530, and an optical receiver 540. The branching apparatus 520 and the hitless protection switching apparatus 530 are connected via a 0-system optical fiber line 550 and a 1-system optical fiber line 560.

The optical transmitters 500a through 500d are transmitters that transmit an optical signal. The WDM transmission apparatus 510 is an apparatus that multiplexes the optical signals transmitted from the optical transmitters 500a through 500d using the wavelength division multiplexing, and transmits the multiplexed optical signals with different wavelengths.

The branching apparatus 520 is an apparatus that multiplexes an optical signal for delay adjustment to the optical signal received from the WDM transmission apparatus 510, and branches and transmits the resulting optical signal. The branching apparatus 520 includes a delay adjustment light source 5200, a wavelength multiplexing unit 5201, and a branching unit 5202. The delay adjustment light source 5200, the wavelength multiplexing unit 5201, and the branching unit 5202 are the same as the delay adjustment light source 200, the wavelength multiplexing unit 201, and the branching unit 202 explained in FIG. 1.

The optical receiver 540 is a receiver that receives optical signals transmitted by the optical transmitters 500a through 500d via the hitless protection switching apparatus 530. In FIG. 31, only one optical receiver 540 is shown. However, the number of the optical receiver 540 that receives the signal output from the hitless protection switching apparatus 530 is arbitrary.

The hitless protection switching apparatus 530 is an apparatus that continues the transmission of optical signals without interruption, even if a failure occurs to one of the 0-system optical fiber line 550 and the 1-system optical fiber line 560, by using the optical signal of the other optical fiber line. This hitless protection switching apparatus 530 also performs a process of separating and outputting the multiplexed signals.

The hitless protection switching apparatus 530 converts the wavelengths of the optical signals that have passed through the 0-system optical fiber line 550 and the 1-system optical fiber line 560. By making the optical signal pass through an optical fiber that has wavelength-dependent transmission speed of an optical signal, the transmission delay difference of the optical signal can be adjusted continuously. The hitless protection switching apparatus 530, after adjusting the transmission delay difference of the optical system, compensates the waveform distortion of the optical signal while maintaining the transmission delay difference.

This hitless protection switching apparatus 530 includes amplifiers 5300a and 5300b, dispersion compensating units 5301a and 5301b, amplifiers 5302a and 5302b, light variable delay units 5303a and 5303b, wavelength separating units 5304a and 5304b, wavelength separating units 5305a and 5305b, variable attenuators 5306a and 5306b, a light interruption detecting unit 5307, a level adjusting unit 5308, a multiplexer 5309, and a controller 5310.

The amplifiers 5300a, 5300b, 5302a, and 5302b are amplifiers that amplify an optical signal. The dispersion compensating units 5301a and 5301b are processing units that compensate the wavelength dispersion of the optical signal that has passed through the 0-system optical fiber line 550 and the 1-system optical fiber line 560, and formed by the DCF, for example.

The light variable delay units 5303a and 5303b are processing units that convert the wavelength of an optical signal, and continuously adjust the transmission delay difference of the optical signal, by making the optical signal pass through an optical fiber that has wavelength-dependent transmission speed of an optical signal. The light variable delay units 5303a and 5303b, after adjusting the transmission delay difference of the optical signal, compensate the waveform distortion of the optical signal while maintaining the transmission delay difference, and amplify and output the optical signal.

The light variable delay units 5303a and 5303b are functioning units that correspond to the low-dispersion fiber buffers 303a and 303b, the amplifiers 304a and 304b, the multiwavelength light variable delay units 305a and 305b, the delay amount constant dispersion compensating units 306a and 306b, and the amplifiers 307a and 307b in the hitless protection switching apparatus 30 shown in FIG. 1.

The wavelength separating units 5304a and 5304b are separating units that separate two delay adjustment signals with different wavelengths included in each of the 0-system signal and the 1-system signal, and transmit to the controller 5310.

The wavelength separating units 5305a and 5305b separate the respective signals (Ch1, Ch2, Ch3, and Ch4) with different wavelengths that respectively pass through the 0-system and the 1-system. The wavelength separating units 5305a and 5305b output the respective separated signals to the variable attenuators 5306a and 5306b. In FIG. 31, only two variable attenuators 5306a and 5306b are shown. However, the variable attenuators 5306a and 5306b exist by the same number as the number of signals that are separated by the wavelength separating units 5305a and 5305b.

The variable attenuators 5306a and 5306b are processing units that adjust an intensity level of a signal, as explained in FIG. 16. The light interruption detecting unit 5307 is a processing unit that detects whether a signal interruption has occurred in one of the 0-system optical fiber line 550 and the 1-system optical fiber line 560, by monitoring the signal input to the amplifiers 5300a and 5300b. If the signal interruption is detected, the light interruption detecting unit 5307 notifies the level adjusting unit 5308 of the signal interruption.

The level adjusting unit 5308 is an adjusting unit that, when the notification of the signal interruption is received from the light interruption detecting unit 5307, controls the variable attenuators 5306a and 5306b, and adjusts an output level of the signal at the variable attenuators 5306a and 5306b, as explained in FIG. 16.

The multiplexer 5309 is an optical coupler that combines the 0-system signal (Ch1) and the 1-system signal (Ch1) that are separated by the wavelength separating units 5305a and 5305b. In FIG. 31, only one multiplexer 5309 is shown. However, the multiplexer 5309 exists by the same number as the number of the signals (Ch1, Ch2, Ch3, and Ch4) to be combined.

By forming the hitless protection switching apparatus 530 as such, the transmission of the optical signals can be continued without interruption, even if a failure occurs in one of the 0-system optical fiber line 550 and the 1-system optical fiber line 560, by using the optical signal of the other optical fiber line. Further, the signal can be output to the optical receiver 540, by separating the respective signals.

In the configuration of the hitless protection switching apparatus 530 in FIG. 31, the hitless protection switching apparatus 530 may be formed so that the signals output from the amplifiers 5300a and 5300b are directly input into the light variable delay units 5303a and 5303b, by removing the dispersion compensating units 5301a and 5301b, and the amplifiers 5302a and 5302b.

(9) Combining Optical Delay Process and Buffering Process of Signal to Memory

According to the first embodiment, the delay difference between the 0-system signal and the 1-system signal is absorbed, by using the multi-wavelength light variable delay units 305a and 305b shown in FIG. 1. However, the delay difference may be absorbed, after the multi-wavelength light variable delay units 305a and 305b perform an optical delay process, by converting an optical signal to an electric signal and by buffering the electric signal to a memory.

A technology of absorbing a delay difference by buffering a signal to a memory is conventionally known. However, by combining with an optical delay process explained in the first embodiment, the memory capacities required for adjusting the delay difference can be reduced considerably.

Figure 32:
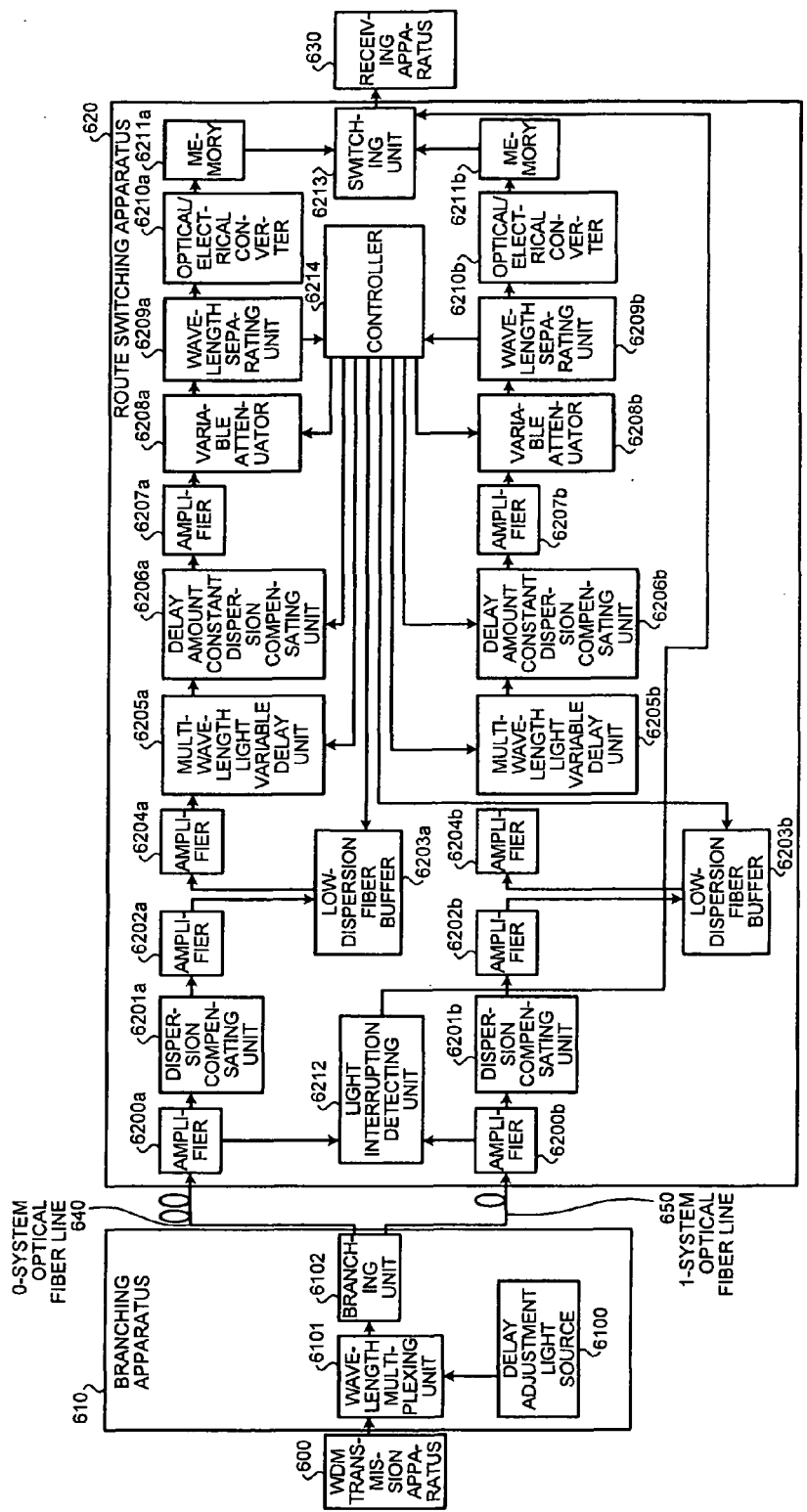
FIG. 32 is a functional configuration diagram of a route switching system that includes multi-wavelength light variable delay units and memories.

FIG. 32 is a functional configuration diagram of a route switching system that includes multi-wavelength light variable delay units 6205a and 6205b, and memories 6211a and 6211b. This hitless protection switching system includes a WDM transmission apparatus 600, a branching apparatus 610, a route switching apparatus 620, and a receiving apparatus 630. The branching apparatus 610 and the route switching apparatus 620 are connected via a 0-system optical fiber line 640 and a 1-system optical fiber line 650.

The WDM transmission apparatus 600 is an apparatus that multiplexes optical signals transmitted from an optical transmitter (not shown) using the wavelength division multiplexing, and transmits the multiplexed optical signals with different wavelengths.

The branching apparatus 610 is an apparatus that multiplexes an optical signal for delay adjustment to the optical signal received from the WDM transmission apparatus 600, and then branches and transmits the resulting optical signal. The branching apparatus 610 includes a delay adjustment light source 6100, a wavelength multiplexing unit 6101, and a branching unit 6102. The delay adjustment light source 6100, the wavelength multiplexing unit 6101, and the branching unit 6102 are the same as the delay adjustment light source 200, the wavelength multiplexing unit 201, and the branching unit 202 explained in FIG. 1.

The receiving apparatus 630 is an apparatus that, when an optical signal is converted into an electric signal by the route switching apparatus 620, receives the electric signal.

The route switching apparatus 620 is an apparatus that, when a signal interruption occurs to one of the 0-system optical fiber line 640 and the 1-system optical fiber line 650, switches the communication route of the signal to the other of the 0-system optical fiber line 640 and the 1-system optical fiber line 650 without signal interruption.

The route switching apparatus 620 converts the wavelength of the optical signals that have passed through the 0-system optical fiber line 640 and the 1-system optical fiber line 650, and continuously adjusts the transmission delay difference of the optical signals, by making the optical signal pass through an optical fiber that has wavelength-dependent transmission speed of an optical signal. The route switching apparatus 620, after adjusting the transmission delay difference of the optical signal, compensates the waveform distortion of the optical signal while maintaining the transmission delay difference.

The route switching apparatus 620 also converts the optical signal whose delay difference is adjusted to an electric signal, and buffers to a memory. When a signal interruption occurs, the route switching apparatus 620 performs a process of reading out a signal from the memory of one of the 0-system and the 1-system without signal interruption.

The route switching apparatus 620 includes amplifiers 6200a and 6200b, dispersion compensating units 6201a and 6201b, amplifiers 6202a and 6202b, low-dispersion fiber buffers 6203a and 6203b, amplifiers 6204a and 6204b, multi-wavelength light variable delay units 6205a and 6205b, delay amount constant dispersion compensating units 6206a and 6206b, amplifiers 6207a and 6207b, variable attenuators 6208a and 6208b, wavelength separating units 6209a and 6209b, optical/electrical converters 6210a and 6210b, memories 6211a and 6211b, a light interruption detecting unit 6212, a switching unit 6213, and a controller 6214.

The amplifiers 6200a and 6200b, the dispersion compensating units 6201a and 6201b, the amplifiers 6202a and 6202b, the low-dispersion fiber buffers 6203a and 6203b, the amplifiers 6204a and 6204b, the multi-wavelength light variable delay units 6205a and 6205b, the delay amount constant dispersion compensating units 6206a and 6206b, the amplifiers 6207a and 6207b, the variable attenuators 6208a and 6208b, and the wavelength separating units 6209a and 6209b are functioning units that are the same as the amplifiers 300a and 300b, the dispersion compensating units 301a and 301b, the amplifiers 302a and 302b, the low-dispersion fiber buffers 303a and 303b, the amplifiers 304a and 304b, the multi-wavelength light variable delay units 305a and 305b, the delay amount constant dispersion compensating units 306a and 306b, the amplifiers 307a and 307b, the former-stage variable attenuators 308a and 308b, and the wavelength separating units 309a and 309b shown in FIG. 1, respectively.

The optical/electrical converters 6210a and 6210b are processing units that convert optical signals received respectively from the wavelength separating units 6209a and 6209b to electric signals. The memories 6211a and 6211b are memories that store therein the electric signals output respectively from the optical/electrical converters 6210a and 6210b.

The light interruption detecting unit 6212 is a processing unit that detects whether a signal interruption has occurred in one of the 0-system optical fiber line 640 and the 1-system optical fiber line 650, by monitoring the signal input to the amplifiers 6200a and 6200b. If a signal interruption is detected, the light interruption detecting unit 6212 notifies the switching unit 6213 of the signal interruption.

The switching unit 6213 is a processing unit that reads out the signal stored in one of the memories 6211a or 6211b respectively of the 0-system and the 1-system. The switching unit 6213, when a signal interruption occurs in one of the 0-system and the 1-system, reads out the signal from one of the memories 6211a and 6211b of the other of the 0-system and the 1-system without signal interruption.

The controller 6214 performs the same process as the controller 314 explained in FIG. 18. The controller 6214 controls the one-step wavelength converters 3010 and 3012, the two-step wavelength converters 3013 and 3015, the delay amount constant dispersion compensating units 306a and 306b, and the former-stage variable attenuators 308a and 308b. The controller 6214 then adjusts a delay difference and an intensity level difference between the 0-system signal and the 1-system signal.

When recovered from the signal interruption, and when the switching unit 6213 reswitches the memories 6211*a* and 6211*b* from which the signal is read out, the delay difference is to be absorbed as much as possible, by executing the processes from step S301 to step S307 shown in FIG. 21.

In this manner, the optical signals of the 0-system and the 1-system, in which waveform degradation is compensated, are stored in the memories 6211*a* and 6211*b*. When a signal interruption occurs to one of the routes of the 0-system and the 1-system, the signal stored in one of the memories 6211*a* and 6211*b* of the route without signal interruption is read out. As a result, the storage capacities of the memories 6211*a* and 6211*b*, for example, can be reduced, and reliability of the signal transmission can be improved.

When the signal interruption occurred in one of the 0-system route and the 1-system route is absorbed, and the signal stored in the memories 6211*a* and 6211*b* at the route where the signal interruption is absorbed is read out, the multi-wavelength light variable delay units 6205*a* and 6205*b* readjust the transmission delay difference of the optical signal. As a result, a recovery from the signal interruption can be performed efficiently.

(10) Others

The present invention can be implemented in various modifications within the spirit and scope of the appended claims, other than the above-described embodiments.

For example, among the respective processes explained in the embodiments, all or a part of the process explained as being performed automatically may be performed manually. Or, all or a part of the process explained as being performed manually may be performed automatically by a known method.

The information that includes the process procedure, the controlling procedure, specific names, and various data and parameters shown in the description and the drawings may be changed in any way, unless otherwise specified.

The respective constituent elements of the respective apparatuses shown in the drawings are functional concepts, and the same physical configuration as in the drawings is not necessarily required. In other words, the specific mode of dispersion and integration of the respective apparatuses is not limited to the ones shown in the drawings, but all or a part thereof may be functionally or physically dispersed or integrated in any unit, depending on various loads and usage states.

All or any part of the respective processing functions performed at the respective apparatuses can be realized by the CPU and a program that is analyzed and executed by the CPU, or may be realized as hardware by a wired logic.

According to one exemplary embodiment of the present invention, a wavelength of an optical signal is converted, a transmission delay difference between the optical signals of each route is adjusted by making the optical signal with a converted wavelength pass through a waveguide in which a transmission delay of the optical signal changes continuously depending on its wavelength, and degradation of a waveform of the optical signal is compensated while maintaining the adjusted transmission delay difference. As a result, the transmission delay difference of the optical signal that is transmitted via a plurality of redundant routes can be advantageously and continuously adjusted, while preventing degradation of the optical signal.

According to one exemplary embodiment of the invention, when the wavelength of the optical signal is converted, the wavelength of the optical signal is reconverted into a predetermined wavelength. As a result, the wavelength of the optical signal with a converted wavelength can be advantageously returned to the original wavelength.

According to one exemplary embodiment of the invention, the transmission delay difference of the optical signal is adjusted, by switching a plurality of waveguides with different lengths and discretely changing the transmission delay of the optical signal. Further, the wavelength of the optical signal is converted, and the transmission delay difference between the optical signals of each route is adjusted, by making the optical signal with a converted wavelength pass through the waveguide in which the transmission delay of the optical signal changes continuously depending on the wavelength. As a result, the transmission delay difference of the optical signal can be advantageously and broadly adjusted by discretely changing the transmission delay, and the transmission delay difference of the optical signal can be advantageously refined, by continuously changing the transmission delay afterwards.

According to one exemplary embodiment of the invention, the transmission delay difference between a plurality of optical signals which are transmitted via redundant routes and multiplexed by the wavelength division multiplexing is adjusted by signals with the same wavelength. As a result, the transmission delay difference between the multiplexed signals with the same wavelength can be advantageously adjusted, by using the wavelength division multiplexing.

According to one exemplary embodiment of the invention, the optical signal whose delay difference detecting signal used for detecting the transmission delay difference of the optical signal is multiplexed is received, and the transmission delay difference between the optical signals is adjusted by referring to the delay difference detecting signal. As a result, the transmission delay difference between the optical signals can be advantageously adjusted, by multiplexing the delay difference detecting signal to the optical signal.

According to one exemplary embodiment of the invention, the optical signal of each route is combined and output, and when a signal interruption is detected, an intensity level of the optical signal of each route, in which degradation of the waveform is compensated, is adjusted so that the intensity level of the optical signal to be output is of a predetermined level. As a result, a fluctuation of the intensity level of the optical signal can be advantageously suppressed, when a signal interruption occurs.

According to one exemplary embodiment of the invention, the transmission delay difference of the optical signal is adjusted, by switching the waveguides with different lengths and discretely changing the transmission delay of the optical signal. The wavelength of the optical signal is converted, and the transmission delay difference of the optical signal is adjusted, by making the optical signal with a converted wavelength pass through the waveguide that generates the transmission delay depending on the wavelength of the optical signal. Further, a signal interruption that is generated to the signal before the optical signal is input is detected at the waveguides that discretely change the transmission delay of the optical signal. As a result, a fluctuation of the intensity level of the optical signal can be advantageously suppressed, by detecting the signal interruption early, before the transmission delay difference of the signal is adjusted.

According to one exemplary embodiment of the invention, when a signal interruption is detected, the intensity level of the optical signal of each route is adjusted, before the optical signal stops reaching. As a result, a transmission of the optical signals can be advantageously prevented from a momentary interruption.

According to one exemplary embodiment of the invention, the optical signal of each route is combined and output, the intensity level of the optical signal being output is monitored, and the intensity level of the optical signal of each route, in which degradation of the waveform of the optical signal is compensated, is adjusted so as that intensity level becomes a predetermined level. As a result, a fluctuation of the intensity level of the optical signal can be advantageously suppressed, by monitoring the intensity level of the optical signal being output.

According to one exemplary embodiment of the invention, the optical signals of the routes, in which degradation of the waveform is compensated, are stored electrically, and when a signal interruption occurs to one of the routes, the signal stored in the route without signal interruption is read out. As a result, reliability of the signal transmission can be advantageously improved, while storage capacities such as a memory that stores therein a signal electrically can be reduced, by combining an adjustment process of the transmission delay difference of the optical signal and an electrical storage process.

According to one exemplary embodiment of the invention, when the signal interruption occurred in one route is absorbed, and the signal stored in this route in which the signal interruption is absorbed is read out, the transmission delay difference of the optical signal is readjusted. As a result, recovery from the signal interruption can be advantageously performed.

According to one exemplary embodiment of the invention, a communication error signal that is generated when a delay difference of the optical signals of the routes is detected, and the transmission delay difference between the optical signals of each route is adjusted until the communication error signal is not detected any more. As a result, an adjustment of the transmission delay difference of the optical signal can be advantageously and easily performed, by detecting the communication error signal instead of detecting the delay difference itself.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical signal transmission control apparatus that controls transmission of optical signals transmitted via a plurality of redundant routes, the optical signal transmission control apparatus comprising:
   a delay difference adjusting unit that adjusts a transmission delay difference between the optical signals of each route by applying an excitation light to more than one optical signal of different wavelengths at the same time, converting the wavelengths of the optical signals, and making the optical signals with converted wavelengths pass through a waveguide in which a transmission delay of the optical signals changes continuously depending on the wavelength; and
   a waveform degradation compensating unit that compensates degradation of a waveform of the optical signal, while maintaining the transmission delay difference adjusted by the delay difference adjusting unit.

2. The optical signal transmission control apparatus according to claim 1, further comprising
   a wavelength converting unit that reconverts the wavelength of the optical signal to a predetermined wavelength, after the wavelength of the optical signal is converted by the delay difference adjusting unit.

3. The optical signal transmission control apparatus according to claim 1, further comprising
   an optical buffer unit that adjusts the transmission delay difference of the optical signals, by switching a plurality of waveguides with different lengths and discretely changing the transmission delay of the optical signals, wherein
   the delay difference adjusting unit further adjusts the transmission delay difference of the optical signals that is adjusted by the optical buffer unit.

4. The optical signal transmission control apparatus according to claim 1, wherein
   the delay difference adjusting unit adjusts the transmission delay difference between a plurality of optical signals, which are transmitted via redundant routes and multiplexed using wavelength division multiplexing, by signals with same wavelength.

5. The optical signal transmission control apparatus according to claim 4, wherein
   the delay difference adjusting unit receives the optical signal on which a delay difference detecting signal for detecting the transmission delay difference of the optical signal is multiplexed, and adjusts the transmission delay difference between the optical signals by referring to the delay difference detecting signal.

6. The optical signal transmission control apparatus according to claim 1, further comprising
   a signal interruption detecting unit that detects generation of a signal interruption;
   an optical signal output unit that combines and outputs the optical signals of respective routes; and
   a signal level adjusting unit that, when the signal interruption is detected by the signal interruption detecting unit, adjusts an intensity level of the optical signal at each route in which the degradation of the waveform is compensated by the waveform degradation compensating unit so that the intensity level of the optical signal output from the optical signal output unit is of a predetermined level.

7. The optical signal transmission control apparatus according to claim 6, further comprising
   an optical buffer unit that adjusts the transmission delay difference of the optical signals, by switching the waveguides with different lengths and discretely changing the transmission delay of the optical signal, wherein
   the delay difference adjusting unit further adjusts the delay difference of the optical signals in which the transmission delay difference is adjusted by the optical buffer unit; and
   the signal interruption detecting unit detects the signal interruption that occurs to the signal before the signal is input to the optical buffer unit.

8. The optical signal transmission control apparatus according to claim 6, wherein
   the signal level adjusting unit, when the signal interruption is detected by the signal interruption detecting unit, performs an adjustment of the intensity levels of the optical signals at respective route before the optical signal stops reaching.

9. The optical signal transmission control apparatus according to claim 1, further comprising
   an optical signal output unit that combines and outputs the optical signals at respective routes; and
   a signal level adjusting unit that monitors the intensity level of the optical signal output from the optical signal output unit and adjusts the intensity level of the optical signal at each route in which the degradation of the waveform of the optical signal is compensated by the waveform degradation compensating unit so that the intensity level is of a predetermined level.

10. The optical signal transmission control apparatus according to claim 1, further comprising
a signal storage unit that electrically stores therein the optical signals at the routes in which the degradation of the waveform is compensated by the waveform degradation compensating unit, and
a signal reading unit that reads out the signal at the route without signal interruption, from the signal storage unit.

11. The optical signal transmission control apparatus according to claim 10, wherein
the delay difference adjusting unit readjusts the transmission delay difference of the optical signal, when the signal interruption occurred at the route is absorbed, and the signal at the route in which the signal interruption is absorbed is read out from the signal storage unit by the signal reading unit.

12. The optical signal transmission control apparatus according to claim 1, further comprising
an error signal detecting unit that detects a communication error signal generated when the delay difference exists in the optical signals at the routes, wherein
the delay difference adjusting unit adjusts the transmission delay difference between the optical signals at each route, until the error signal detecting unit detects no communication error signal.

13. An optical signal transmission control method that controls transmission of optical signals transmitted via a plurality of redundant routes, the optical signal transmission control method comprising:
delay difference adjusting for adjusting a transmission delay difference between the optical signals of each route by applying an excitation light to more than one optical signal of different wavelengths at the same time, converting the wavelengths of the optical signals, and making the optical signals with converted wavelengths pass through a waveguide in which a transmission delay of the optical signals changes continuously depending on the wavelength; and
waveform degradation compensating for compensating degradation of a waveform of the optical signal, while maintaining the transmission delay difference adjusted in the delay difference adjusting.

* * * * *